US011318692B2

(12) United States Patent
Chang et al.

(10) Patent No.: US 11,318,692 B2
(45) Date of Patent: May 3, 2022

(54) METHODS AND APPARATUSES FOR CASTING POLYMER PRODUCTS

(71) Applicant: Magic Leap, Inc., Plantation, FL (US)

(72) Inventors: Chieh Chang, Cedar Park, TX (US); Christophe Peroz, San Francisco, CA (US); Sharad D. Bhagat, Austin, TX (US); Roy Matthew Patterson, Hutto, TX (US); Michael Anthony Klug, Austin, TX (US); Charles Scott Carden, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 122 days.

(21) Appl. No.: 16/163,350

(22) Filed: Oct. 17, 2018

(65) Prior Publication Data
US 2019/0111642 A1    Apr. 18, 2019

Related U.S. Application Data

(60) Provisional application No. 62/573,479, filed on Oct. 17, 2017, provisional application No. 62/746,426, filed on Oct. 16, 2018.

(51) Int. Cl.
*B29D 11/00* (2006.01)
*B29C 39/02* (2006.01)
(Continued)

(52) U.S. Cl.
CPC ........ *B29D 11/00663* (2013.01); *B29C 35/08* (2013.01); *B29C 35/0888* (2013.01);
(Continued)

(58) Field of Classification Search
CPC ............ B29D 11/00663; B29C 39/026; B29C 39/265; B29C 39/38; B29C 35/08; B29C 35/0888; B29C 71/02
See application file for complete search history.

(56) References Cited

U.S. PATENT DOCUMENTS 3,754,848 A    8/1973 Choate
4,017,183 A    4/1977 Lenz et al.
(Continued)

FOREIGN PATENT DOCUMENTS

CN    1221371 A    6/1999
CN    1276916 A    12/2000
(Continued)

OTHER PUBLICATIONS

Extended European Search Report in Application No. 18766926.2, dated Feb. 19, 2020, 9 pages.
(Continued)

*Primary Examiner* — Mathieu D Vargot
(74) *Attorney, Agent, or Firm* — Fish & Richardson P.C.

(57) ABSTRACT

An example system for molding a photocurable material into a planar object includes a first mold structure having a first mold surface, a second mold structure having a second mold surface, and one or more protrusions disposed along at least one of the first mold surface or the second mold surface. During operation, the system is configured to position the first and second mold structures such that the first and second mold surfaces face each other with the one or more protrusions contacting the opposite mold surface, and a volume having a total thickness variation (TTV) of 500 nm or less is defined between the first and second mold surfaces. The system is further configured to receive the photocurable material in the volume, and direct radiation at the one or more wavelengths into the volume.

26 Claims, 34 Drawing Sheets

(51) Int. Cl.
  *B29C 35/08* (2006.01)
  *B29C 39/26* (2006.01)
  *B29C 39/38* (2006.01)
  *B29C 71/02* (2006.01)
(52) U.S. Cl.
  CPC .......... *B29C 39/026* (2013.01); *B29C 39/265* (2013.01); *B29C 39/38* (2013.01); *B29C 71/02* (2013.01); *B29C 2035/0822* (2013.01); *B29C 2035/0827* (2013.01); *B29C 2071/022* (2013.01)

(56) References Cited

U.S. PATENT DOCUMENTS

| | | |
|---|---|---|
| 5,269,978 A | 12/1993 | Umetsu et al. |
| 5,415,816 A | 5/1995 | Buazza et al. |
| 5,744,357 A | 4/1998 | Wang et al. |
| 6,206,673 B1 | 3/2001 | Lipscomb et al. |
| 7,029,607 B2 | 4/2006 | Shimizu et al. |
| 9,194,700 B2 | 11/2015 | Kast |
| 9,373,604 B2 | 6/2016 | Yu et al. |
| 2001/0045676 A1 | 11/2001 | Winterton et al. |
| 2002/0115002 A1 | 8/2002 | Bailey et al. |
| 2003/0031116 A1 | 2/2003 | Takeda et al. |
| 2003/0169400 A1 | 9/2003 | Buazza et al. |
| 2003/0218803 A1 | 11/2003 | Nakabayashi |
| 2004/0222539 A1 | 11/2004 | Hagmann et al. |
| 2005/0158003 A1 | 7/2005 | Ohtsu et al. |
| 2007/0037897 A1 | 2/2007 | Wang et al. |
| 2007/0060849 A1 | 3/2007 | Bluman |
| 2007/0104440 A1 | 5/2007 | Kim et al. |
| 2007/0188837 A1 | 8/2007 | Shimizu et al. |
| 2008/0090155 A1 | 4/2008 | Stewart et al. |
| 2008/0099941 A1 | 5/2008 | Suehira et al. |
| 2010/0059914 A1 | 3/2010 | Cherala et al. |
| 2010/0078854 A1 | 4/2010 | Berggren et al. |
| 2011/0089590 A1 | 4/2011 | Decusatis et al. |
| 2011/0097827 A1 | 4/2011 | Hatano et al. |
| 2012/0161367 A1* | 6/2012 | Kim .................. B29C 33/20 264/402 |
| 2013/0162997 A1 | 6/2013 | Kast et al. |
| 2013/0221549 A1 | 8/2013 | Eguro et al. |
| 2013/0300011 A1 | 11/2013 | Fujimoto |
| 2013/0320589 A1 | 12/2013 | Fujita |
| 2014/0239529 A1 | 8/2014 | Tan et al. |
| 2014/0319707 A1 | 10/2014 | Watanabe et al. |
| 2015/0054185 A1 | 2/2015 | Watanabe |
| 2015/0276995 A1 | 10/2015 | Nomura |
| 2016/0031151 A1 | 2/2016 | Tan et al. |
| 2016/0039122 A1 | 2/2016 | Wippermann et al. |
| 2016/0056126 A1 | 2/2016 | Yu et al. |
| 2016/0339626 A1 | 11/2016 | Truskett et al. |
| 2017/0315346 A1* | 11/2017 | Tervo .................. G02B 27/4205 |
| 2018/0264691 A1 | 9/2018 | Chang et al. |
| 2020/0116934 A1 | 4/2020 | Chang et al. |
| 2021/0271025 A1 | 9/2021 | Chang et al. |

FOREIGN PATENT DOCUMENTS

| | | |
|---|---|---|
| CN | 101426638 A | 5/2009 |
| CN | 107249868 A | 10/2017 |
| EP | 0191623 A2 | 8/1986 |
| GB | 1101202 A | 1/1968 |
| JP | 2006202920 A | 8/2006 |
| JP | 2007305895 A | 11/2007 |
| JP | 2008-296450 | 12/2008 |
| JP | 2009200345 A | 9/2009 |
| JP | 2010000754 A | 1/2010 |
| JP | 2010269466 A | 12/2010 |
| JP | 2011051328 A | 3/2011 |
| JP | 2011176321 A | 9/2011 |
| JP | 2012131229 A | 7/2012 |
| JP | 2012518562 A | 8/2012 |
| JP | 2012213984 A | 11/2012 |
| JP | 2013058517 A | 3/2013 |
| JP | 2013075379 A | 4/2013 |
| JP | 2016031952 A | 3/2016 |
| KR | 101005583 B1 | 1/2011 |
| WO | 2013/153613 A1 | 10/2013 |

OTHER PUBLICATIONS

PCT International Search Report and Written Opinion for International Appln. No. PCT/US2018/022642, dated Jun. 6, 2018, 15 pages.
PCT International Search Report and Written Opinion in International Appln. No. PCT/US2019/056557, dated Jan. 10, 2020, 12 pages.
PCT International Search Report and Written Opinion in International Appln. No. PCT/US2018/056326, dated Feb. 15, 2019, 22 pages.
Office Action received for European Application No. 18766926.2, dated Feb. 2, 2021, 8 pages.
Partial European Search Report and Search Opinion Received for EP Application No. 18868789.1, dated Nov. 18, 2020, 15 pages.
EP Extended European Search Report in Appln. No. 18868789.1, dated Feb. 18, 2021, 13 pages.
EP Extended European Search Report in European Appln No. 19872349.6, dated Nov. 19, 2021, 10 pages.
Office Action in Japanese Appln. No. 2019-550227, dated Nov. 29, 2021, 10 pages (with English translation).
CN Office Action in Chinese Appln. No. 201880067513.0, dated Oct. 20, 2021, 14 pages (with English translation).

* cited by examiner

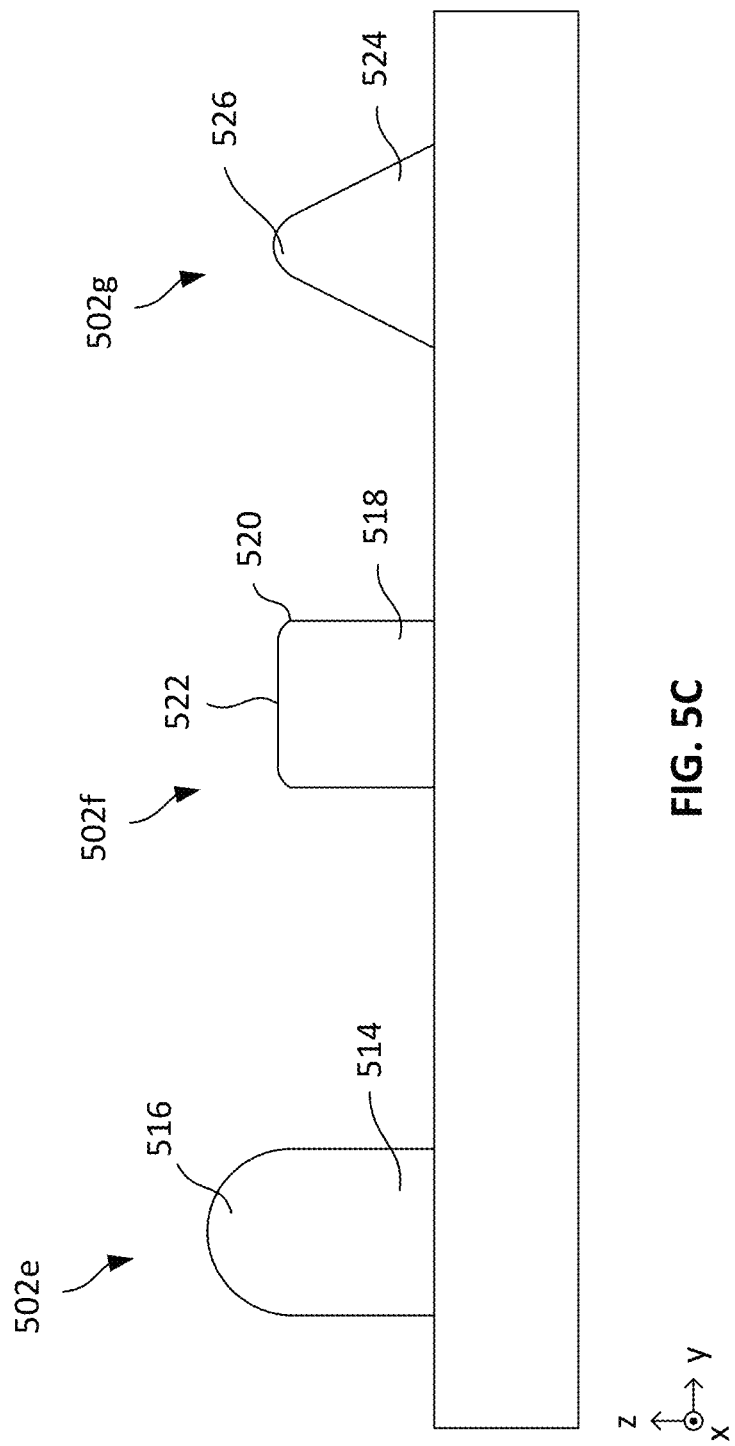

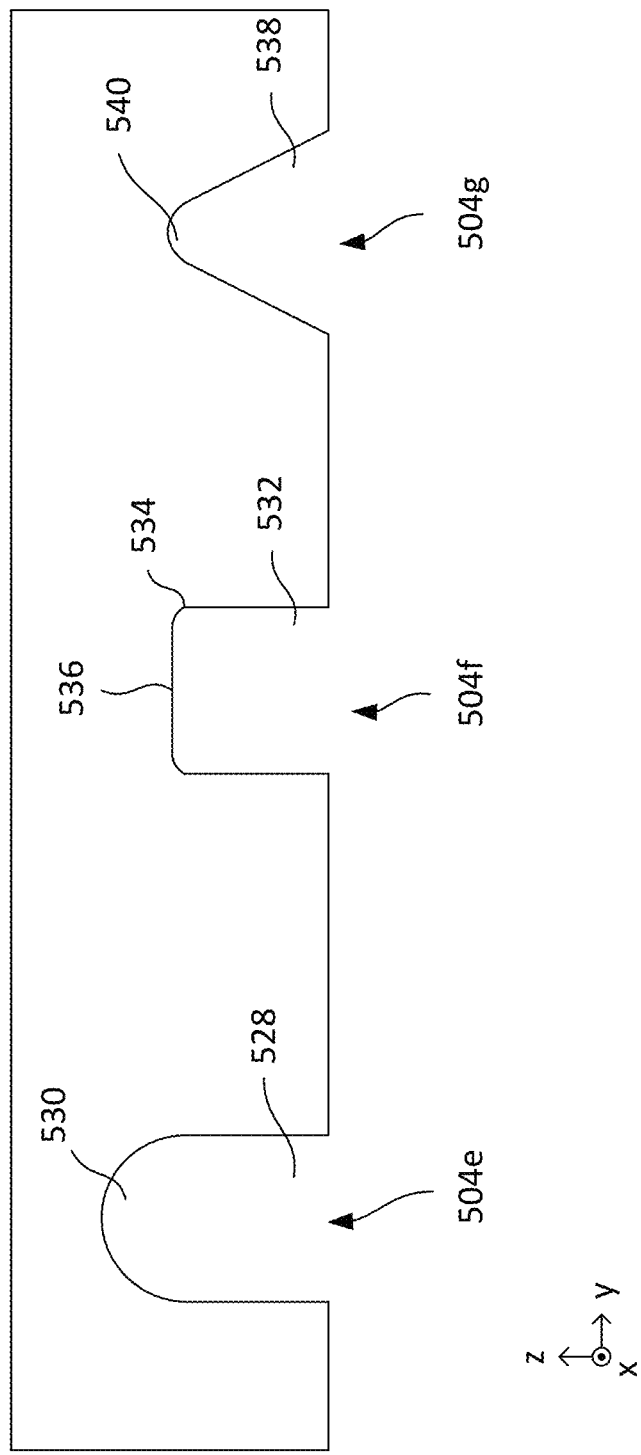

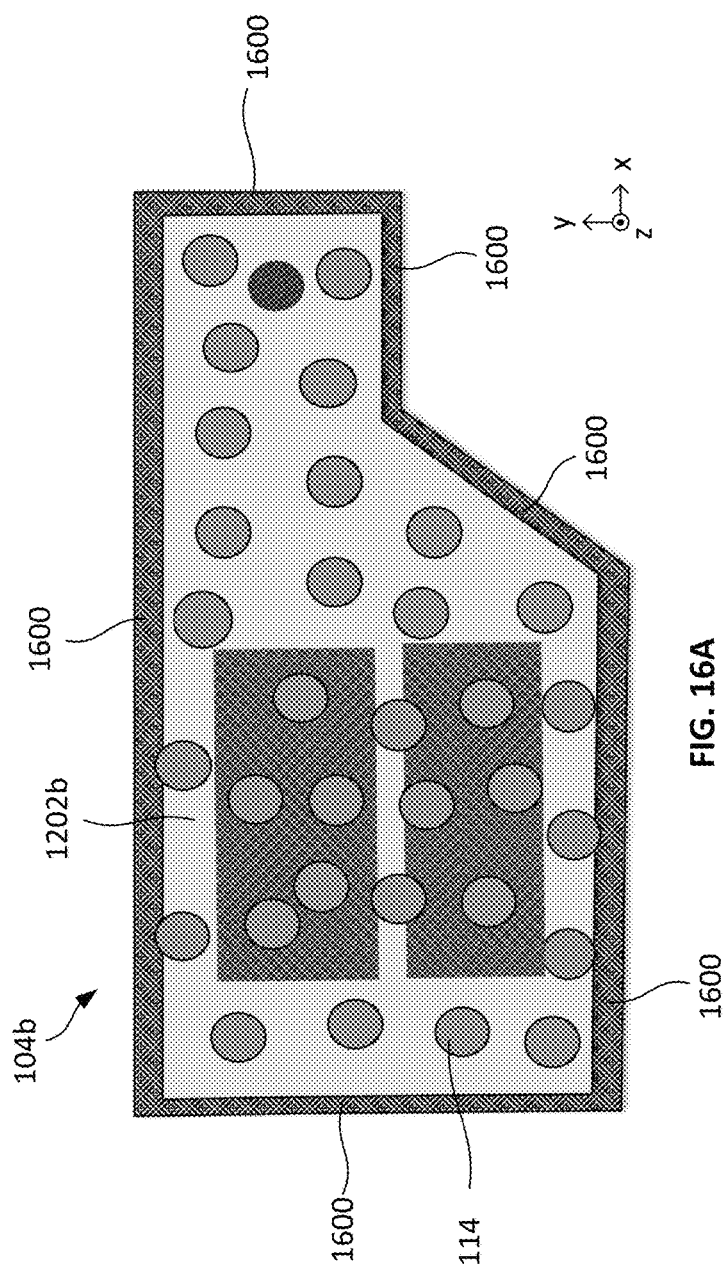
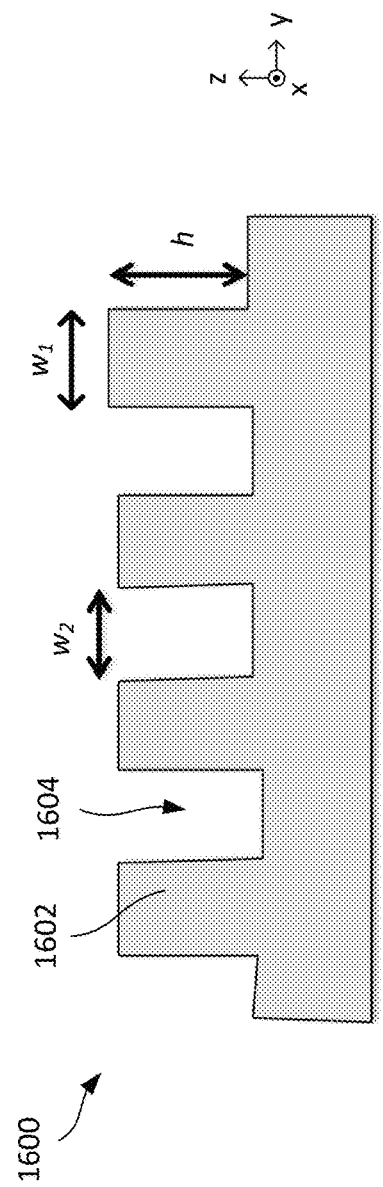
FIG. 16A
FIG. 16B

METHODS AND APPARATUSES FOR CASTING POLYMER PRODUCTS

CROSS-REFERENCE TO RELATED APPLICATIONS

This application claims priority from U.S. Provisional Application Ser. No. 62/573,479, filed on Oct. 17, 2017, and U.S. Provisional Application Ser. No. 62/746,426, filed on Oct. 16, 2018, which are incorporated herein by reference in their entirety.

TECHNICAL FIELD

This disclosure relates to optical polymer films and methods for producing the same.

BACKGROUND

Optical imaging systems, such as wearable imaging headsets, can include one or more eyepieces that present projected images to a user. Eyepieces can be constructed using thin layers of one or more highly refractive materials. As examples, eyepieces can be constructed from one or more layers of highly refractive glass, silicon, metal, or polymer substrates.

In some cases, an eyepiece can be patterned (e.g., with one or more light diffractive nanostructures), such that it projects an image according to a particular focal depth. For an example, to a user viewing a patterned eyepiece, the projected image can appear to be a particular distance away from the user.

Further, multiple eyepieces can be used in conjunction to project a simulated three-dimensional image. For example, multiple eyepieces—each having a different pattern—can be layered one atop another, and each eyepiece can project a different depth layer of a volumetric image. Thus, the eyepieces can collectively present the volumetric image to the user across three-dimensions. This can be useful, for example, in presenting the user with a "virtual reality" environment.

To improve the quality of a projected image, an eyepiece can be constructed such that unintended variations in the eyepiece are eliminated, or otherwise reduced. For example, an eyepiece can be constructed such that it does not exhibit any wrinkles, uneven thicknesses, or other physical distortions that might negatively affect the performance of the eyepiece.

SUMMARY

System and techniques for producing polymer films are described herein. One or more of the described implementations can be used to produce polymer film in a highly precise, controlled, and reproducible manner. The resulting polymer films can be used in a variety of variation-sensitive applications in which extremely tight tolerances on film dimensions are desired. For instance, the polymer films can be used in optical applications (e.g., as a part of eyepieces in an optical imaging system) in which material homogeneity and dimensional constraints are on the order of optical wavelengths or smaller.

In some cases, polymer films can be produced by enclosing a photocurable material (e.g., a photopolymer or light-activated resin that hardens when exposed to light) between two molds, and curing the material (e.g., by exposing the material to light and/or heat).

However, during the casting and curing process, various factors can interfere with the shape of the resulting film, causing it to become distorted from its intended shape. For example, during the casting process, particular matter may be unintentionally entrapped between two mold surfaces, and interfere with the interaction between them. As a result, this may cause the relative orientation of the mold surfaces to deviate from the intended orientation (e.g., such that the mold surfaces are no longer parallel to each other), resulting in a film that deviates from its intended shape. For instance, the resulting film may have an uneven thickness across its extent. As another example, during the curing process, the material may expand or contract within the molds. As a result, the film may become distorted (e.g., wrinkled, stretched, or compressed). Accordingly, the film may be less suitable for use in variation-sensitive applications.

To improve the quality and consistency of the film, the position of the two molds can be precisely controlled, such that the molds are kept parallel to each other immediately prior to and/or during the curing of the material. In some cases, this can be achieved, at least in part, through the use of physical registration features positioned on one or more of the molds. As an example, molds can include one or more spacer structures (e.g., protrusions or gaskets) that project from one or more surfaces of the mold and towards an opposing mold. As another example, molds can include one or more recesses (e.g., slots or grooves) defined along one or more surfaces of the mold that accept one or more spacer structures from an opposing mold. The spacer structures and/or recesses can be used to physically align the molds, such that the relative orientation of the mold surfaces are less likely to deviate from the intended orientation. For example, the spacer structures and/or recesses can be used to maintain a parallel orientation between two molds. As a result, the photocurable material has a more even thickness, and is less likely to become distorted during the curing process.

In some cases, a "singulation" process can be performed to separate a polymer film into multiple different products (e.g., by cutting the polymer film one or more times to obtain separate products having particular sizes and shapes).

However, a singulation process may introduce undesirable variations in the polymer film, and render the resulting products less suitable for use in variation-sensitive environments. For example, high power lasers are often used to cut certain types of optical materials, such as glass-based substrates (e.g., during the production of glass-based eyepieces). However, the use of lasers may be less suitable for cutting relatively softer materials with lower melting points, such as polymer film. For instance, lasers produce high temperatures locally onto the polymer film, which may result in localized physical and/or chemical damage to the polymer film (e.g., permanent deposition of fumes and/or debris into the polymer film). Further, the use of lasers may impart an undesirable odor in the polymer film (e.g., due to the oxidation of sulfur/thiol groups in the polymer film).

As an alternative, polymer products can be produced without performing a singulation process. For example, two molds can be configured such that, when the molds are brought together, they define an enclosed region corresponding to the size and shape of single polymer product. During the production process, a photocurable material is enclosed between the two molds, and the material is cured to form a polymer film. After curing, the polymer film is extracted from the molds, resulting in a single polymer product having a particular predefined size and shape. This polymer product can be subsequently used in other manufacturing processes (e.g., incorporated into an apparatus, such as a headset)

without the need for an additional singulation step. Accordingly, the polymer product is less likely to have physical and/or chemical damage (e.g., compared to a polymer product formed through singulation of a larger polymer film), and can be more suitable for use in variation-sensitive environments.

Further, in some cases, a film can become distorted due to the build up of internal stresses within during the polymerization process. For instance, as a photocurable material is cured, monomers of the photocurable material polymerize into longer and heavier chains. Correspondingly, the photocurable material reduces in volume (e.g., experiences "shrinkage") as the polymer chains physically move together. This results in a build up to internal stresses inside of the photocurable material (e.g., stresses resulting from an impedance to polymer chain mobility), and a storage of strain energy within the photocurable material. When the cured film is extracted from the mold, the strain energy is released resulting in thinning of the film. The film can thin differently depending on the spatial distribution of the internal stresses. Thus, films may exhibit variations from film to film, depending on the particular spatial distribution of internal stresses that were introduced during the polymerization process. Accordingly, the consistency of a film can be improved by regulating the distribution of stress within the film during the casting process. Example systems and techniques for regulating stress in a film are described herein.

In an aspect, a system for molding a photocurable material into a planar object includes a first mold structure including a first mold surface. The first mold surface includes a planar area extending in a first plane. The system also includes a second mold structure including a second mold surface including a planar area extending in a second plane. At the corresponding planar area, at least one of the first mold structure or the second mold structure is substantially transparent to radiation at one or more wavelengths suitable for photocuring the photocurable material. The system also includes one or more protrusions disposed along at least one of the first mold surface or the second mold surface. During operation, the system is configured to position the first and second mold structures such that the first and second mold surfaces face each other with the one or more protrusions contacting the opposite mold surface, the first plane is parallel to the second plane, and a volume having a total thickness variation (TTV) of 500 nm or less is defined between the first and second mold surfaces adjacent the corresponding planar areas. During operation, the system is also configured to receive the photocurable material in the volume, and direct radiation at the one or more wavelengths into the volume.

Implementations of this aspect can include one or more of the following features.

In some implementations, each of the first mold structure and the second mold structure can have a thickness greater than 1 mm.

In some implementations, each of the first mold structure and the second mold structure can have a thickness between 1 mm and 50 mm.

In some implementations, each of the first mold structure and the second mold structure can have a diameter greater than 3 inches.

In some implementations, the system can further include one or more recesses defined along at least one of the first mold surface or the second mold surface.

In some implementations, during operation, at least some of the one or more protrusions can be in alignment with the at least some of the one or more recesses, such that when the system positions the first and second mold structures so that the first and second mold surfaces face each other with the one or more protrusions contacting the opposite surface, at least some of the one or more protrusions insert, at least partially, into at least some of the recesses.

In some implementations, at least some of the one or more protrusions can be disposed along a periphery of the first mold surface.

In some implementations, at least some of the one or more protrusions can be disposed along an interior of the first mold surface.

In some implementations, at least some of the one or more recesses protrusions can be disposed along a periphery of the second mold surface.

In some implementations, at least some of the one or more recesses protrusions can be disposed along an interior of the second mold surface.

In some implementations, at least some of the one or more protrusions can have a substantially rectangular cross-section.

In some implementations, at least some of the one or more protrusions having the substantially rectangular cross-section can further include a respective substantially hemispherical distal end.

In some implementations, at least some of the one or more protrusions having the substantially rectangular cross-section can further include one or more rounded corners.

In some implementations, at least some of the one or more protrusions can have a substantially triangular cross-section.

In some implementations, at least some of the one or more protrusions having the substantially triangular cross-section can further include one or more rounded corners.

In some implementations, at least some of the one or more recesses can have a substantially rectangular cross-section.

In some implementations, at least some of the one or more recesses having the substantially rectangular cross-section can further include one or more rounded corners.

In some implementations, at least some of the one or more recesses can have a substantially triangular cross-section.

In some implementations, at least some of the one or more recesses having the substantially triangular cross-section can further include one or more rounded corners.

In some implementations, at least some of the one or more protrusions can be integral with least one of the first mold surface or the second mold surface.

In some implementations, at least some of the one or more protrusions can be detachable from the first mold surface or the second mold surface.

In some implementations, the system can further include a light assembly configured to emit one or more wavelengths of radiation suitable for photocuring the photocurable material.

In some implementations, the first and second mold surfaces can be polished surfaces.

In some implementations, during operation, the system can be configured to position the first and second mold structures such that the volume defined between the first and second mold surfaces adjacent the corresponding planar areas has a total thickness variation (TTV) of 100 nm or less.

In some implementations, each of the one or more protrusions can have a total thickness variation of 100 nm or less.

In some implementations, each of the one or more recesses can have a total thickness variation of 100 nm or less.

In some implementations, during operation, the system can be configured to position the first and second mold structures such that the volume defined between the first and second mold surfaces adjacent the corresponding planar areas has a thickness between 20 µm and 2 mm.

In some implementations, during operation, the system can be configured to direct heat into the volume. The system can be configured to direct heat into the volume through the first mold surface. The system can be configured to direct heat into the volume through the second mold surface.

In some implementations, during operation, the system can be configured to direct the one or more wavelengths of radiation into the volume through the first mold surface.

In some implementations, during operation, the system can be configured to direct the one or more wavelengths of radiation into the volume through the second mold surface.

In another aspect, a method of forming a waveguide part having a predetermined shape includes providing a first mold portion having a first surface including a discrete, continuous first area corresponding to the predetermined shape of the waveguide part. The first area is bounded by an edge region having a different surface chemistry and/or surface structure than the first area. The method also includes providing a second mold portion having a second surface including a discrete, continuous second area corresponding to the predetermined shape of the waveguide part. The second area is bounded by an edge region having a different surface chemistry and/or surface structure than the second area. The method also includes dispensing a metered amount of a photocurable material into a space adjacent the first area of the first mold portion, and arranging the first and second surfaces opposite each other with the first and second areas being registered with respect to each other. The method also includes adjusting a relative separation between the first surface and the second surface so that the photocurable material fills a space between first and second areas of the first and second surfaces, respectively, having the predetermined shape. The different surface chemistry and/or surface structure between the first and second areas and their corresponding edge regions prevent flow of the photocurable material beyond the edge regions. The method also includes irradiating the photocurable material in the space with radiation suitable for photocuring the photocurable material to form a cured film in the shape of the waveguide part, and separating the cured film from the first and second mold portions to provide the waveguide part.

Implementations of this aspect can include one or more of the following features.

In some implementations, the metered amount of photocurable material can be dispensed at a plurality of discrete locations in the space adjacent the first area of the first mold portion.

In some implementations, the metered amount of photocurable material can be dispensed according to an asymmetric pattern in the space adjacent the first area of the first mold portion.

In some implementations, the metered amount of photocurable material can be dispensed at a periphery of the first surface of the first mold portion.

In some implementations, the first and second surfaces can be arranged opposite each other prior to dispensing the photocurable material.

In some implementations, the first and second surfaces can be arranged opposite each other after dispensing the photocurable material.

In some implementations, the first and second areas can be registered with respect to each other based on one or more fiducial markings on the first and/or second surfaces. The fiducial markings can be located outside of the first and second areas.

In some implementations, the relative separation between the first and second surfaces can be controlled based on one or more spacers located on the first and/or second surfaces. The one or more spacers can be located outside of the first and second areas.

In some implementations, the edge region of the first and/or second mold portions can include a material that repels the photocurable material.

In some implementations, the edge region of the first and/or second mold portions can include a patterned surface configured to pin droplets of the photocurable material.

In some implementations, the edge region of the first and/or second mold portions can include a patterned surface configured to roll droplets of the photocurable material.

In some implementations, the waveguide part can have a thickness of no more than 1000 µm, an area of at least 1 cm$^2$.

In another aspect, a method includes assembling a head mounted display including the waveguide part formed using one or more of the methods described herein.

In another aspect, a mold system for forming a waveguide part having a predetermined shape includes a first mold portion and a second mold portion. The first mold portion has a first surface including a discrete, continuous first area corresponding to the predetermined shape of the waveguide part. The first area is bounded by an edge region. The second mold portion has a second surface including a discrete, continuous second area corresponding to the predetermined shape of the waveguide part. The second area is bounded by an edge region having a different surface chemistry and/or surface structure than the second area. The system also includes one or more spacers on the first and/or second surfaces located outside of the first and second areas, respectively. The system also includes one or more fiducial markings on the first and/or second surfaces located outside of the first and second areas, respectively. The edge region of the first and second surfaces each have a different surface chemistry and/or surface structure than the first area and second areas, respectively, such that a surface energy of a photocurable material for forming the waveguide part is different at the edge regions compared to the first and second areas, respectively.

Implementations of this aspect can include one or more of the following features.

In some implementations, the edge region of the first and/or second mold portions can include a patterned surface configured to pin droplets of the photocurable material.

In some implementations, the edge region of the first and/or second mold portions can include a patterned surface configured to roll droplets of the photocurable material.

In some implementations, the edge region of the first and/or second mold portions can include a patterned surface comprising structures having a height in a range from 1 µm to 10 µm.

In some implementations, the edge region of the first and/or second mold portions can include a patterned surface comprising structures having a lateral spacing in a range from 50 µm to 200 µm.

In some implementations, the edge region of the first and/or second mold portions can include a material that repels the photocurable material.

In some implementations, both the first surface and the second surface can include multiple discrete, continuous areas corresponding to the predetermined shape of the waveguide part, each being bounded by a corresponding edge region.

In some implementations, the system can further include a dispensing station configured to dispense a metered amount of photocurable material into a space adjacent the first area of the first mold portion.

In some implementations, the system can further include an irradiation station configured to irradiate photocurable material in a space between first and second areas of the first and second surfaces.

In some implementations, the waveguide part can have a thickness of no more than 1000 μm, an area of at least 1 cm².

In another aspect, a method of forming a waveguide film includes dispensing a photocurable material into a space between a first mold portion and a second mold portion opposite the first mold portion, adjusting a relative separation between a surface of the first mold portion with respect to a surface of the second mold portion opposing the surface of the first mold portion, and irradiating the photocurable material in the space with radiation suitable for photocuring the photocurable material to form a cured waveguide film. Further, the method includes, concurrent to irradiating the photocurable material, performing at least one of varying the relative separation between the surface of the first mold portion and the surface of the second mold portion, and varying an intensity of the radiation irradiating the photocurable material.

Implementations of this aspect can include one or more of the following features.

In some implementations, the relative separation can be varied to regulate a force experienced by the first mold portion along an axis extending between the first mold portion and the second mold portion. The relative separation can be varied based on a closed-loop control system that regulates the force.

In some implementations, the relative separation can be varied after irradiating the photocurable material for a time sufficient to reach a gel point in the photocurable material. The relative separation can be reduced after irradiating the photocurable material for the time sufficient to reach the gel point in the photocurable material In some implementations, varying the relative separation can include moving the first mold portion towards the second mold portion to compress one or more spacer structures disposed between the first mold portion and the second mold portion. The spacer structures can be compressed according to an open-loop control system.

In some implementations, varying the relative separation can include oscillating the position of the first mold portion relative to the second mold portion.

In some implementations, varying the intensity of the radiation can include varying a spatial intensity pattern irradiating the photocurable material.

In some implementations, varying the intensity of the radiation can include varying a power of the radiation. Varying the power can include pulsing the radiation. Each pulse of the radiation can have the same power. Pulses of the radiation can have different power. Each pulse of the radiation can have the same duration. Pulses of the radiation can have different durations. A pulse frequency can be constant. A pulse frequency can be varied.

In some implementations, varying the intensity of the radiation can include sequentially irradiating different areas of the space.

In some implementations, the thickness of the space filled with photocurable material can vary and the intensity of the radiation can be varied so that regions of high relative thickness receive a higher radiation dose compared to regions of low relative thickness.

In some implementations, the method can further include separating the cured waveguide film from the first mold portion and the second mold portion.

In another example, a method can include assembling a head mounted display comprising the waveguide film formed using one or more of the methods described herein.

The details of one or more embodiments are set forth in the accompanying drawings and the description below. Other features and advantages will be apparent from the description and drawings, and from the claims.

DESCRIPTION OF DRAWINGS

FIG. 5C is a diagram of an example mold structure and example spacing structures.

FIG. 5D is a diagram of an example mold structure and example recesses.

FIG. 16A is a diagram of another example mold structure.

FIG. 16B is a diagram of an example etched grating pattern.

DETAILED DESCRIPTION

System and techniques for producing polymer film are described herein. One or more of the described implementations can be used to produce polymer film in a highly precise, controlled, and reproducible manner. The resulting polymer films can be used in a variety of variation-sensitive applications (e.g., as a part of eyepieces in an optical imaging system).

In some implementations, polymer films can be produced such that wrinkles, uneven thicknesses, or other unintended physical distortions are eliminated or otherwise reduced. This can be useful, for example, as the resulting polymer film exhibits more predictable physical and/or optical properties. For example, polymer films produced in this manner can diffract light in a more predictable and consistent manner, and thus, may be more suitable for use a high resolution optical imaging system. In some cases, optical imaging systems using these polymer films can produce sharper and/or higher resolution images than might otherwise be possible with other polymer films.

Figure 1:
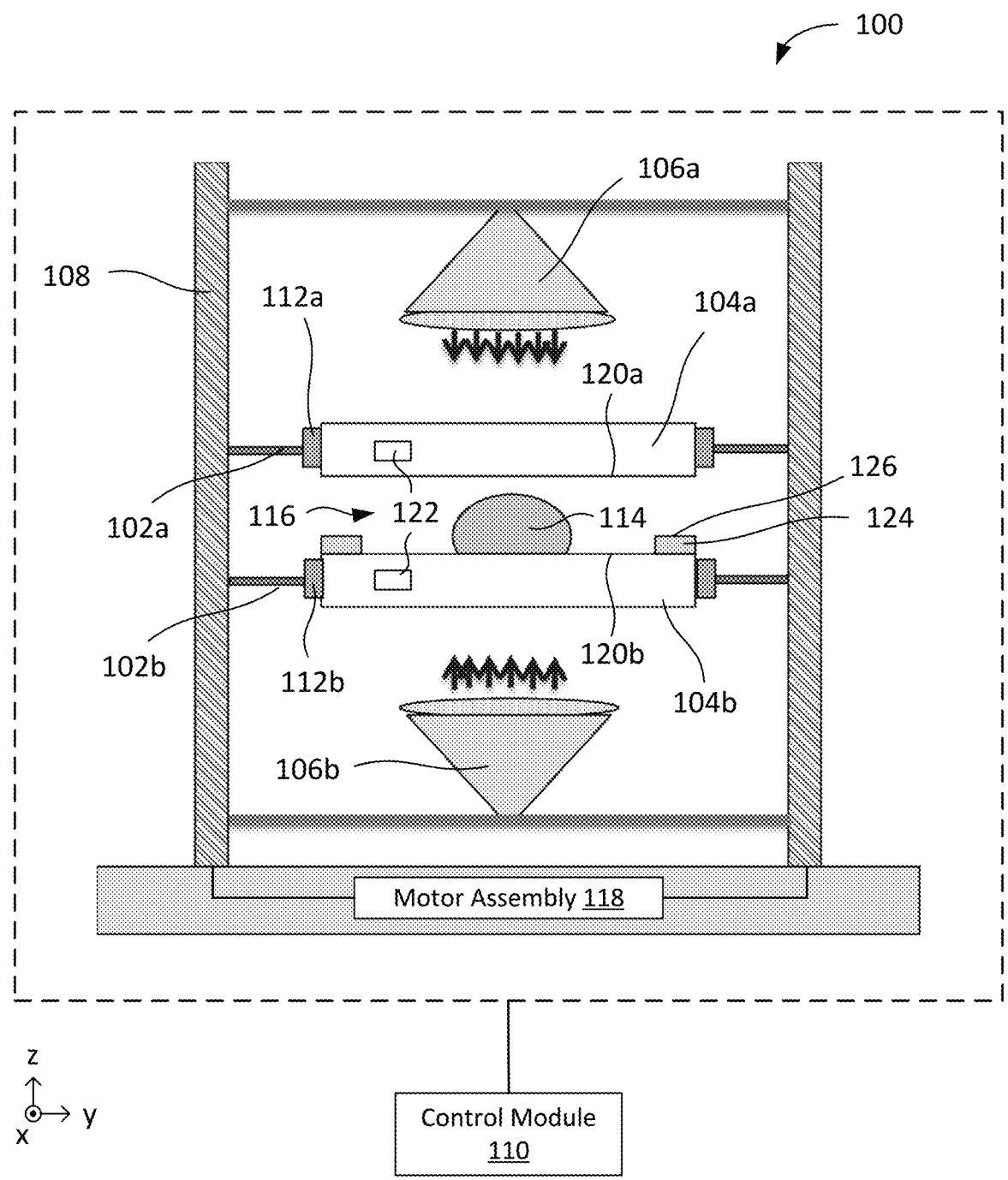
FIG. 1 is a diagram of an example system for producing polymer.

An example system 100 for producing polymer film is shown in FIG. 1. The system 100 includes two actuable stages 102a and 102b, two mold structures 104a and 104b, two light sources 106a and 106b, a support frame 108, and a control module 110.

During operation of the system 100, the two mold structures 104a and 104b (also referred to as "optical flats") are secured to the actuable stages 102a and 102b, respectively (e.g., through clamps 112a and 112b). In some cases, the clamps 112a and 112b can be magnetic (e.g., electromagnets) and/or pneumatic clamps that enable the mold structures 104a and 104b to be reversibly mounted to and removed from the actuable stages 102a and 102b. In some cases, the clamps 112a and 112b can be controlled by a switch and/or by the control module 110 (e.g., by selectively applying electricity to the electromagnets of the clamps 112a and 112b and/or selectively actuating pneumatic mechanisms to engage or disengage the molds structures).

A photocurable material 114 (e.g., a photopolymer or light-activated resin that hardens when exposed to light) is deposited into the mold structure 104b. The mold structures 104a and 104b are moved into proximity with one another (e.g., by moving the actuable stages 102a and/or 102b vertically along the support frame 108), such that the photocurable material 114 is enclosed by the mold structures 104a and 104b. The photocurable material 114 is then cured (e.g., by exposing the photocurable material 114 to light from the light sources 106a and/or 106b), forming a thin film having one or more features defined by the mold structures 104a and 104b. After the photocurable material 114 has been cured, the mold structures 104a and 104b are moved away from each other (e.g., by moving the actuable stages 102a and/or 102b vertically along the support frame 108), and the film is extracted.

The actuable stages 102a and 102b are configured to support the mold structures 104a and 104b, respectively. Further, the actuable stages 102a and 102b are configured to manipulate the mold structures 104a and 104b, respectively, in one or more dimensions to control a gap volume 116 between the mold structures 104a and 104b.

For instance, in some cases, the actuable stage 102a can translate the mold structure 104a along one or more axes. As an example, the actuable stage 102a can translate the mold structure 104a along an x-axis, a y-axis, and/or a z-axis in a Cartesian coordinate system (i.e., a coordinate system having three orthogonally arranged axes). In some cases, the actuable stage 102a can rotate or tilt the mold structure 104a about one or more axes. As an example, the actuable stage 102a can rotate the mold structure 104a along an x-axis (e.g., to "roll" the mold structure 104a), a y-axis (e.g., to "pitch" the mold structure 104a), and/or a z-axis (e.g., to "yaw" the mold structure 104a) in a Cartesian coordinate system. Translation and/or rotation with respect to one or more other axes are also possible, either in addition to or instead of those described above. Similarly, the actuable stage 102b can also translate the mold structure 104b along one or more axes and/or rotate the mold structure 104b about one or more axes.

In some cases, the actuable stages 102a can manipulate the mold structure 104a according to one or more degrees of freedom (e.g., one, two, three, four, or more degrees of freedom). For instance, the actuable stage 102a can manipulate the mold structure 104a according to six degrees of freedom (e.g., translation along an x-axis, y-axis, and z-axis, and rotation about the x-axis, y-axis, and z-axis). Manipulation according to one or more other degrees of freedom is also possible, either in addition to or instead of those described above. Similarly, the actuable stage 102b can also manipulate the mold structure 104b according to one or more degrees of freedom In some cases, the actuable stages 102a and 102b can include one or more motor assemblies configured to manipulate the mold structures 104a and 104b and control the gap volume 116. For example, the actuable stages 102a and 102b can include a motor assembly 118 configured to manipulate the actuable stages 102a and 102b, thereby repositioning and/or reorienting the actuable stages 102a and 102b.

In the example shown in FIG. 1, the actuable 102a and 102b can both be moved relative to the support frame 108 to control the gap volume 116. In some cases, however, one of the actuable stages can be moved relative to the support frame 108, while the other can remain static with respect to the support frame 108. For example, in some cases, the actuable stage 102a can be configured to translate in one or more dimensions relative to the support frame 108 through the motor assembly 118, while the actuable stage 102b can be held static with respect to the support frame 108.

The mold structures 104a and 104b collectively define an enclosure for the photocurable material 114. For example, the mold structures 104a and 104b, when aligned together, can define a hollow mold region (e.g., the gap volume 116), within which the photocurable material 114 can be deposited and cured into a film. The mold structures 104a and 104b can also define one or more structures in the resulting film.

For example, the mold structures 104a and 104b can include one or more protruding structures (e., gratings) from the surfaces 120a and/or 120b that impart a corresponding channel in the resulting film. As another example, the mold structures 104a and 104b can include one or more channels defined in the surfaces 120a and/or 120b that impart a corresponding protruding structure in the resulting film. In some cases, the mold structures 104a and 104b can impart a particular pattern on one or both sides of the resulting film. In some cases, the mold structures 104a and 104b need not impart any pattern of protrusions and/or channels on the resulting film at all. In some cases, the mold structures 104a and 104b can define a particular shape and pattern, such that the resulting film is suitable for use as an eyepiece in an optical imaging system (e.g., such that the film has one or more light diffractive microstructures or nanostructures that impart particular optical characteristics to the film).

In some cases, the surfaces of the mold structures 104a and 104b that face each other can each be substantially flat, such that the gap volume 116 defined between them exhibits a TTV of 500 nm or less. For example, the mold structure 104a can include a substantially flat surface 120a, and the mold structure 104b can have substantially flat surface 120b. A substantially flat surface can be, for example, a surface that deviates from a flatness of an ideal flat surface (e.g., a perfectly flat surface) by 100 nm or less (e.g., 100 nm or less, 75 nm or less, 50 nm or less, etc.). A substantially flat surface can also have a local roughness of 2 nm or less (e.g., 2 nm or less, 1.5 nm or less, 1 nm or less, etc.) and/or an edge-to edge flatness of 500 nm or less (e.g., 500 nm or less, 400 nm or less, 300 nm or less, 50 nm or less, etc.). In some cases, one or both of the surfaces of the mold structures 104a and 104b can be polished (e.g. to further increase the flatness of the surfaces). A substantially flat surface can be beneficial, for example, as it enables the mold structures 104a and 104b to define a gap volume 116 that is substantially consistent in thickness along the extent of the mold structures 104a and 104b (e.g., having a TTV of 500 nm or less). Thus, the resulting optical films can be flat (e.g., having a total thickness variation [TTV] and/or a local thickness variation [LTV] less than or equal to a particular threshold value, for example less than 500 nm, less than 400 nm, less than 300 nm, etc.). Further, polished mold structures 104a and 104b can be beneficial, for example, in providing smoother optical films for optical imaging applications. As an example, eyepieces constructed from smoother optical films may exhibit improved imaging contrast.

Figure 10:
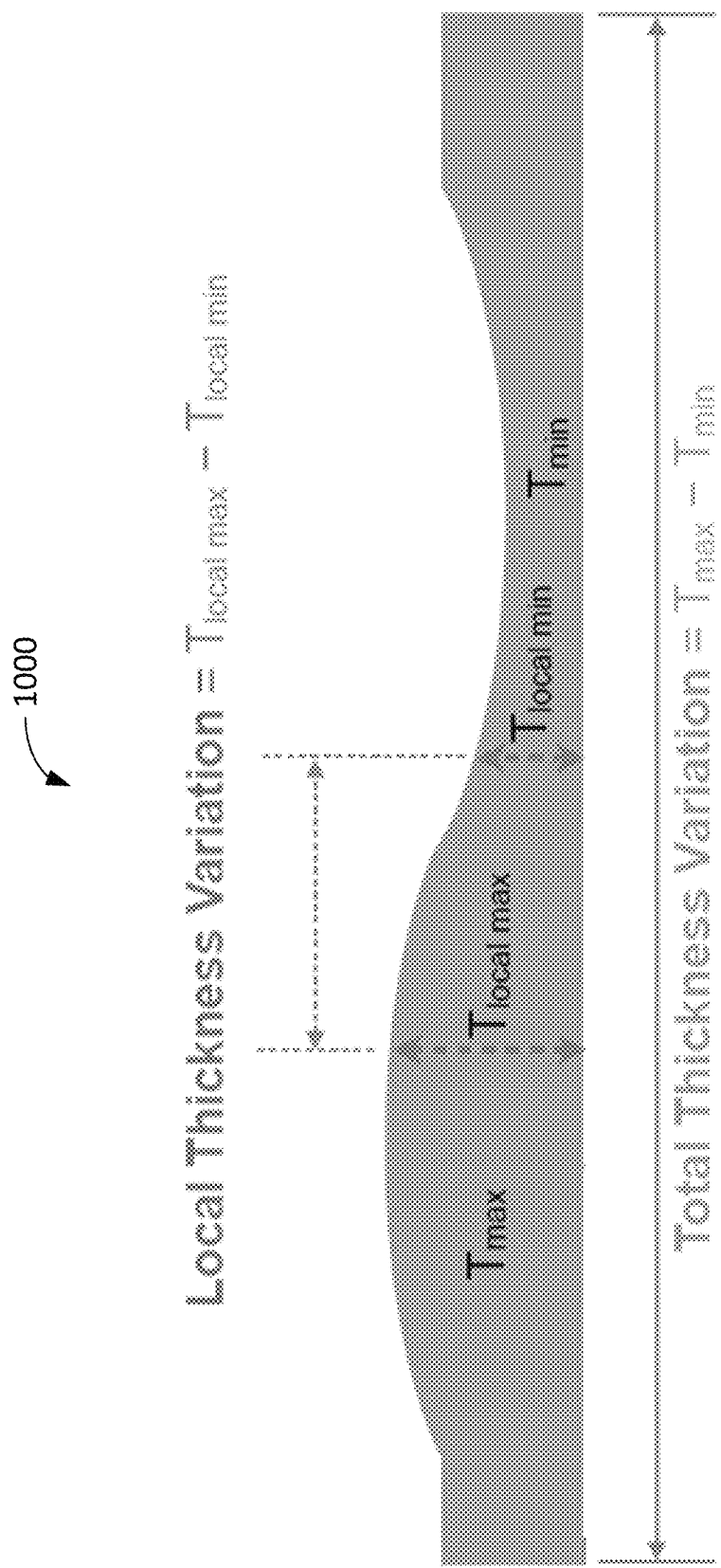
FIG. 10 is a diagram of a cross-section of an example optical film.

The TTV and LTV of an example optical film 1000 are shown in FIG. 10. The TTV of the optical film 1000 refers to the maximum thickness of the optical film 1000 with respect to the entirety of the optical film 1000 ($T_{max}$), minus the minimum thickness of the optical film 1000 with respect to the entirety of the optical film 1000 ($T_{min}$) (e.g., TTV=$T_{max}$-$T_{min}$). The LTV of the optical film 1000 refers to the maximum thickness of the optical film 1000 with respect to a localized portion of the optical film 1000 ($T_{local\ max}$), minus the minimum thickness of optical film 1000 with respect to the localized portion of the optical film 1000 ($T_{local\ min}$) (e.g., LTV=$T_{local\ max}$-$T_{local\ min}$). The size of the localized portion can differ, depending on the application. For example, in some cases, the localized portion can be defined as a portion of the optical film having a particular surface area. For instance, for optical films intended for used as eyepieces in an optical imaging system, the surface area of the localized portion can be an area having a 2.5-inch diameter. In some cases, the surface area of the localized portion can differ, depending on the eyepiece design. In some cases, the surface area of the localized portion can differ, depending on the dimensions and/or features of the optical film.

The mold structures 104a and 104b are also rigid, such that they do not flex or bend during the film production process. The rigidity of the mold structures 104a and 104b can be expressed in terms of its bending stiffness, which is a function of the elastic modulus of the mold structures (E) and the second moment of area of the mold structures (I). In some cases, the mold structures each can have a bending stiffness of 1.5 Nm² or greater.

Further still, the mold structures 104a and 104b can be partially or fully transparent to radiation at one or more wavelengths suitable for photocuring the photocurable material (e.g., between 315 nm and 430 nm). Further still, the mold structures 104a and 104b can the made from a material that is thermally stable (e.g., does not change in size or shape) up to a particular threshold temperature (e.g., up to at least 200° C.). For example, the mold structures 104a and 104b can be made of glass, silicon, quartz, Teflon, and/or poly-dimethyl-siloxane (PDMS), among other materials.

In some cases, the mold structures 104a and 104b can have a thickness greater than a particular threshold value (e.g., thicker than 1 mm, thicker than 2 mm, etc.). This can be beneficial, for example, as a sufficiently thick mold structure is more difficult to bend. Thus, the resulting film is less likely to exhibit irregularities in thickness. In some cases, the thickness of the mold structures 104a and 104b can be within a particular range. For example, each of the mold structures 104a and 104b can be between 1 mm and 50 mm thick. The upper limit of the range could correspond, for example, to limitations of an etching tool used to pattern the mold structures 104a and 104b. In practice, other ranges are also possible, depending on the implementation.

Similarly, in some cases, the mold structures 104a and 104b can have a diameter greater than a particular threshold value (e.g., greater than 3 inches). This can be beneficial, for example, as it enables relatively larger films and/or multiple individual films to be produced simultaneously. Further, if unintended particulate matter is entrapped between the mold structures (e.g., between a spacer structure 124 and an opposing mold structure 104a or 104b, such as at a position 126), its effect on the flatness of the resulting filming film is lessened.

For instance, for mold structures 104a and 104b having a relatively small diameter, a misalignment on one side of the mold structures 104a and 104b (e.g., due to entrapped particulate matter on one of the spacer structures 124, such as at the position 126) may result in a relatively sharper change in thickness in the gap volume 116 along the extent to the mold structures 104a and 104b. Thus, the resulting film or films exhibit more sudden changes in thickness (e.g., a steeper slope in thickness along the length of the film).

However, for mold structures 104a and 104b having a comparatively larger diameter, a misalignment on one side of the mold structures 104a and 104b will result in a more gradual change in thickness in the gap volume 116 along the extent to the mold structures 104a and 104b. Thus, the resulting film or films exhibit less sudden changes in thickness (e.g., a comparatively more gradual slope in thickness along the length of the film). Accordingly, mold structures 104a and 104b having a sufficiently large diameter are more "forgiving" with respect to entrapped particulate matter, and thus can be used to produce more consistent and/or flatter films.

As an example, if a particle of 5 μm or less is entrapped along a point at the periphery of the mold structures 104a and 104b (e.g., at the position 126), and the mold structures 104a and 104b each have a diameter of 8 inches, a gap volume having a horizontal surface area of 2 square inches within the extent of the mold structures 104a and 104b will still have a TTV of 500 nm or less. Thus, if a photocurable material is deposited within the gap volume, the resulting film will similarly exhibit a TTV of 500 nm or less.

The light sources 106a and 106b are configured to generate radiation at one or more wavelengths suitable for photocuring the photocurable material 114. The one or more wavelengths can differ, depending on the type of photocurable material used. For example, in some cases, a photocurable material (e.g., an ultraviolet light-curable liquid silicone elastomer such as Poly(methyl methacrylate) or Poly(dimethylsiloxane)) can be used, and correspondingly the light source can be configured to generate radiation having a wavelength in a range from 315 nm to 430 nm to photocure the photocurable material. In some cases, one or more of the mold structures 104a and 104b can be transparent, or substantially transparent to radiation at the suitable for photocuring the photocurable material 114, such that radiation from the light sources 106a and/or 106b can pass through the mold structures 104a and/or 104b and impinge upon the photocurable material 114.

The control module 110 is communicatively coupled to the actuable stages 102a and 102b, and is configured to control the gap volume 116. For instance, the control module 110 can receive measurements regarding gap volume 116 (e.g., the distance between the mold structures 104a and 104b at one or more locations) from the sensor assembly 122 (e.g., a device having one or more capacitive and/or pressure-sensitive sensor elements) and reposition and/or reorient one or both of the mold structures 104a and 104b in response (e.g., by transmitting commands to the actuable stages 102a and 102b).

As described herein, to improve the quality and consistency of the film, the position of the two molds can be precisely controlled, such that the molds are kept parallel to each other immediately prior to and/or during the curing of the material. In some cases, this can be achieved, at least in part, through the use of physical registration features positioned on one or more of the molds.

As an example as shown in FIG. 1, the system 100 can include one or more spacer structures 124 (e.g., protrusions or gaskets) that project from one or more surfaces of the mold structure (e.g., mold structure 104b) and towards an opposing mold structure (e.g., mold structure 104a). The spacer structures 124 can each have a substantially equal vertical height, such that when the mold structures 104a and 104b are brought together (e.g., pressed together), the spacer structures 124 abut the mold structures 104a and 104b and a substantially flat gap volume 116 is defined between them.

Further, spacer structures 124 can be positioned in proximity to and at least partially enclosing the area of the mold structures 104a and 104b for receiving and curing the photocurable material 114. This can be beneficial, for example, as it enables the system 100 to produce polymer films having a low TTV and/or LTV, without necessarily requiring that a low TTV and/or LTV be maintained across the entirety of the extend of the mold structures 104a and 104b. For example, multiple different polymer films can be produced without the need of achieving low TTV over the entire volume between the mold structures 104a and 104b. Accordingly, the throughput of the production process can be increased.

Figure 2:
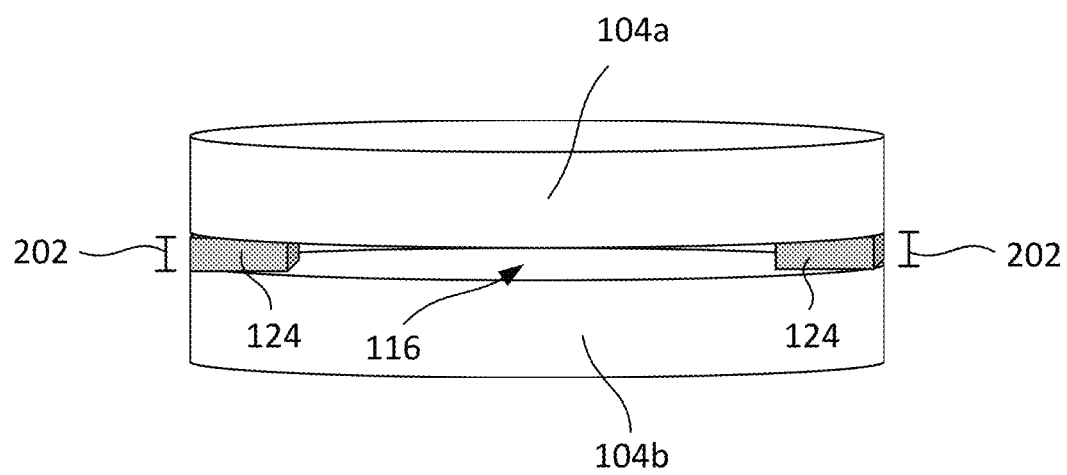
FIG. 2 is a diagram of example mold structures with spacing structures.

For example, FIG. 2 shows an example mold structures 104a and 104b with spacer structures 124 disposed between them. When the mold structures 104a and 104b are brought together, the spacer structures 124 abut the mold structures 104a and 104b and physically obstruct the mold structures 104a and 104b from getting any nearer to each other than the vertical height 202 of the spacer structures 124. As the vertical height 202 of each of the spacer structures 124 is substantially equal, a substantially flat gap volume 116 is defined between the mold structures 104a and 104b. In some cases, the vertical height 202 of the spacer structures 124 can be substantially equal to the desired thickness of the resulting film.

The spacer structures 124 can be constructed from various materials. In some cases, the spacer structures 124 can be constructed from a material that is thermally stable (e.g., does not change in size or shape) up to a particular threshold temperature (e.g., up to at least 200° C.). For example, the spacer structures 124 can be made of glass, silicon, quartz, and/or Teflon, among other materials. In some cases, the spacer structures 124 can be constructed from the same material as the mold structures 104a and/or 104b. In some cases, the spacer structures 124 can be constructed from a different material as the mold structures 104a and/or 104b. In some cases, one or more of the spacer structures 124 can be integrally formed with the mold structures 104a and/or 104b (e.g., etched from the mold structures 104a and/or 104b, imprinted onto the mold structures 104a and/or 104b through a lithographic manufacturing processes, or additively formed onto the mold structures 104a and/or 104b such as through an additive manufacturing processes). In some cases, one or more of the spacer structures 124 can be discrete from the mold structures 104a and/or 104b, and can be secured or affixed to the mold structures 104a and/or 104b (e.g., using glue or other adhesive).

Although two spacer structures 124 are shown in FIG. 2, this is merely an illustrative example. In practice, there can be any number of spacer structures 124 (e.g., one, two, three, four, or more) protruding from the mold structure 104a, the mold structure 104b, or both. Further still, although FIG. 2 shows the spacer structures 124 positioned along a periphery of the mold structures 104a and 104b, in practice, each spacer structures 124 can be positioned anywhere along the extent of the mold structures 104a and 104b.

Figure 3A:
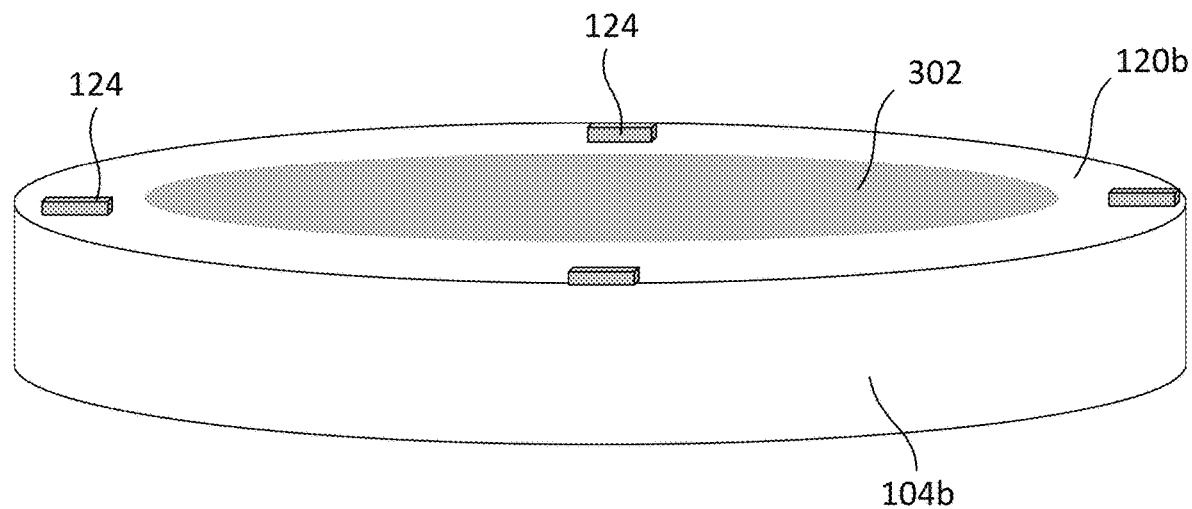
FIGS. 3A and 3B are diagrams of example mold structures and example spacing structures.

For instance, FIG. 3A shows an example mold structure 104b having multiple spacer structures 124 positioned along a periphery of the surface 120b. Further, the spacer structures 124 surround an area 302 of the surface 120b for receiving the photocurable material 114. Accordingly, when a portion of photocurable material 114 is deposited along the area 302 and the mold structure 104b is brought together with another mold structure 104a, the spacer structures 124 abut the mold structures 104a and 104b and physically obstruct the mold structures 104a and 104b from getting any nearer to each other than the vertical height of the spacer structures 124. Thus, when the photocurable material 114 is cured, the resulting film will have a constant height defined by the vertical height of the spacer structures 124.

Figure 3B:
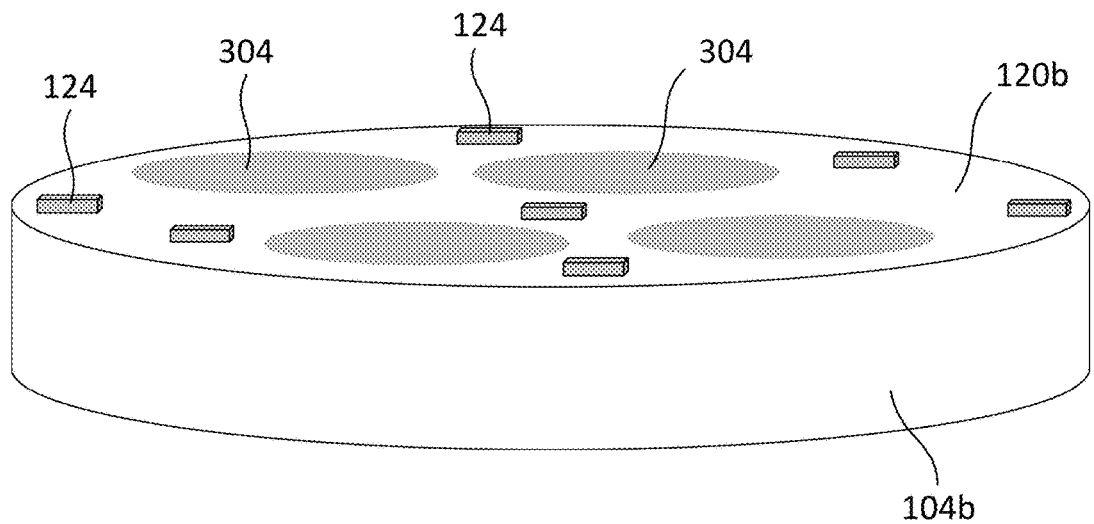

FIG. 3B shows another example mold structure 104b having multiple spacer structures 124. In this example, the spacer structures 124 are positioned along a periphery of the surface 120b, as well as dispersed along an interior of the surface 120b. Further, the spacer structures 124 surround multiple different areas 304 of the surface 120b for receiving the photocurable material 114. Accordingly, when portions of photocurable material 114 is deposited along each of the areas 304 and the mold structure 104b is brought together with another mold structure 104a, the spacer structures 124 abut the mold structures 104a and 104b and physically obstruct the mold structures 104a and 104b from getting any nearer to each other than the vertical height of the spacer structures 124. Thus, when the photocurable material 114 is cured, the resulting films will each have a constant height defined by the vertical height of the spacer structures 124.

In some cases, spacer structures can define a continuous perimeter around an area of the mold structure for receiving photocurable material (e.g., a continuous gasket that surrounds the area). In some cases, spacer structures can define a discontinuous perimeter around an area of the mold structure for receiving photocurable material (e.g., an alternating sequence of protrusions and gaps that that surround the area). In some cases, spacer structures can define one or more continuous perimeters and/or one or more discontinuous perimeters around an area.

Figure 4A:
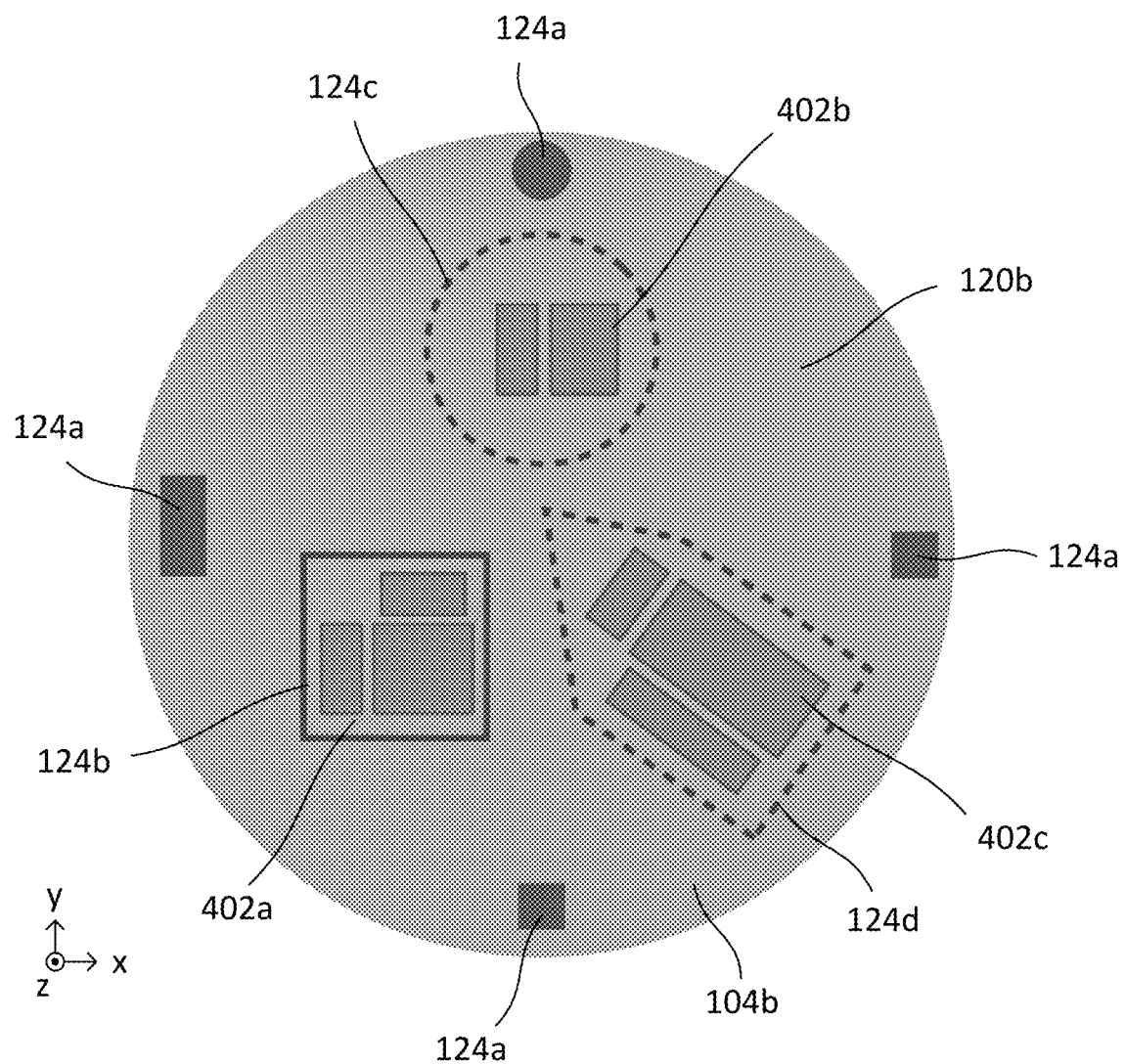
FIGS. 4A and 4B are diagrams of example mold structures and example spacing structures.

As an example, FIG. 4A shows an overhead view of an example mold structure 104b. The mold structure 104b has multiple sets of spacer structures 124a-d. In this example, a first set of spacer structures 124a are positioned along a periphery of the surface 120b. Further, a second set of spacer structures defines a continuous perimeter (e.g., a rectangular perimeter) around a first area 402a for receiving photocurable material 114. Further, a third set of spacer structures 124c defines a discontinuous perimeter (e.g., a circular perimeter) around a second area 402b for receiving photocurable material 114. Further, a fourth set of spacer structures 124d defines another discontinuous perimeter (e.g., a polygonal perimeter) around a third area 402c for receiving photocurable material 114. In this matter, multiple different spacer structures can be positioned along different areas for receiving photocurable materials, such that the resulting films from each of those areas will each have a constant height. Although example perimeter shapes are shown in FIG. 4A, these are merely illustrative examples. In practice, sets of spacer structures can define perimeters having any shape, such as circular shapes, elliptical shapes, rectangular shapes, polygonal shapes, or any other shape.

Figure 4B:
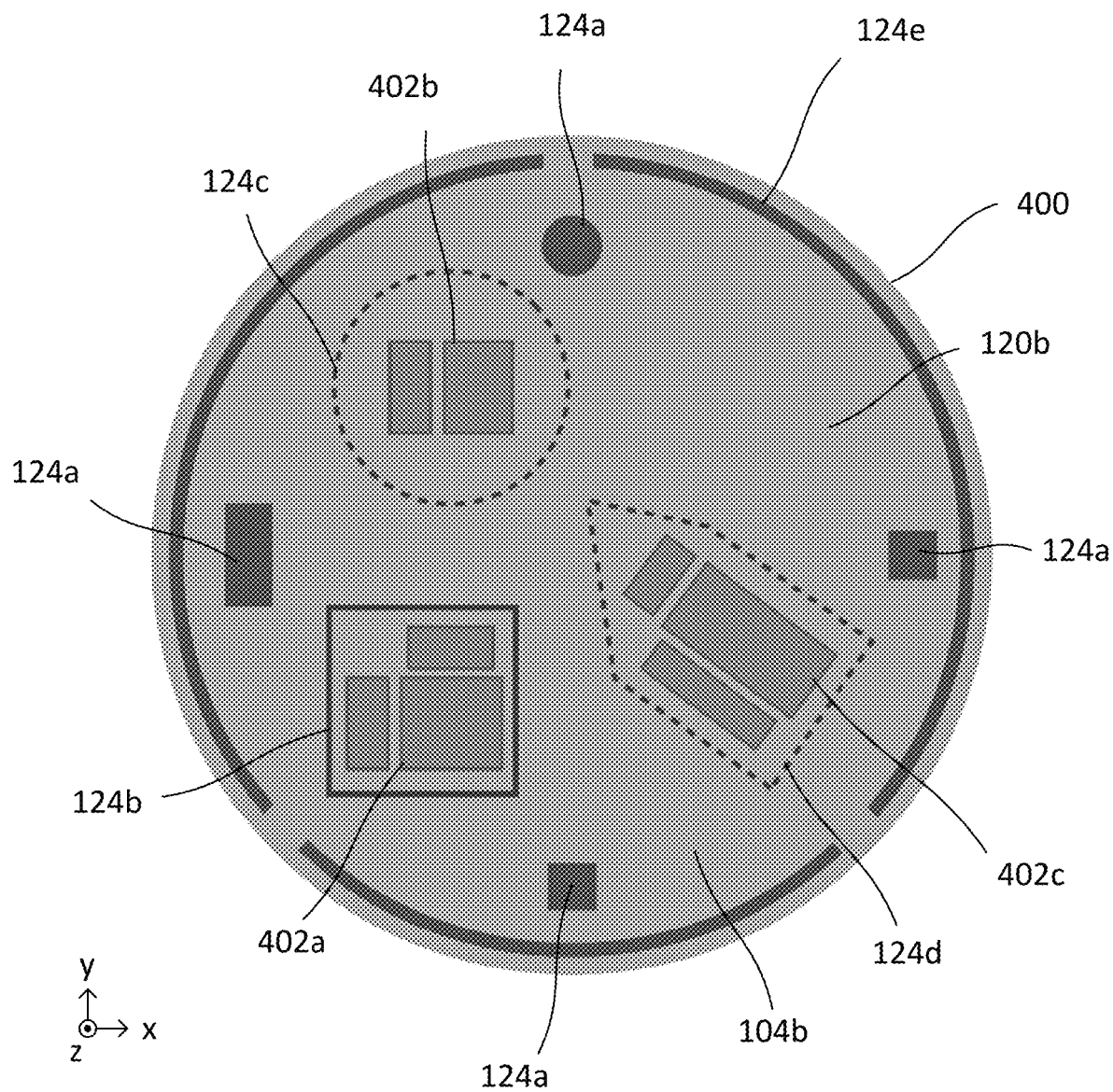

In some cases, spacer structures can define a perimeter along an edge the mold structure. As an example, FIG. 4B shows an overhead view of another example mold structure 104b. The mold structure 104b shown in FIG. 4B is similar in some respects to that shown in FIG. 4A. For example, in FIG. 4B, the mold structure 104b has a first set of spacer structures 124a positioned along a periphery of the surface 120b, a second set of spacer structures defining a continuous perimeter (e.g., a rectangular perimeter) around a first area 402a for receiving photocurable material 114, a third set of spacer structures 124c defining a discontinuous perimeter (e.g., a circular perimeter) around a second area 402b for receiving photocurable material 114, and a fourth set of spacer structures 124d defining another discontinuous perimeter (e.g., a polygonal perimeter) around a third area 402c for receiving photocurable material 114. In this example, however, the mold structure 104b further includes a fifth set of spacer structures 124e defining a discontinuous perimeter (e.g., a circular perimeter defined by four arc-like portions) along an edge 400 of the mold structure 104b. The perimeter defined by the spacer structures 124e encloses each of the other spacer structures of the mold structure 104b (e.g., the spacer structures 124a-d). This set of enclosing spacer structures 124e can be useful, for example, in further controlling the position of the two molds relative to one another. Thus, the quality and consistency of the resulting film can be further improved.

As shown in FIG. 4B, a set of enclosing spacer structures (e.g., the set of spacer structures 124e) can define a discontinuous perimeter. However, this need not be the case. For example, in some cases, a set of enclosing spacer structures can define a continuous perimeter around the other spacer structures of a mold structure. Further as shown in FIG. 4B, a set of enclosing spacer structures can define a circular perimeter. However, this also need not be the case. For example, in some cases, a set of enclosing spacer structure can define other shapes (e.g., a circular shape an elliptical shape, a rectangular shape, a polygonal shape, or any other shape). Further still, in some cases, the shape of the perimeter defined by the set of enclosing spacer structures can be similar to or identical to the shape defined by the edge 400. For example, as shown in FIG. 4B, both can be circular in shape. In some cases, the shape of the perimeter defined by the set of enclosing spacer structures can be different than the shape defined by the edge 400. For example, one can be circular in shape, and the other can be polygonal in shape.

As described herein, in some cases, mold structures can include one or more recesses (e.g., grooves) defined along one or more surfaces of the mold structure that accept one or more spacer structures from an opposing mold structure. The spacer structures and/or recesses can be used to physically align the molds, such that the relative orientation of the mold surfaces are less likely to deviate from the intended orientation. For example, the spacer structures and/or recesses can be used to maintain a parallel orientation between two molds. As a result, the photocurable material has a more even thickness, and is less likely to become distorted.

Figure 5A:
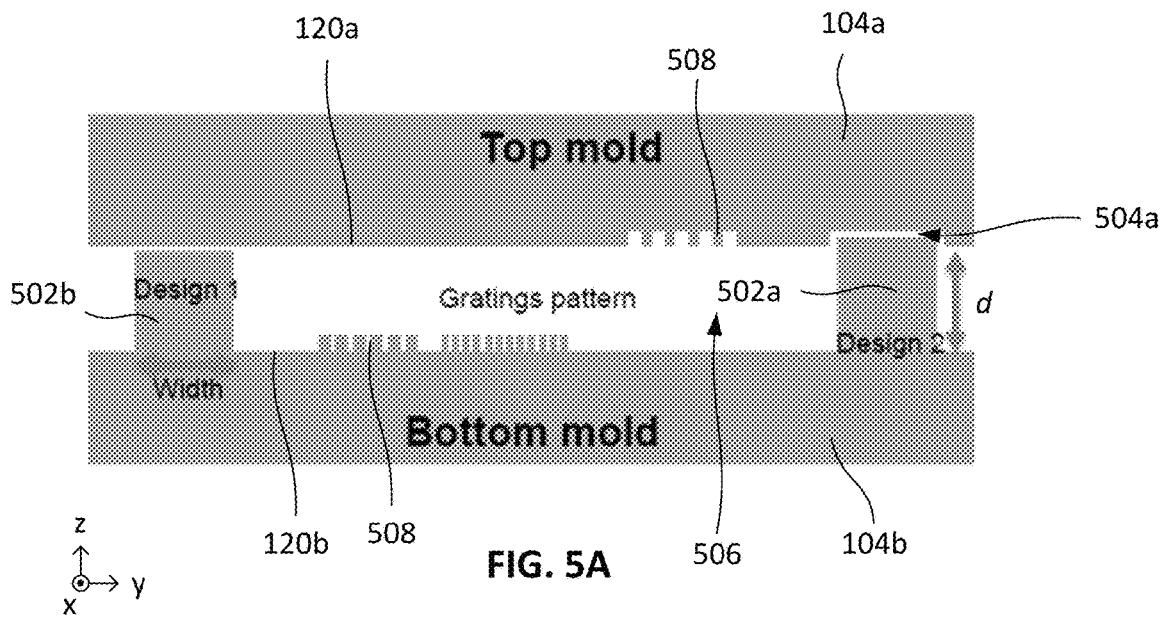
FIGS. 5A and 5B are diagrams of example mold structures, example spacing structures, and example recesses.

As an example, FIG. 5A shows example mold structures 104a and 104b. The mold structure 104b includes spacer structures 502a and 502b positioned along a periphery of the surface 120b. In this example the spacer structure 502a has a corresponding recess 504a defined on the surface 120a of the opposing mold structure 104a, while the spacer structures 504b does not. When portions of photocurable material 114 are deposited along an area 506 and the mold structures 104a and 104b are brought together, the spacer structures 502a and 504a abut the mold structures 104a and 104b and physically obstruct the mold structures 104a and 104b from getting any nearer to each other than either the vertical height of the spacer structure 502b, or the vertical height of the spacer structure 502a minus a vertical depth of the recess structure 504a.

For example, the spacer structure 502a slots or inserts into the recess 504a, which prevents the mold structures 104a and 104b from getting any nearer of each other. Further, due to the walls of the recess 504a, the spacer structure 502a is horizontally secured within the recess 504a. Accordingly, the mold structure 104a and 104b cannot horizontally move with respect to another. As another example, the spacer structure 502b does not have a corresponding recess, and instead directly abuts the surface 120a of the mold structure 104a. Thus, although the spacer structure 502b also prevents the mold structures 104a and 104b from getting any nearer to each other, the spacer structure 502b does not horizontally secure the mold structures 104a and 104b relative to one another.

Further, as shown in FIG. 5A, the mold structures 104a and 104b also define a pattern of gratings 508 along the area 506. Thus, when the photocurable material 114 is cured, the resulting film will have a particular pattern of gratings defined along its length.

Figure 5B:
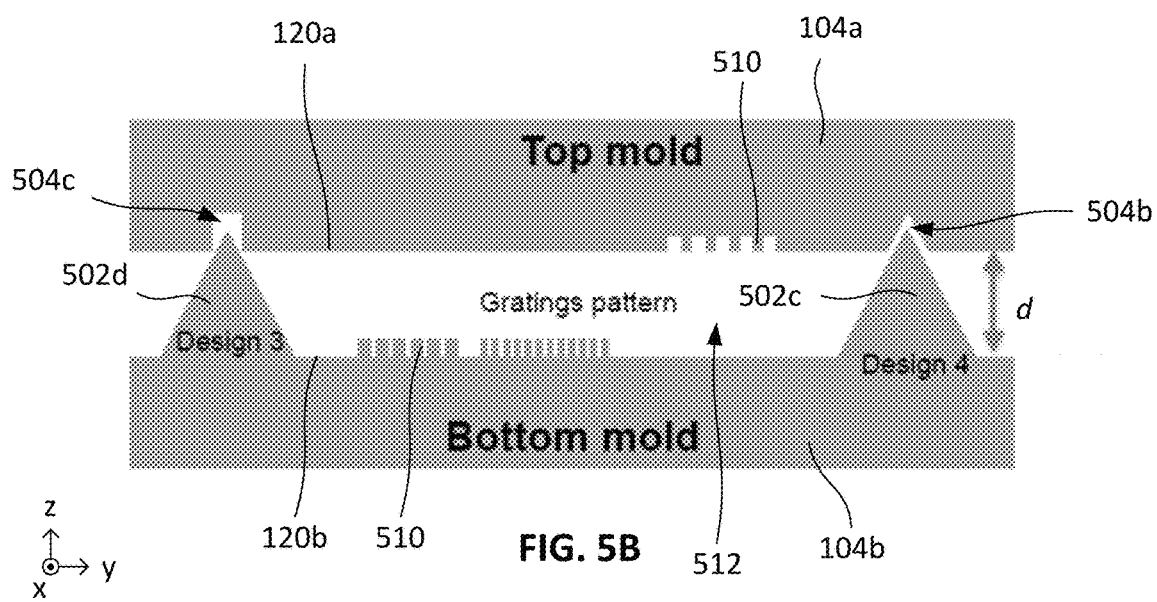

Although example spacer structure and recess shapes as shown in FIG. 5A, these are merely illustrative examples. In practice, the shape of each spacer structure and/or recess can vary, depending on the implementation. As an example, FIG. 5B shows another example mold structure 104a and another example mold structure 104b. In this example, the mold structure 104b includes spacer structures 502c and 502d positioned along a periphery of the surface 120b, each having a corresponding recess 504b and 504c, respectively, defined on the surface 120a of the opposing mold structure 104a.

The spacer structure 502c and the recess 504b have corresponding triangular cross-sections. Accordingly, when the mold structures 104a and 104b are brought together, the spacer structure 502c slots or inserts into the recess 504b, which prevents the mold structures 104a and 104b from getting any nearer of each other than a distance d. Further, due to the walls of the recess 504b, the spacer structure 502b is horizontally secured within the recess 504b. Accordingly, the mold structure 104a and 104b cannot horizontally move with respect to another example.

However, the spacer structures and recesses need not have identical cross-sectional shapes. For example, as shown in FIG. 5B, the spacer structure 502d has a triangular cross-section, and the recess 504c has rectangular cross-section. Although the spacer structure 502d and the recess 504c are different cross-sectional shapes, the recess 504c is configured to receive at least a portion of the spacer structure 502d. Accordingly, when the mold structures 104a and 104b are brought together, the spacer structure 502d slots or inserts partially into the recess 504c, which prevents the mold structures 104a and 104b from getting any nearer of each other than a distance d. Further, due to the walls of the recess 504c, the spacer structure 502d is similarly horizontally secured within the recess 504c. Accordingly, the mold structure 104a and 104b cannot horizontally move with respect to another example.

Similarly, as shown in FIG. 5B, the mold structures 104a and 104b also define a pattern of gratings 510 along an area 512. Thus, when the photocurable material 114 is deposited into the area 512 and cured, the resulting film will have a particular pattern of gratings defined along its length.

The dimensions of each of these features can vary, depending on the implementation. In some implementations, the width of a spacer structure can be between 0.01 cm to 1 cm. In some implementations, the height of a spacer structure can be between 100 μm and 900 μm. The geometry of the spacer structures can be rectangular prism, cylinder, and other three-dimensional shapes (e.g., a complex three-dimensional shape).

Further, each spacer structure and/or recess can be substantially flat. For instance, each spacer structure and/or recess can have a total thickness variation of 100 nm or less, such that when a spacer structure and recess are brought together, the distance between their respective mold structures deviate from an expected or designed distance by 100 nm or less. As an example, for a spacer structure and a recess each having a respective rectangular cross section, the surfaces of the spacer structure and the recesses can be sufficiently flat and accurately formed, such that when they are brought together, the distance between their corresponding mold structures deviate from an expected or designed distance by 100 nm or less. As another example, for a spacer structure having a triangular cross section and a recess having a rectangular cross section (e.g., as shown in FIG. 5B), the slopes of the triangular spacer structure and the surfaces of the recess can be sufficiently flat and accurately formed, such that when the spacer structure and recess are brought together, the distance between their corresponding mold structures deviate from an expected or designed distance by 100 nm or less.

Further, although different spacer structures and recesses are shown in FIGS. 5A and 5B, there are merely illustrative examples. In practice, spacer structures and/or recess having different physical configurations also can be used, either instead or in addition to those shown. As an example, as shown in FIG. 5C, a spacer structure 502e can have a portion 514 with a rectangular cross-section, and a distal end 516 having a substantially hemispherical shape. As another example, as shown in FIG. 5C, a spacer structure 502f can have a portion 518 with a rectangular cross-section, and a number of rounded corners 520 at its distal end 522. As another example, as shown in FIG. 5C, a spacer structure 502g can have a portion 524 with a trapezoidal cross-section (e.g., a triangle shape with a corner removed), and a rounded distal end 526. As another example, a spacer structure can have a substantially polygonal cross-section (e.g., triangular, quadrilateral, pentagonal, hexagonal, etc.) with one or more rounded corners instead of sharp corners.

Similarly, recesses can also include one or more rounded features. As an example, as shown in FIG. 5D, a recess 504e can have a portion 528 with a rectangular cross-section, and an interior end 530 having a substantially hemispherical shape. As another example, as shown in FIG. 5D, a recess 504f can have a portion 532 with a rectangular cross-section, and a number of rounded corners 534 at its interior end 536. As another example, as shown in FIG. 5D, a recess 504g can have a portion 538 with a trapezoidal cross-section (e.g., a triangle shape with a corner removed), and a rounded interior end 540. As another example, a recess can have a substantially polygonal cross-section (e.g., triangular, quadrilateral, pentagonal, hexagonal, etc.) with one or more rounded corners instead of sharp corners.

These configurations can be useful, for example, as they reduce or eliminate the presence of sharp edges or corners in the regions in which the spacer structures interface with their corresponding recesses. Thus, this can reduce wear and tear on the spacer structures and/or the recesses. Further, this can enable the mold structures to better maintain their flatness over repeated usages (e.g., by reducing point contacts between them).

In some cases, the system 100 (via the arrangement of the spacer structures and corresponding recesses on the mold structures) can position the mold structures such that the thickness of the gap volume 116 (e.g., the distance between the mold structures) is between 20 μm and 2 mm. In some cases, the photocurable material 114 can be deposited into at least one of the mold structures 104a and 104b prior to the system 100 positioning the mold structures 104a and 104b against each other at this distance. This can be beneficial, for example, as it may be easier or more convenient to introduce photocurable material 114 while the mold structures are further apart, rather than when they are positioned close together. Nevertheless, in some cases, photocurable material 114 can be deposited into the mold structures after they have been brought together (e.g., through an injection tube or needle positioned through one or more of the mold structures).

In the examples shown in FIGS. 5A and 5B, some of the spacer structures (e.g., spacer structures 502a, 502c, and 502d) are configured to slot or insert, at least partially, into a corresponding recess (e.g., recesses 504a, 504b, and 504c, respectively), such that the spacer structures are horizontally secured within the recesses. In this configuration, the spacer structure is "locked" within a corresponding recess, and cannot move relative to the recess along any horizontal direction.

However, in some cases, spacer structures and recesses can be configured such that in a slotted configuration, the spacer structure retains one or more horizontal degrees of freedom relative to the recess. For example, in some cases, a spacer structure and a recess can be configured such that when the spacer structure is slotted into the recess, the recess prevents the spacer structure from moving with respect to the recess along one or more first horizontal directions, but allows the spacer structure to move with respect to the recess along one or more second horizontal directions.

Figure 6A:
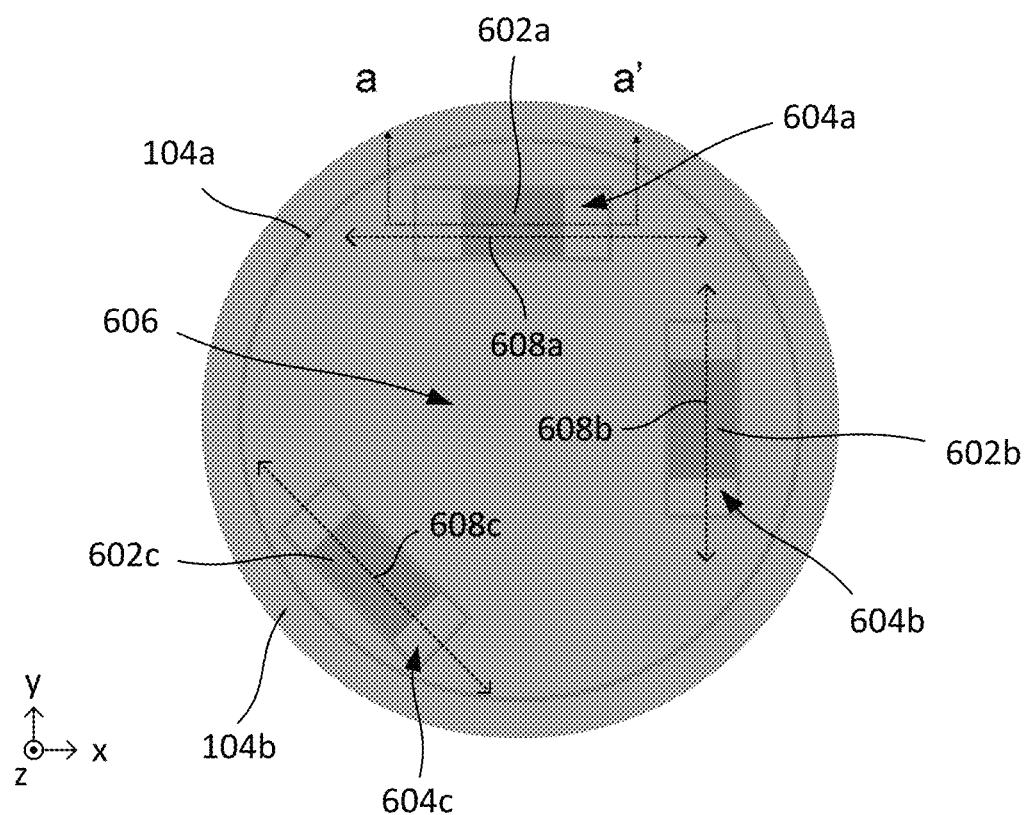
FIGS. 6A and 6B are diagrams of example mold structures, example spacing structures, and example recesses.

As an example, FIG. 6A shows an overhead view of another example mold structure 104a (indicated in outline) overlaid atop another example mold structure 104b (indicated using shaded shapes). The mold structure 104b includes spacer structures 602a-c positioned around an area 606 between the mold structures 104a and 104b. Further, each of the spacer structures 602a-c has a corresponding recess 604a-c defined along the surface of the mold structure 104a. When portions of photocurable material 114 is deposited along the area 606 and the mold structures 104a and 104b are brought together, the spacer structures 602a-c slot into the recesses 604a-c and physically obstruct the mold structures 104a and 104b from getting any nearer to each other.

Figure 6B:
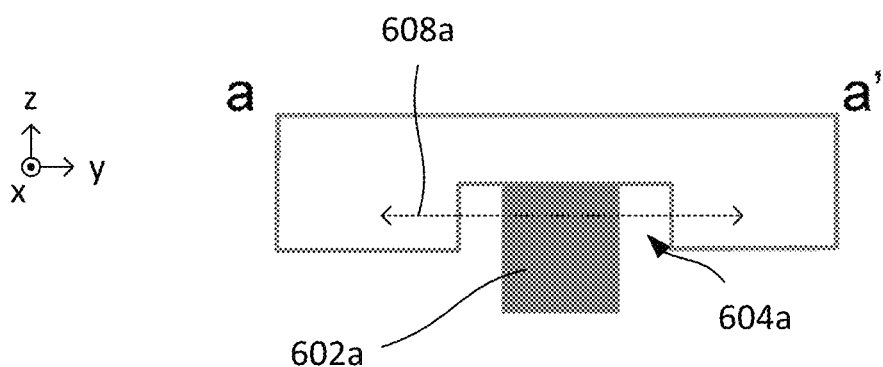

Further, each recess 604a-c has a cross-section area that is larger than its corresponding spacer structure 602a-c, and defines a slot or path along which the spacer structure 602a-c can horizontally translate within it. For example, the recess 604a defines a slot or path that enables the spacer structure 602a to slide within it along a direction 608a. A cross-sectional view of the interaction between the recess 604a and the spacer structure 602a is shown in FIG. 6B. Further, the recess 604b defines a slot or path that enables the spacer structure 602b to slide within it along a direction 608b. Further still, the recess 604c defines a slot or path that enables the spacer structure 602c to slide within it along a direction 608c. However, as the directions 608a-c are not parallel to each other, when all of the spacer structures 602a-c are slotted within their corresponding recesses 604a-c, the mold structures 102a and 102b are horizontally locked to one another. Thus, multiple different sets of spacer structures and recesses can be used to register the position of one mold structure relative to another in a "self-locking" manner.

Nevertheless, in some cases, a spacer structure and a recess can be configured such that when the spacer structure is slotted into the recess, the spacer structure is locked within a corresponding recess, and cannot move relative to the recess along any horizontal direction.

Figure 7A:
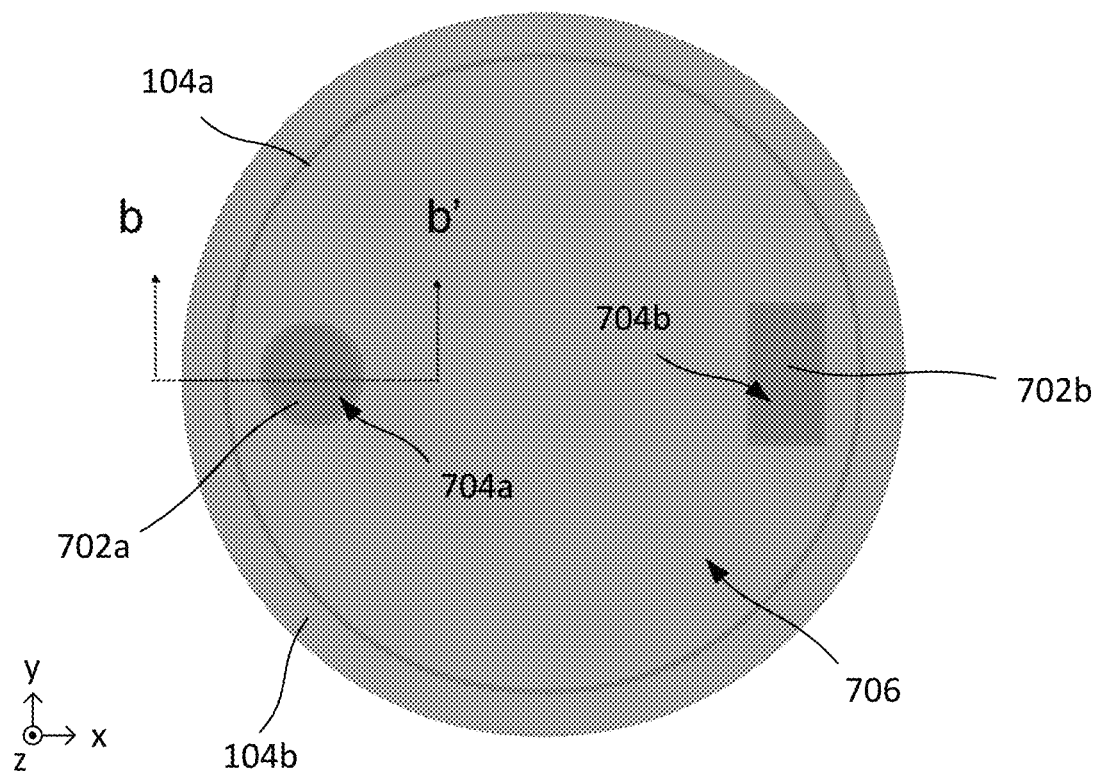
FIGS. 7A and 7B are diagrams of example mold structures, example spacing structures, and example recesses.
Figure 7B:
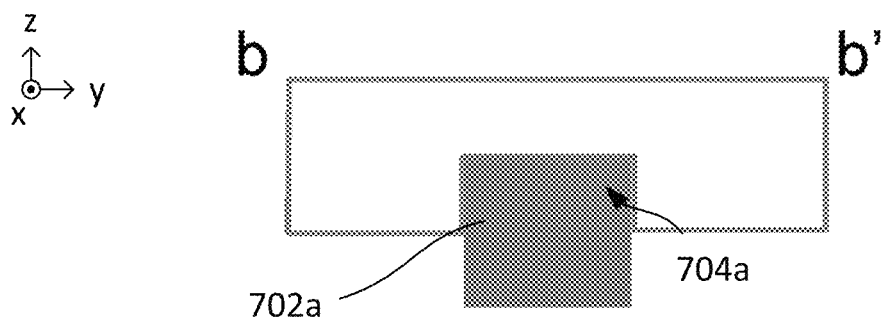

As an example, FIG. 7A shows an overhead view of another example mold structure 104a (indicated in outline) overlaid atop another example mold structure 104b (indicated using shaded shapes). The mold structure 104b includes spacer structures 702a and 702b positioned around an area 706 between the mold structures 104a and 104b. Further, each of the spacer structures 702a and 702b has a corresponding recess 704a and 704b defined along the surface of the mold structure 104a. When portions of photocurable material 114 is deposited along the area 706 and the mold structures 104a and 104b are brought together, the spacer structures 702a and 702b slot into the recesses 704a and 704b and physically obstruct the mold structures 104a and 104b from getting any nearer to each other. Further, each recess 704a and 704b has a cross-sectional area and a shape similar to those of its corresponding spacer structure 702a and 704b. A cross-sectional view of the interaction between the recess 704a and the spacer structure 702a is shown in FIG. 7B. Thus, when each spacer structure 702a and 702b is slotted into its corresponding recess 704a and 704b, it is snuggly retained within the recess and cannot move relative to the recess along any horizontal direction.

Figure 8:
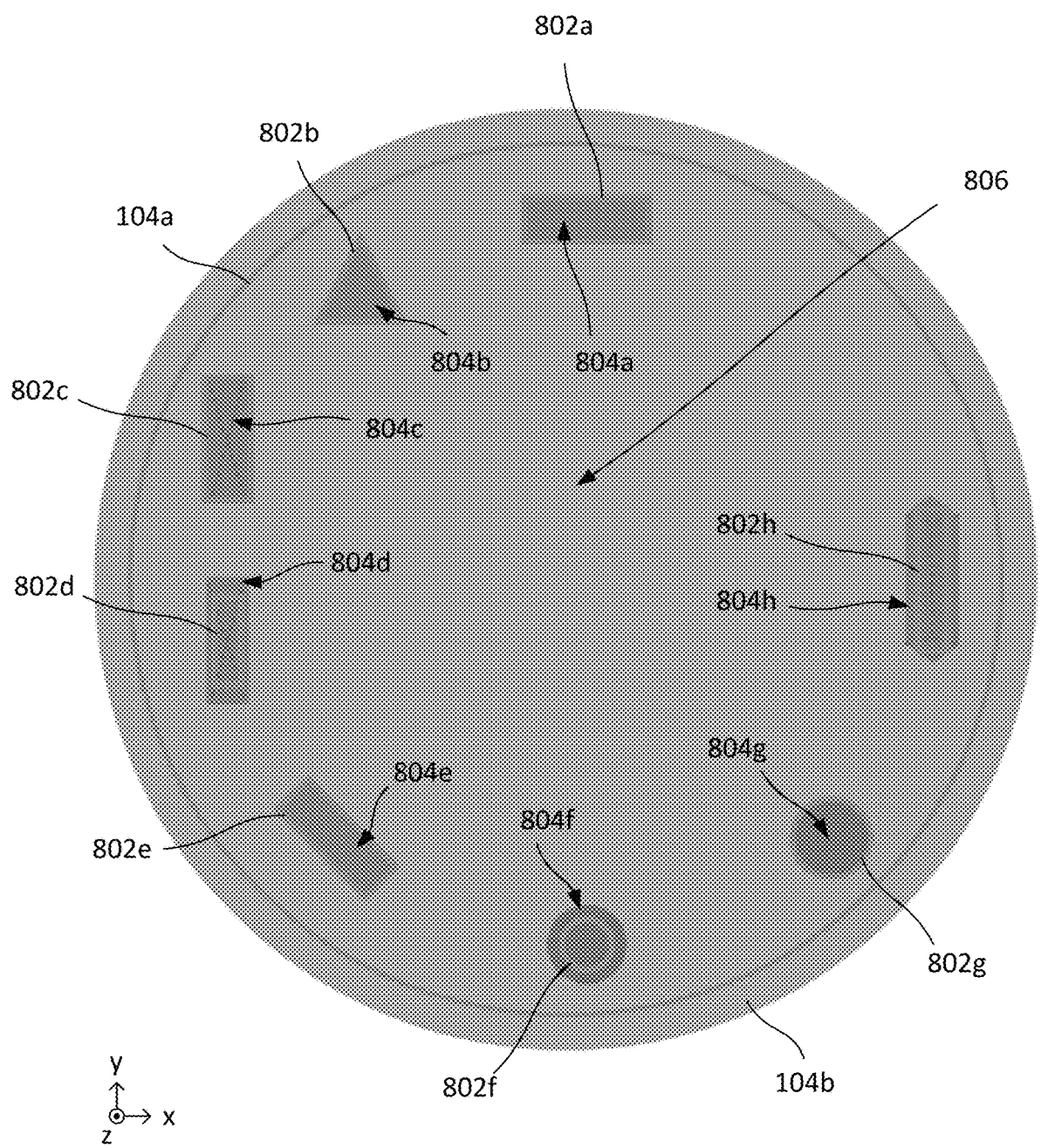
FIG. 8 is a diagram of example mold structures, example, spacing structures, and example recesses.

As described herein, although various example spacer structures and recesses are shown and described, it is understood that any combination of spacer structures and recesses can be used in any particular embodiment. As an example, FIG. 8 shows an overhead view of another example mold structure 104a (indicated in outline) overlaid atop another example mold structure 104b (indicated using shaded shapes). The mold structure 104a includes several different spacer structures 802a-h positioned around an area 806 between the mold structures 104a and 104b. Further, each of the spacer structures 802a-h has a different corresponding recess 804a-h defined along the surface of the mold structure 104b. As shown in FIG. 8, some of the sets of spacer structures and recesses allow for relative horizontal movement with respect to one or more directions (e.g., spacer structure 802d and recess 804d, and spacer structure 802f and recess 804f). Further, some of the sets of spacer structures and recesses do not allow for relative horizontal movement (e.g., the remaining sets of spacer structures and recesses shown in FIG. 8). In practice, other combinations are also possible, depending on the implementation.

Further, although of the examples shown herein include spacer structures protruding from a common mold structure, this need not be the case. In practice, there can be any number of spacer structures (e.g., one, two, three, four, or more) protruding either from a single mold structure or from both mold structures. Further, although of the examples shown herein include recesses defined along a common mold structure, this also need not be the case. In practice, there can be any number of recesses (e.g., one, two, three, four, or more) defined either along a single mold structure or along both mold structures.

In some cases, spacer structures and/or recesses can be formed through lithographical techniques. For example, spacer structures and/or recesses can be patterned through lithography, and etched using dry etch techniques such as reactive ion etch (ME), inductively coupled plasma (ICP) and/or sputter etch techniques. In some cases, spacer structures and/or recesses can be etched in glass, silicon, and/or metal substrates.

Further, in some cases, spacer structures and/or recesses (e.g., those having angled surfaces) can be implemented in glass, fused silica, silicon, metals, or other materials using gray-scale lithography. For example, gray-scale lithography can be used to pattern a three-dimension resist layer as a mask, and transfer the geometries into a substrate by dry etch techniques such as RIE, ICP, and/or sputter etch. For silicon substrates, the angled sidewall surfaces can also be fabricated using wet chemical etching (e.g., to define linear top-view shapes, such as on the on x-y plane, depending on the crystalline orientation of the silicon wafer used). For example, in (100) silicon wafer, the top-view shapes/geometries of the spacer structures and/or recesses will align to the <110> direction, and the sidewall will have 54.7° angle from the horizon. The top-view shapes/geometries can be patterned through lithography, and etched in the z direction using dry etch techniques (e.g., for hard mask) and then using wet etch techniques (e.g., for silicon, such as KOH and TMAH).

In some cases, spacer structures can be formed through additive manufacturing techniques (e.g., 3D printing and two-photon laser printing). In some cases, the printed polymer structures can be directly used as spacer structures. In some case, she printer polymer structures can be used as three-dimension mask layer, and transfer the geometries into a substrate by dry etch techniques such as ME, ICP, and/or sputter etch.

In some cases, a system 100 can also include one or more heating elements to apply heat to a photocurable material during the curing process. This can be beneficial, for example, in facilitating the curing process. For instance, in some cases, both heat and light can be used to cure the photocurable material. For example, the application of heat can be used to accelerate the curing process, make the curing process more efficient, and/or make the curing processes more consistent. In some cases, the curing process can be performed using heat instead of light. For example, the application of heat can be used to cure the photocurable material, and a light source need not be used.

Figure 9:
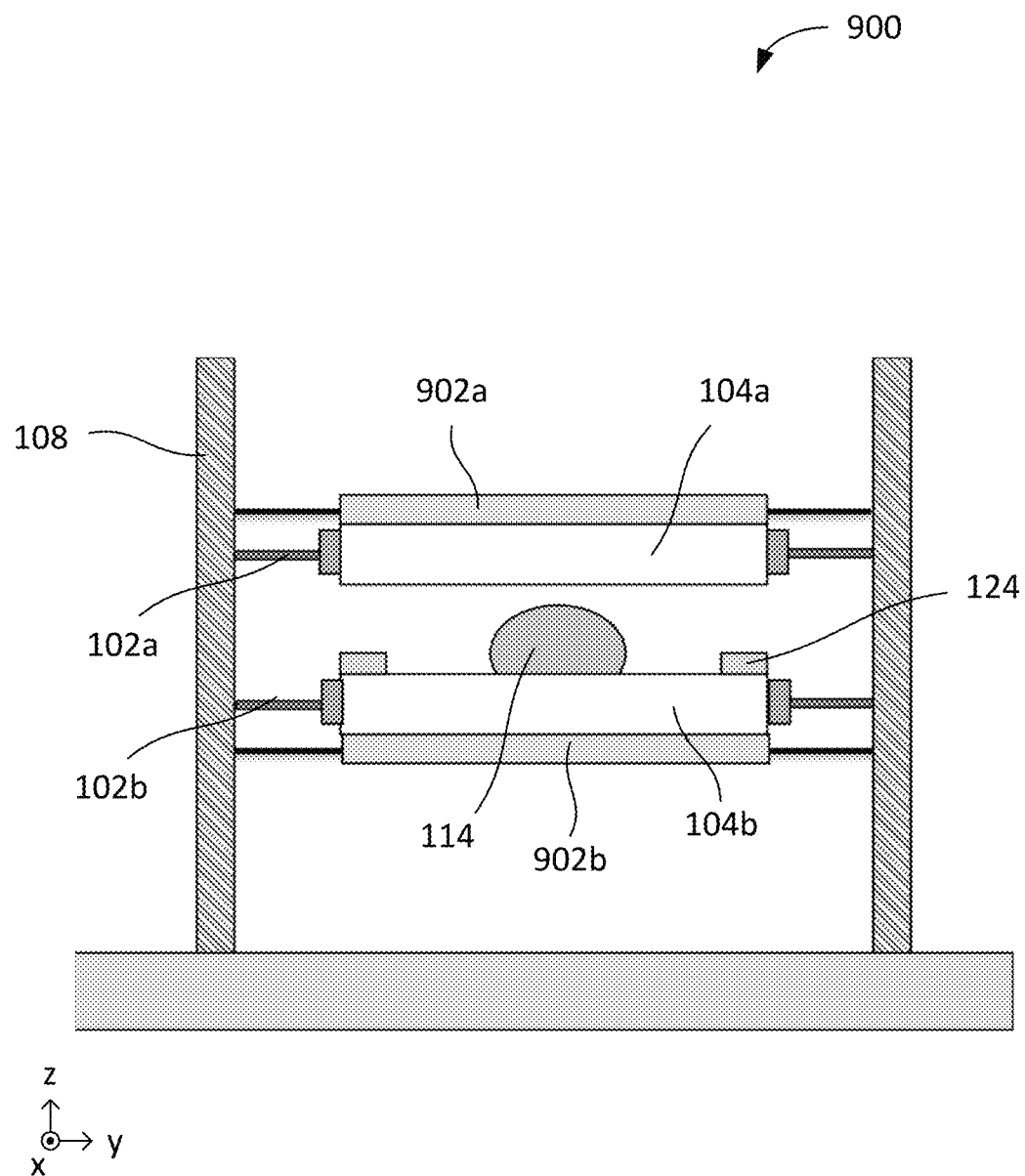
FIG. 9 is a diagram of an example system for producing polymer.

An example system 900 for producing polymer film is shown in FIG. 9. In general, the system 900 can be similar to the system 100 shown in FIG. 1. For example, the system 900 can include two actuable stages 102a and 102b, two mold structures 104a and 104b, a support frame 108, and a control module 110. For ease of illustration, the control module 110 is not shown in FIG. 9.

However, in this example, the system 900 does not include the two light sources 106a and 106b. Instead, it includes two heating elements 902a and 902b, positioned adjacent to the mold structures 104a and 104b, respectively. The heating elements 902a and 902b are configured to move with the mold structures 104a and 104b (e.g., through the actuable stages 102a and 102b), and are configured to apply heat to the photocurable material 114 between the mold structures 104a and 104b during the curing process.

The operation of the heating elements 902a and 902b can be controlled by the control module 110. For example, the control module 110 can be communicatively coupled to the heating elements 902 and 902b, and can selectively apply heat to the photocurable material 114 (e.g., by transmitting commands to the heating elements 902a and 902b).

Example heating elements 902a and 902b metal heating elements (e.g., nichrome or resistance wire), ceramic heating elements (e.g., molybdenum disilicide or PTC ceramic elements), polymer PTC heating elements, composite heating elements, or a combination thereof. In some cases, the heating elements 902a and 902b can include a metal plate to facilitate a uniform transfer heat to the mold structures 104a and 104b.

Although two heating elements 902a and 902b are shown in FIG. 9, in some cases, a system can include any number of heating elements (e.g., one, two, three, four, or more), or none at all. Further, although the system 900 is shown without light sources 106a and 106b, in some cases, a system can include one or more light sources and one or more heating elements in conjunction.

Figure 11:
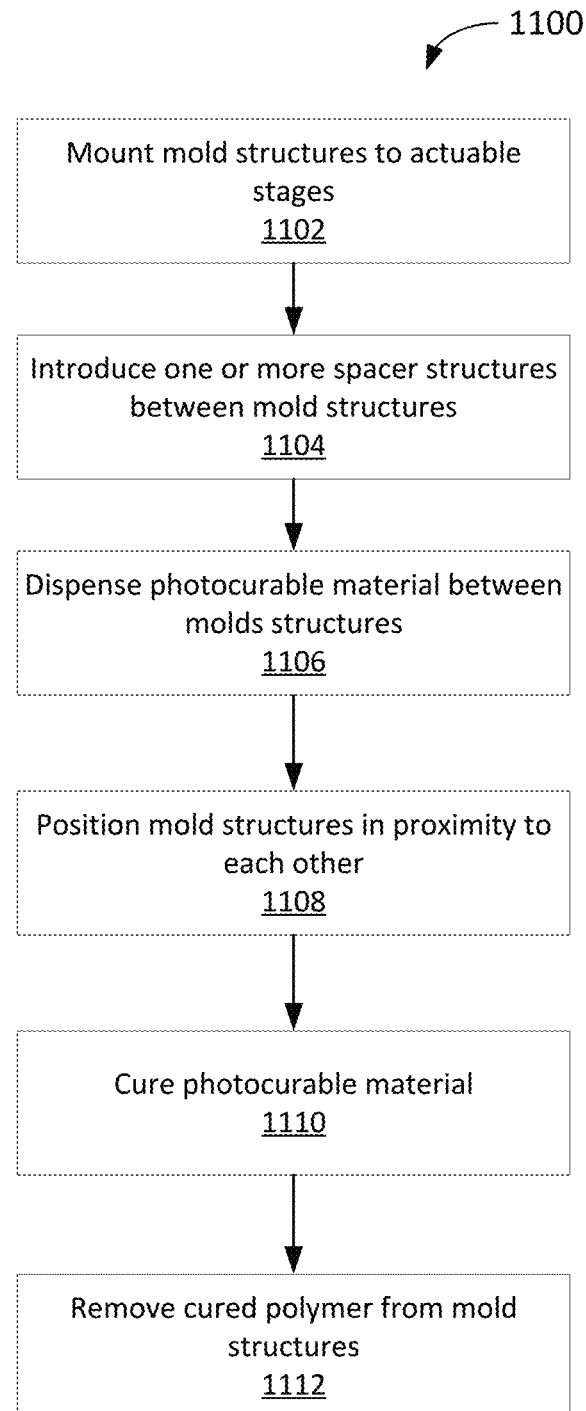
FIG. 11 is a flow chart diagram of an example process for producing a polymer product.

FIG. 11 shows an example process 1100 for producing a polymer product. The process 1100 can be performed, for example, using the systems 100 or 900. In some cases, the process 1100 can be used to produce polymer films suitable for use in optical applications (e.g., as a part of eyepieces in an optical imaging system).

In the process 1100, mold structures are mounted to actuable stages (step 1102). For example, as shown in FIGS. 1 and 9, molds structures 104a and 104b can be mounted to actuable stages 102a and 102b, respectively. The mold structures can be mounted using clamps (e.g., clamps 112a and 112b) or other attachment mechanisms. In some cases, the mold structures can be mounted using electromagnetic or pneumatic clamps that are selectively controlled by a switch and/or a control module.

One or more spacer structures are introduced between the mold structures (step 1104). As described herein, spacer structures can be disposed at various positions between the mold structures (e.g., as shown and described with respect to FIGS. 1-9). In some cases, a spacer structure can be integrally formed with a mold structure (e.g., etched from the mold structures, imprinted onto the mold structures through a lithographic manufacturing processes, or additively formed onto the mold structures such as through addition manufacturing processes). In some cases, a spacer structure can be separate and distinct from the mold structure, and can be individually positioned between the molds structures.

A photocurable material is dispensed between the mold structures (step 1106). Example photocurable materials are described herein (e.g., with respect to FIG. 1). In some cases, photocurable materials can be dispensed along one or more specific positions in a gap volume between the mold positions, such that they are at least partially enclosed by the spacer structures (e.g., as shown and described with respect to FIGS. 3A and 3B).

In some cases, the photocurable material can be dispensed differently, depending on the material. For example, for photocurable materials that shrink a relatively small amount (e.g., less than 10%) during the polymerization process and exhibit mechanical properties that are not dependent on the casting surface area, the photocurable material can be carried out all at once to cover a large area on the mold structure, while avoiding contact between the photocurable material and the spacer structures (e.g., as shown in FIG. 3A).

As another example, for photocurable materials that shrink a relatively larger amount (e.g., greater than 10%) and exhibit mechanical properties that are dependent on the casting surface area, photocurable materials can be dispensed on the bottom mold in metered quantities at multiple different locations, such that individual dispensed "puddles" of the material do not touch each other or the spacer structures (e.g., as shown in FIG. 3B). This can be beneficial, for example, as it reduces the surface area of each individual the casted polymer material, such that each is small enough to shrink freely and cure more efficiently. This can result in a lower TTV and/or LTV, and can enable higher manufacturing throughput.

In some cases, the photocurable materials can be "pre-polymerized" prior to dispensing between the mold structures (e.g., such that they are shrunk, but still are sufficiently fluid to be effectively dispensed between the mold structures). A pre-polymerization process can be performed, for example, by curing the photocurable materials (e.g., using UV light and/or heat) at an energy level that makes the materials viscous yet still able to flow.

The mold structures are positioned in proximity to each other (step 1108). For example, as described with respect to FIGS. 1 and 9, the actuable stages 102a and/or 102b can move the mold structures 104a and/or 104b towards each other, such that the photocurable material 114 is enclosed between them without a gap volume. In some cases, the mold structures 104a and 104b can be positioned such that a mold structure contacts a spacer structure positioned on the opposing mold structure with a particular amount of positive force (e.g., 10 N to 200 N), and locked into place.

The photocurable material is cured (step 1110). In some cases, the photocurable material can be cured using light (e.g., as shown and described with respect to FIG. 1). For example, the top and/or the bottom of the photocurable material can be irradiated with light (e.g., ultraviolet light). In some cases, irradiating both sides of the photocurable material can enable more uniform and faster curing. In some cases, the light intensity can be kept uniform across the area of the photocurable material to reduce non-uniform shrinkage and its potentially adverse consequences on the TTV and/or the LTV of resulting polymer products. In some cases, a diffuser can be positioned between a light source and the photocurable material to improve the uniformity of light.

In some cases, the photocurable material can be cured using heat (e.g., as shown and described with respect to FIG. 9). In some cases, heat can be applied along the top and/or the bottom of the photocurable material. In some cases, heating both sides of the photocurable material can enable more uniform and faster curing. In some cases, metal plates can be positioned between a heating element and a molds structure to facilitate a uniform distribution of heat across the mold structure and the photocurable material.

Further, in some cases, the photocurable material can be cured using both light and heat. As an example, thermal curing can be initiated by exposure to infrared light. For instance, a photocurable material can be chosen on the basis that it absorbs relatively little infrared radiation. Further, the thermal heating of the photocurable material can be localized in the photocurable material itself. This arrangement can be beneficial, for example, in enabling lower molding cycle times as there is less heat to be removed from the mold structure after each curing processes is performed. Further, if the photocurable material requires both thermal and light energy to cure quickly with optimum properties, both sources could be applied from either side or both sides of the mold structures.

After the photocurable material is cured, the resulting product is removed from between the mold structures (step 1112). For example, the mold structures can be positioned further from each other (e.g., using the actuable stages), and the product can be extracted from between them. In some cases, the extracted product can have a particular shape suitable for use in a particular application (e.g., as defined by the mold structures) without requiring a separate singulation process (e.g., separately cutting out a portion of the cured polymer product according to the desired shape). As described herein, in some cases, the product can be a polymer film suitable for use in optical applications (e.g., as a part of eyepieces in an optical imaging system). In some cases, a small opening in spacer structures can be used to evacuate excess photocurable material from between the mold structures.

Figure 12:
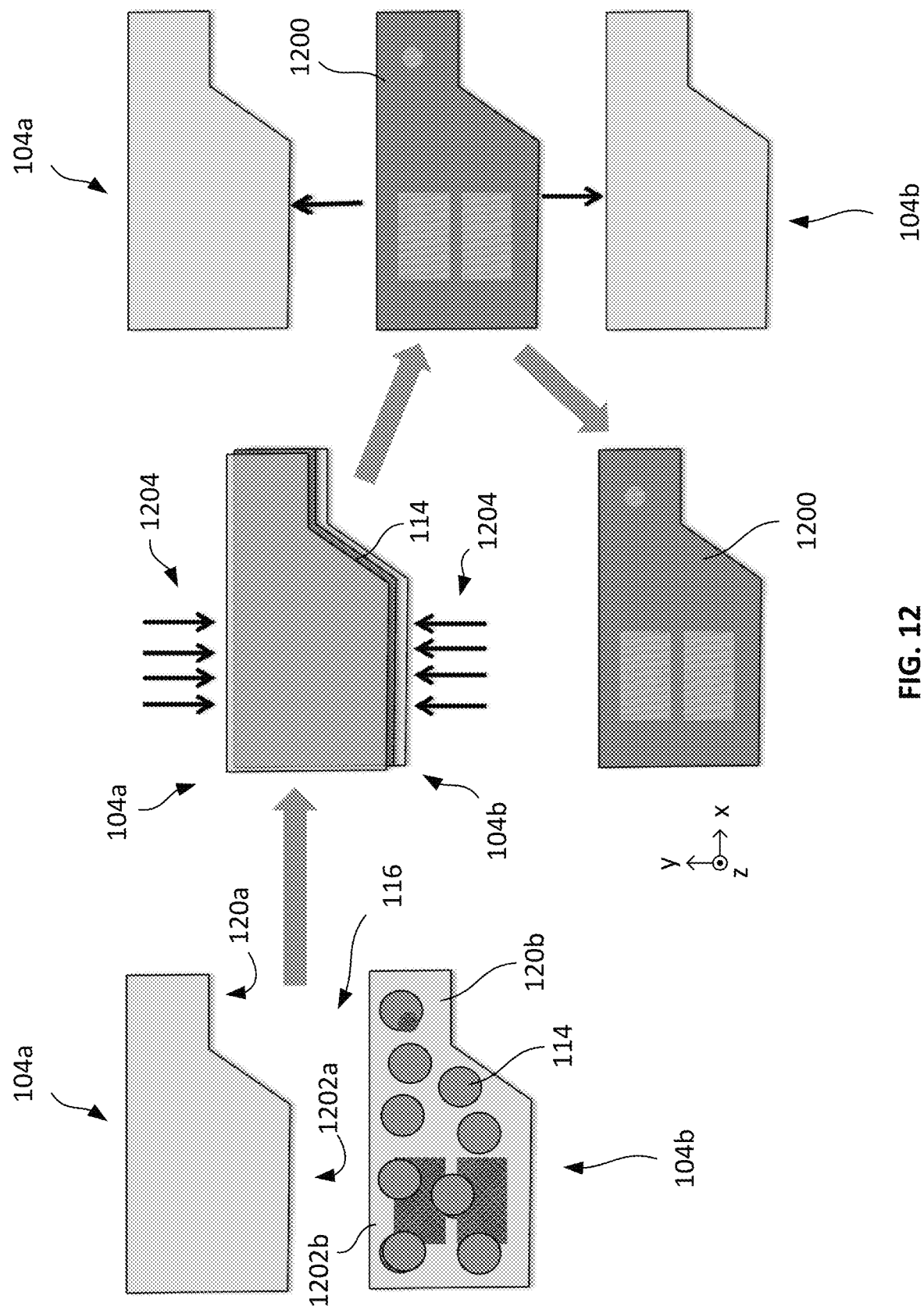
FIG. 12 is a schematic diagram of an example process for producing a single polymer product

As described herein, in some cases, individual polymer products can be produced without performing a singulation process. For example, two molds can be configured such that, when the molds are brought together, they define an enclosed region corresponding to the size and shape of single polymer product. During the production process, a photocurable material is enclosed between the two molds, and the material is cured to form a polymer film. After curing, the polymer film is extracted from the molds, resulting in a single polymer product having a particular predefined size and shape. This polymer product can be subsequently used in other manufacturing processes without the need for an additional singulation step. Accordingly, the polymer product is less likely to have physical and/or chemical damage (e.g., compared to a polymer product formed through singulation of a larger polymer film), and can be more suitable for use in variation-sensitive environments FIG. 12 is a simplified schematic diagram of an example process for producing a single polymer product 1200 using the system 100, without performing a separate singulation process. The process shown in FIG. 12 can be used, for example, to produce optical components, such as waveguides or eyepieces for using a wearable imaging headsets. For ease of illustration, portions of the system 100 have been omitted.

In some cases, the process can be particularly useful for producing waveguides or eyepieces suitable for use in a headset. For instance, the process can be used to produce waveguides or eyepieces having a thickness and/or cross-sectional area that are sufficient to guide light and project light covering a field of view of a headset wearer. As an example, the process can be used to produce polymer products having a thickness of no more than 1000 μm (e.g., as measured along the z-axis of a Cartesian coordinate system), such as 800 μm or less, 600 μm or less, 400 μm or less, 200 μm or less, 100 μm or less, or 50 μm or less, and an area of at least 1 cm$^2$ (e.g., as measured with respect an x-y plane of the Cartesian coordinate system), such as 5 cm$^2$ or more, 10 cm$^2$ or more, such as up to about 100 cm$^2$ or less, and having a predetermined shape. In certain cases, the polymer film can have a dimension of at least 1 cm (e.g., 2 cm or more, 5 cm or more, 8 cm or more, 10 cm or more, such as about 30 cm or less) in at least one direction in the x-y plane.

As shown in the left portion of FIG. 12, mold structure 104a has a surface 120a, and the mold structure 104b has a surface 120b facing the surface 120a of the mold structure 104a. The mold structures 104a and 104b are configured such that, when the molds are brought together, they define an enclosed region corresponding to the size and shape of single polymer product (e.g., a single waveguide or eyepiece). For example, the surface 120a can include a discrete, continuous first area 1202a corresponding to the predetermined size and shape of the polymer product 1200. Similarly, the surface 120b can include a discrete, continuous second area 1202b corresponding to the predetermined size and shape of the polymer product 1200. When the mold structures 104a and 104b are aligned together, they can define a hollow mold region (e.g., a gap volume 116) along the areas 1202a and 1202b corresponding to the size and shape of the polymer product 1200, within which the photocurable material 114 can be deposited and cured into a film. In some cases, the areas 1202 and 1202b can encompass substantially the entirety of the surfaces 120a and 120b, respectively. In some cases, the areas 1202 and 1202b can encompass a portion of the surfaces 120a and 120b, respectively.

As described above, the mold structures 104a and 104b can also define one or more structures in the resulting film. For example, the mold structures 104a and 104b can include one or more protruding structures from the surfaces 120a and/or 120b of the mold structures that impart a corresponding channel in the resulting film. As another example, the mold structures 104a and 104b can include one or more channels defined in the surfaces 120a and/or 120b that impart a corresponding protruding structure in the resulting film. In some cases, the mold structures 104a and 104b can define a particular shape and pattern, such that the resulting film is suitable for use as a waveguide or eyepiece in an optical imaging system (e.g., such that the film has one or more light diffractive microstructures or nanostructures that impart particular optical characteristics to the film).

As shown in the left portion of FIG. 12, photocurable material 114 is dispensed onto the mold structures 104a and/or 104b (e.g., dispensed into a space on or adjacent of the first area 1202a and/or the second area 1202b). In some cases, the photocurable material 114 can be dispensed by a dispensing station or mechanism, such as by one or more pumps, pipettes, injectors, syringes, etc. that selectively dispense a meter amount of photocurable material). The photocurable material 114 can be dispensed according to different patterns. As an example, the photocurable material 114 can be dispensed at multiple different discrete locations along the first area 1202a and/or the second area 1202b. As another example, the photocurable material 114 can be dispensed a single discrete location along the first area 1202a and/or the second area 1202b. In some cases, the photocurable material 114 can dispensed according to a symmetric pattern. In some cases, the photocurable material 114 can be dispensed according to an asymmetric pattern. Further, at each discrete location, the dispensed photocurable material 114 can have a particular size, volume, and shape. Example patterns are shown and described in greater detail with respect to FIGS. 13A-13E. In some cases, photocurable material 114 can be dispensed along a single mold structure (e.g., the bottom mold structure 104b). In some cases, photocurable material 114 can be dispensed along both mold structures.

As shown in the upper middle portion of FIG. 12, the mold structures 104a and 104b are moved into proximity with one another (e.g., by moving the actuale stages 102a and/or 102b described with respect to FIG. 1), such that the photocurable material 114 is enclosed by the mold structures 104a and 104b. The photocurable material 114 can be held in place by surface tension of the photocurable material 114 and/or adhesive forces between the photocurable material 114 and the mold structures 104a and 104b. Further the confinement of the photocurable material 114 between the mold structures 104a and 104b can be controlled by dispensing a metered volume of the photocurable material 114 (e.g., corresponding to the volume between the first area 1202a and the second area 1202b). The photocurable material 114 is then cured (e.g., by irradiating the photocurable material 114 with light 1204 suitable for photocuring the photocurable material 114), forming a polymer product 1200 having one or more features defined by the mold structures 104a and 104b.

As shown in the right portion of FIG. 12, after the photocurable material 114 has been cured, the mold structures 104a and 104b are moved away from each other (e.g., by moving the actuable stages 102a and/or 102b). The polymer product 1200 is then extracted (e.g., as shown in the lower middle portion of FIG. 12).

As described above, the first area 1202a and second area 1202b each correspond to the predetermined size and shape of the polymer product 1200. Accordingly, the polymer product 1200 is produced without the need to perform a separate singulation process. In some cases, after extraction, the polymer product 1200 can be directly used in other manufacturing processes (e.g., incorporated into an apparatus, such as a headset).

Figure 13A:
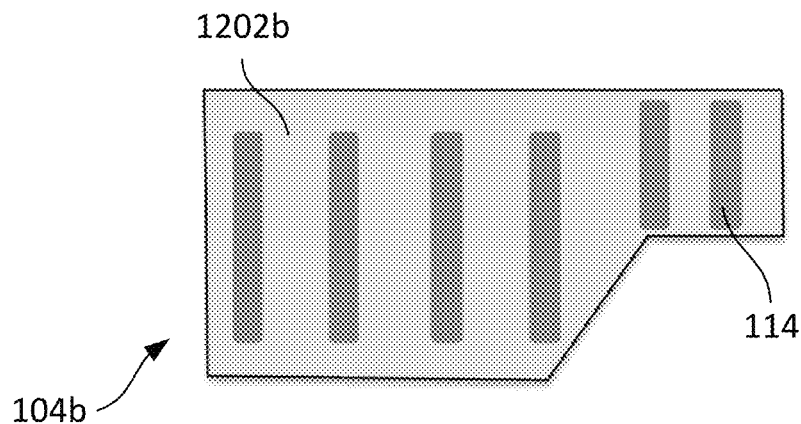
FIGS. 13A-13E are diagrams of example patterns for dispensing photocurable material.
Figure 13B:
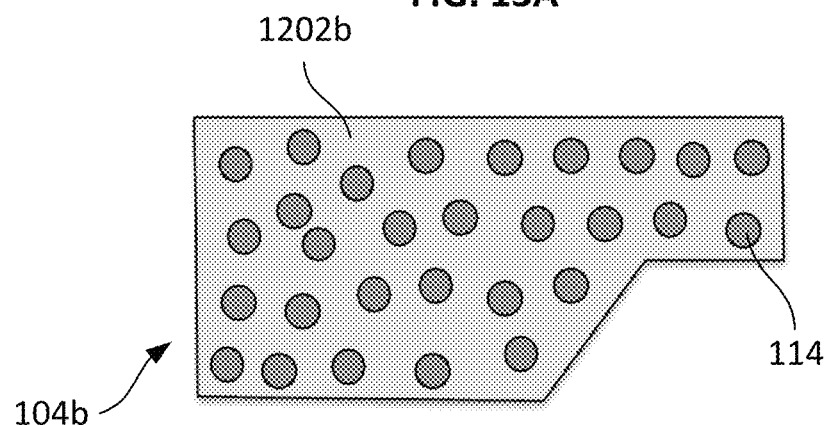
Figure 13C:
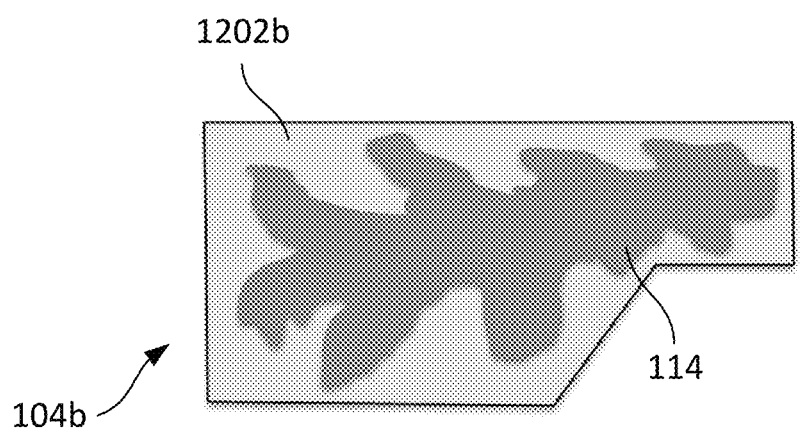

As described above, photocurable material 114 can be dispensed onto the mold structures 104a and/or 104b according to different patterns. Several example patterns are shown in FIGS. 13A-13E. For ease of illustration, only a single mold structure 104b is shown in FIG. 13A-13C. However, it is understood that photocurable material 114 can be dispensed into spaces on or adjacent of the mold structure 104a, the mold structure 104b, or both.

As shown in FIG. 13A, photocurable material 114 can be dispensed according to one or more lines. In practice, the number and arrangement of lines can vary. For example, photocurable material 114 can be dispensed according to one, two, three, or more lines. Further, each line can extend horizontally, vertically, or according to an angle. In some cases, lines can be eventually distributed along a mold structure (e.g., spaced evenly from one another). In some cases, lines can be distributed according to some other pattern (e.g., spaced unevenly from one another). In some cases, each of the lines can have a similar thickness and/or length. In some cases, one or more of the lines can differ with respect to thickness and/or length. Further, lines need not be straight. For example, one or more lines can be curved or arced. Further, in some cases, two or more lines can overlap one another.

As shown in FIG. 13B, photocurable material 114 also can be dispensed according to one or more drops (e.g., substantially ovular or circular deposits). In practice, the number and arrangement of dots can vary. For example, photocurable material 114 can be dispensed according to one, two, three, or more drops. In some cases, dots can be eventually distributed along a mold structure (e.g., spaced evenly from one another). In some cases, drops can be distributed according to some other pattern (e.g., spaced unevenly from one another). In some cases, each of the drops can have a similar size and/or shape. In some cases, one or more of the drops can differ with respect to size and/or shape. Further, in some cases, two or more drops can overlap one another.

As shown in FIG. 13C, photocurable material 114 also can be dispensed according to other patterns, such as a free form pattern. In practice, a free form pattern can vary. For example, photocurable material 114 can be dispensed at one, two, three, or more discrete locations. Further, the size and shape of each free form pattern can vary. Further, in some cases, two or more free form patterns can overlap one another.

Although lines, drops, and free form patterns are shown separately with respect to FIGS. 13A-13C, in some cases, photocurable material 114 also can be dispensed according to one or more of lines, drops, and/or free form patterns in combination with respect to a particular mold structure.

Further, in some cases, the dispense pattern of the photocurable material 114 can correspond to one or more localized features along the areas 1202a and/or 1202b. For example, if areas 1202a and/or 1202b define a feature having a relatively larger volume at a particular location (e.g., defining a thicker portion of the polymer product), the dispense pattern can include more photocurable material 114 at that location. As another example, if areas 1202a and/or 1202b define a feature having a relatively smaller volume at a particular location (e.g., defining a thinner portion of the polymer product), the dispense pattern can include less photocurable material 114 at that location.

In some cases, the total volume of dispensed photocurable material 114 can be precisely metered or regulated, such that the photocurable material 114 evenly spreads across the areas 1202a and 1202b, without substantially leaking beyond the areas 1202a and/or 1202b. This can be useful, for example, in reducing or eliminating material waste. Further, this improves the consistency of the resulting polymer product (e.g., the polymer product need not be cut or trimmed to remove excess photocurable material that has cured beyond the areas 1202a and/or 1202b). In some cases, the total volume of dispensed photocurable material 114 can be substantially equal to the volume between the areas 1202 and 1202*b* when the mold structures 104*a* and 104*b* and aligned.

Figure 13D:
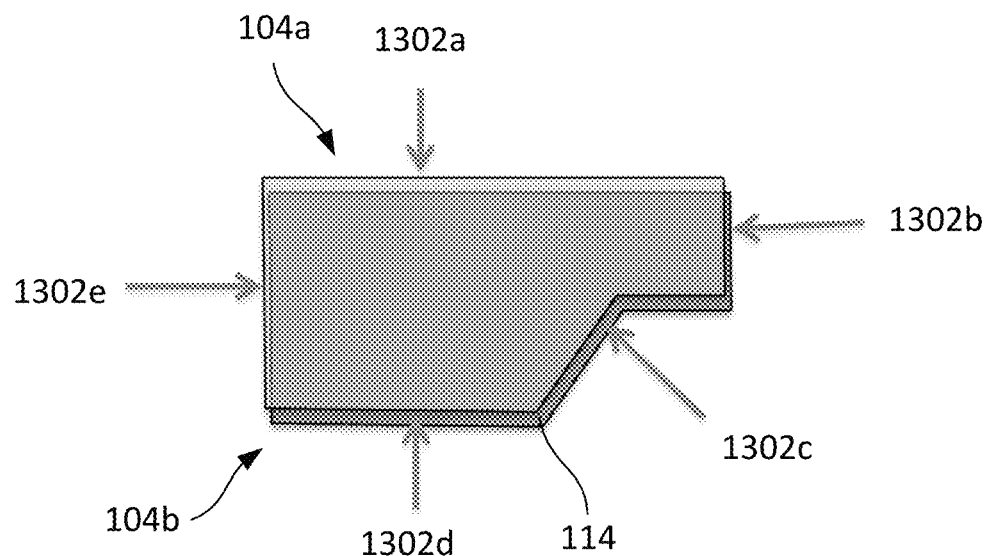

In some cases, photocurable material 114 can be dispensed between the mold structures 104*a* and 104*b* after the mold structures 104*a* and 104*b* have already been aligned. As an example, FIG. 13D shows two mold structures 104*a* and 104*b* in alignment. Photocurable material 114 is dispensed between the mold structures 104*a* and 104*b* by injecting the photocurable material 114 at one or more locations 1302*a-e* along the sides of the mold structures 104*a* and 104*b*. The injected photocurable material 114 spreads between the mold structures 104*a* and 104*b* through capillary action. In some cases, different amounts of photocurable material 114 can be injected at different locations along the sides of the mold structures 104*a* and 104*b* to facilitate uniform spreading. Although five locations 1302*a-e* are shown in FIG. 13D, these are merely illustrative examples. In practice, photocurable material 114 can be injected at one or more other locations, either instead of or in addition to those shown in FIG. 13D.

Figure 13E:
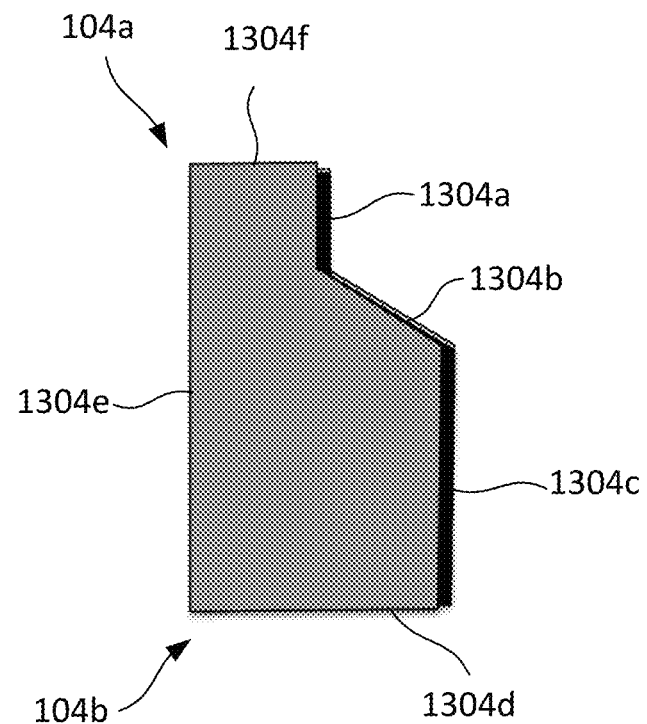

In some cases, one or more of the edges between the mold structures 104*a* and 104*b* can be sealed to restrict the flow of injected photocurable material 114. For example, FIG. 13E shows two mold structures 104*a* and 104*b* in alignment. The edges 1304*a-e* are sealed (e.g., the mold structures 104*a* and 104*b* are joined together along these edges), while the edge 1304*f* is open and exposed (e.g., the mold structures 104*a* and 104 remain separate along this edge). The photocurable material 114 can be injected along the edge 1304*f* to fill the volume between the mold structures 104*a* and 104*b*. In this configuration, the mold structures 104*a* and 104*b* can be arranged vertically, such that the exposed edge 1304*f* is positioned along the top of the mold structures 104*a* and 104*b* (e.g., to prevent the photocurable material 114 from pouring out). The photocurable material 114 can be cured by directing light horizontally (e.g., through the mold structures 104*a* and/or 104*b*) instead of vertically (e.g., as shown in FIG. 1). Further, in some cases, edges can be reversibly sealed (e.g., using peelable glue or tape). Further still, one or more sealed edges can be exposed before or during the curing process (e.g., to remove excess materials and/or to release any stresses developed during the curing process). Although an example arrangement of sealed and exposed edges are shown in FIG. 13E, this is merely an illustrative example. In practice, another arrangements of sealed and exposed edges are also possible, depending on the implementation.

As described above, spacer structures can be used to regulate the spacing between the mold structures 104*a* and 104*b*. Spacer structures can be useful, for example, to control the relative orientation of the mold surfaces, such that the resulting polymer products are less likely to deviate from their intended shape. Further, the resulting polymer products are less likely to become distorted (e.g., wrinkled, stretched, or compressed) during production.

In some cases, the spacer structures can be placed beyond the areas 1202*a* and 1202*b* of the mold structures 104*a* and 104*b*, such that the photocurable material 114 does not come into contact with the spacer structures during the production process. This can be beneficial, for example, in improving the quality of polymer product (e.g., by reducing unintended variation due to interference between the spacer structures and the photocurable material 114).

Figure 14:
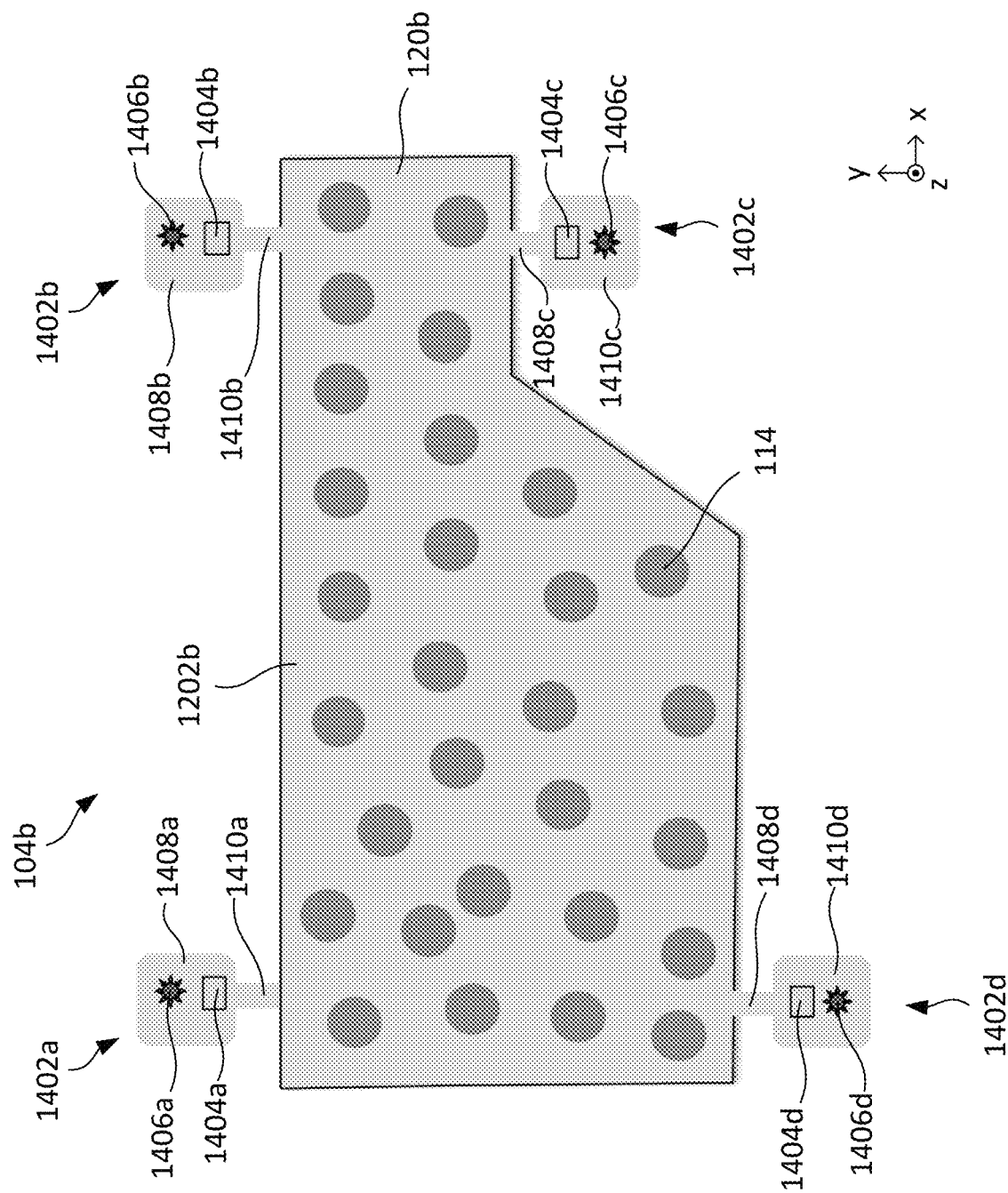
FIG. 14 is a diagram of an example mold structure.

As an example, FIG. 14 shows a mold structure 104*b* having a surface 120*b*. The surface 120*b* includes a discrete, continuous area 1202*b* corresponding to the predetermined size and shape of a polymer product (e.g., as described with respect to FIG. 12). In this example, the mold structure 104*b* also includes several protrusions 1402*a-d* extending beyond the periphery of the area 1202*b*. Each protrusion 1402*a-d* includes a respective spacer structure 1404*a-d* and a respective fiducial feature 1406*a-d*.

The spacer structures 1404*a-d* can be similar to those described with respect to FIGS. 1 and 2. For example, the spacer structures 1404*a-d* can that project from the mold structure 104*b* and towards an opposing mold structure (e.g., the mold structure 104*a*). Further, the spacer structures 1404*a-d* can each have a substantially equal vertical height, such that when the mold structures 104*a* and 104*b* are brought together (e.g., pressed together), the spacer structures 1404*a-d* abut the mold structures 104*a* and 104*b* and a substantially flat gap volume is defined between them. Further, as the spacer structures 1404*a-d* are positioned beyond the area 1202*b*, they are less likely to come into contact with photocurable material 114 during the production process. Thus, the resulting polymer products are less likely to become distorted.

The fiducial features 1406*a-d* are structures or markings that can be used to align the mold structure 104*b* with the mold structure 104*a*. For example, the fiducial features 1406*a-d* can include one or more visually distinctive structures (e.g., contrasting structural patterns) or markings (e.g., contrasting patterns and/or colors indicated by ink, paint, layers, etc.) that enable the system 100 to detect the spatial location and/or orientation of the mold structure 104*b* (e.g., using a visual registration system, such as one including or more cameras or optical sensors). Based on this information, the system 100 can manipulate the mold structure 104*b* to control the relative position and orientation between the mold structure 104*a* and the mold structure 104*b*.

As shown in FIG. 14, each of the protrusions 1402*a-d* include a platform 1408*a-d* (upon which the spacer structures 1404*a-d* and the fiducial features 1406*a-d* are positioned), and a bridge 1410*a-d* extending between the platform 1408*a-d* and the area 1202*b*. The width of the bridge 1410*a-d* is narrower than the width of the platform 1408*a-d* (e.g., on the plane of the area 1202*b*). This is beneficial, for example, as it further isolates the spacer structures 1404*a-d* from the photocurable material 114 in the area 1202*b*. For example, compared to a wider bridge, a narrower bridge better restricts the flow of photocurable material across it.

Although FIG. 14 only shows a single mold structure 104*b*, it is understood that the mold structure 104*a* can also include one or more features similar to those shown in FIG. 14 (e.g., protrusions, spacer structures, fiducial features, etc.). Further, although FIG. 14 shows a particular number of each type of feature and particular locations for these features, these are merely illustrative examples. In practice, the number of each type of feature and/or the locations for each feature can differ, depending on the implementation.

In some cases, a mold structure can include chemical and/or structural features that restrict the flow of photocurable material beyond the area corresponding to the defined size and shape of the polymer product. This can be useful, for example, in reducing or eliminating material waste. Further, this improves the consistency of the resulting polymer product (e.g., the polymer product need not be cut or trimmed to remove excess photocurable material that has cured beyond the area).

Figure 15:
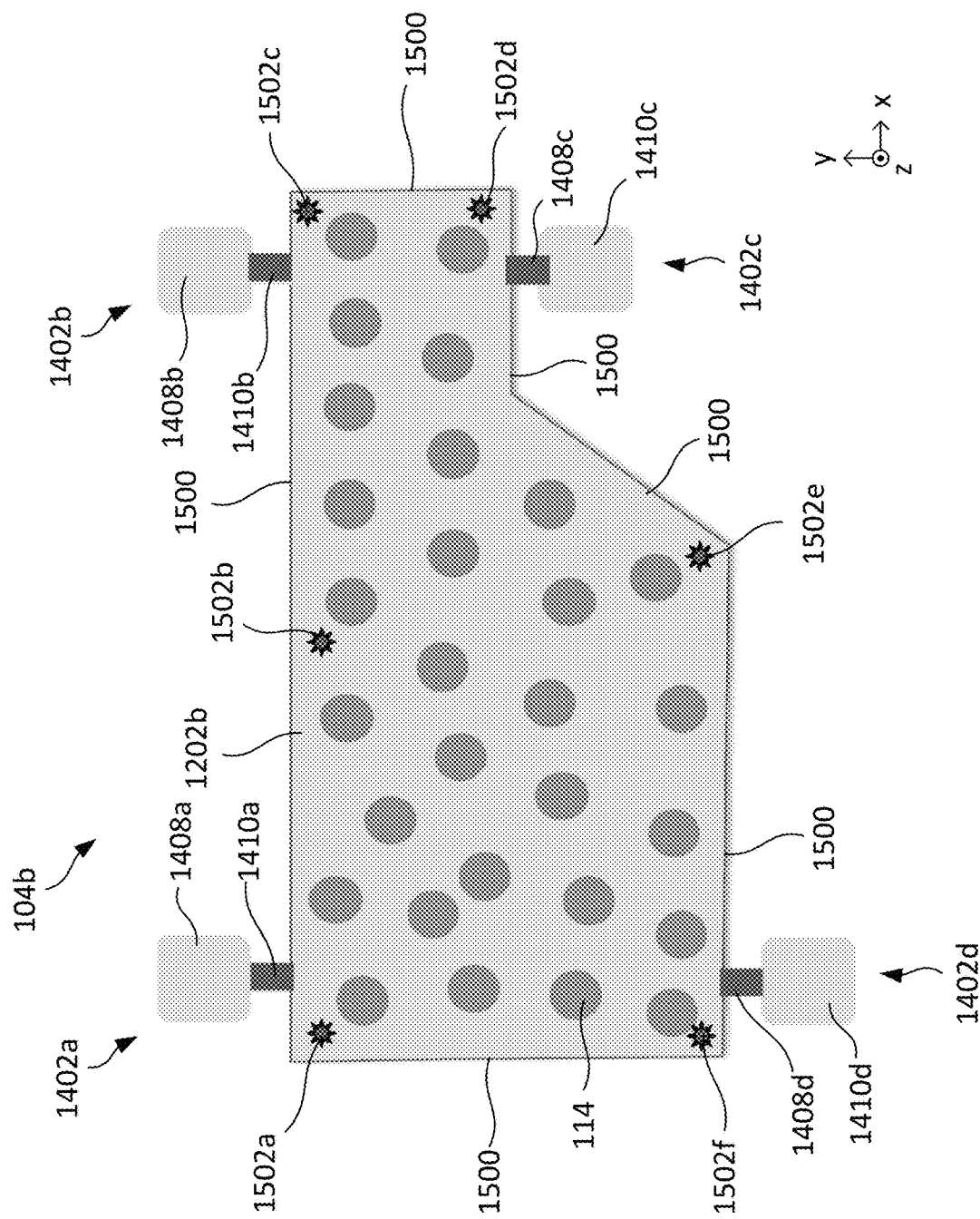
FIG. 15 is a diagram of another example mold structure.

As an example, FIG. 15 shows a mold structure 104*b*. The mold structure shown in FIG. 15 can be similar to that shown in FIG. 14. For example, the mold structure 104*b* includes a surface 120*b* having a discrete, continuous area 1202*b* corresponding to the predetermined size and shape of a polymer product. The mold structure 104*b* also includes several protrusions 1402*a-d* extending beyond the periphery of the area 1202*b*. In some cases, each protrusion 1402*a-d* can include a respective spacer structure and/or a respective fiducial feature (omitted for ease of illustration). In some cases, the mold structure 104*b* can include on more other fiducial features (e.g., fiducial features 1502*a-f* positioned along the area 1202*b*).

In this example, the periphery 1500 of the area 1202*b* has a surface chemistry that is different from that of the area 1202*b* itself (e.g., such that a surface energy of a photocurable material is different at the periphery 1500 compared to the area 1202*b*). As an example, the periphery 1500 can have as surface chemistry that repels the photocurable material 114 (e.g., to a greater degree than the area 1202*b*), such that the photocurable material 114 within the area 1202*b* is less likely to flow beyond the periphery 1500. This can be useful, for example, in containing the photocurable material within the area 1202*b* during the production process. In some cases, the periphery 1500 can extend along the edges of the area 1202*b* (e.g., the edges of the mold structure 104*b*).

In some cases, the periphery 1500 can be coated with a material that repels the photocurable material 114, and/or a hydrophobic material (e.g., a material that has nanostructures on its surface) to serve as "self-cleaning" surfaces for repelling photocurable material 114. Example materials include organically modified silica, poly-dimethyl-siloxane (PDMS), fluoro-silane, and Teflon based coatings.

The width of the periphery 1500 (e.g., the width of the repellant edge portions) can vary. For example, the width can be less than 0.5 mm, less than mm, less than 5 mm, or some other thickness.

Although FIG. 15 only shows a single mold structure 104*b*, it is understood that the mold structure 104*a* can also include one or more features similar to those shown in FIG. 15 (e.g., one or more portions having a surface chemistry that repels photocurable material). Further, although FIG. 15 shows a particular number of each type of feature and particular locations for these features, these are merely illustrative examples. In practice, the number of each type of feature and/or the locations for each feature can differ, depending on the implementation.

In some cases, one or more other portions of the mold structure 104*b* also can have a surface chemistry that repels the photocurable material 114. For example, one or more of the bridges 1410*a-d* and/or platforms 1408*a-d* can be coated with PDMS, fluorosilane, Teflon, and/or a hydrophobic material to isolate the protrusions 1402*a-d* from the photocurable material 114.

As another example, FIG. 16A shows a mold structure 104*b*. The mold structure shown in FIG. 16A can be similar to that shown in FIG. 14. For example, the mold structure 104*b* includes a surface 120*b* having a discrete, continuous area 1202*b* corresponding to the predetermined size and shape of a polymer product. The mold structure 104*b* can also include several protrusions extending beyond the periphery of the area 1202*b*, each having respective spacer structures and/or fiducial features (omitted for ease of illustration).

In this example, the periphery 1600 of the area 1202*b* has a structural pattern that is different from that of the area 1202*b* itself (e.g., such that a surface energy of a photocurable material is different at the periphery 1600 compared to the area 1202*b*). As an example, the periphery 1600 can have an etched grating pattern that impedes the flow of photocurable material 114 across it (e.g., compared to the area 1202*b*), such that the photocurable material 114 within the area 1202*b* is less likely to flow beyond the periphery 1600. This can be useful, for example, in containing the photocurable material within the area 1202*b* during the production process. Further, a patterned periphery 1600 can be beneficial when producing an optical polymer product. For example, a patterned periphery 1600 on an eyepiece can facilitate the out coupling of stray light within the eyepiece (e.g., stray light propagating through channels other than the desired light propagation channel), thereby improve the quality of images projected by the eyepiece. In some cases, the patterned periphery 1600 can also facilitate the application of a light absorbing material (e.g., a carbon black paint) along the edge of the optical polymer product (e.g., to aid in the absorption of stray light along the edges of an optical polymer product). In some cases, the periphery 1600 can extend along the edges of the area 1202*b* (e.g., the edges of the mold structure 104*b*).

In some cases, the structural pattern of the periphery 1600 can be configured to have a particular volume (e.g., within its channels). This can be useful, for example, as it enables the periphery 1600 to accept up to a particular volume of photocurable material, such that the photocurable material does not flow beyond it. In some cases, the volume defined by the periphery) 1600 can be greater than the expected material "overfill" of the mold (e.g., the difference between the volume of photocurable material deposited into the area 1202*b* and the available volume of between areas 1202*a* and 302*b* after the mold structure 104*a* and 104*b* are aligned).

In some case, the structural pattern of the periphery 1600 can be configured to impart brittle or breakable features on the resulting polymer product (e.g., a relatively fragile edge that can be broken away from the rest of the polymer product with the application of force). This can be useful, for example, as it facilitates the trimming or excess material without the need to perform a separate singulation process (e.g., laser cutting).

An example etched grating pattern for the periphery 1600 is shown in FIG. 16B. In this example, the pattern includes alternating protrusions 1602 and channels 1604. The dimensions of each protrusion and channel can vary, depending on the implementation. In some cases, the width of a protrusion $w_1$ can be between 50 to 200 µm. In some cases, the width of a channel $w_2$ can be between 50 to 200 µm. In some cases, the height h of a protrusion (e.g., beyond the level of an adjacent channel) can be between 1 to 10 µm. This can be useful, for example, in providing a Wenzel surface for "drop pinning" drops of photocurable material to the periphery 1600 (e.g., such that drops of photocurable material had adhered to the periphery 1600, and do not flow beyond it). The dimensions can be differ, for example, to facilitate the capture of different volumes of photocurable product along the periphery 1600.

In some cases, the periphery 1600 can be patterned with hydrophobic nanostructures. This can be useful, for example, in provide a Cassie-Baxter surface to provide a "drop rolling" surface (e.g., such that drops of photocurable material roll away from the periphery 1600, thereby delimiting a clear boundary for the area 1202*b*. As examples, nanostructures can be replicated from a nano-patterned mold using materials such as organically modified silica, polydimethylsiloxane, fluoro-silane and Teflon. In addition, photocurable materials doped with release functionalities can also be used to create such hydrophobic features directly.

In some cases, the protrusions and channels can alternate in a regular recurring spatial pattern. In some case, the protrusion and channels can and channels can alternate according to some other spatial pattern.

The width of the periphery 1600 (e.g., the width of the patterned edge portions) can vary. For example, the width can be less than 0.5 mm, less than mm, less than 5 mm, or some other thickness.

Although FIGS. 16A and 16B only show a single mold structure 104b, it is understood that the mold structure 104a can also include one or more features similar to those shown in FIG. 16A (e.g., one or more structural patterns for controlling the flow of photocurable material). Further, although FIGS. 16A and 16B show a particular number of each type of feature and particular locations for these features, these are merely illustrative examples. In practice, the number of each type of feature and/or the locations for each feature can differ, depending on the implementation.

Further, surface chemistry features and structural pattern features are described separately with respect to FIGS. 15, 16A, and 16B show, it is understood that a mold structure can have both the described surface chemistry features and the described structural pattern features.

Figure 17:
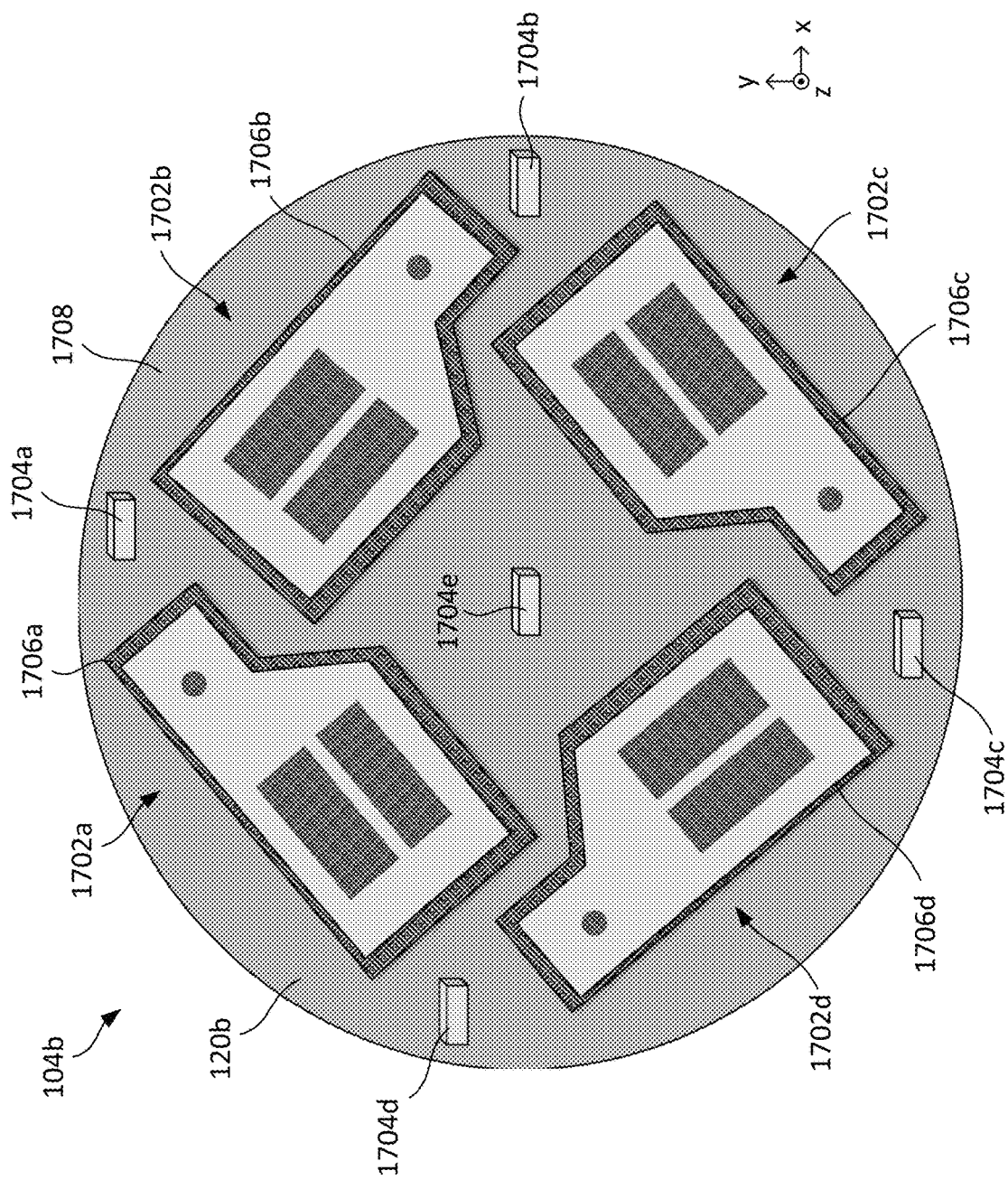
FIG. 17 is a diagram of another example mold structure.

In some cases, a mold structures can be used to form multiple different polymer products concurrently, without the need to perform a separate singulation process. As an example, FIG. 17 shows an example mold structure 104b. In this example, the mold structure 104b includes a surface 120b having multiple different discrete, continuous areas 1702a-d, each corresponding to the predetermined size and shape of a polymer product. The mold structure 104b can includes several spacer structures 1704a-e.

Each area 1702a-d can be similar to the areas 1202a and/or 1202b shown and described with respect to FIGS. 12-16. For example, each area 1702a-d can be a continuous area corresponding to the predetermined size and shape of a particular polymer product. Further, each area 1702a-d can include a periphery 1706a-d having a surface chemistry that repels the photocurable material (e.g., in a similar manner as described with respect to FIG. 15) and/or a periphery 1706a-d having a structural pattern that regulates the flow of photocurable material (e.g., "drop pinning" or "drop rolling" surfaces).

Further, the area 1708 of the surface 120b beyond each the areas 1702a-d (e.g., the portion of the surface 120b that are not used to shape the polymer products) also can have a surface chemistry that repels photocurable material (e.g., coated with PDMS, fluorosilane, and/or Teflon). This can be useful, for example, in restricting the flow of photocurable material beyond each of the areas 1702a-d.

The spacer structures 1704a-e can be similar to those shown and described with respect to FIGS. 1, 2, and 14. For example, the spacer structures 1704a-e can that project from the mold structure 104b and towards an opposing mold. Further, the spacer structures 1704a-e each have a substantially equal vertical height, such that when the mold structure 104b is brought other with another mold structure, the spacer structures 1704a-e abut the mold structures and a substantially flat gap volume is defined between them.

This arrangement is beneficial, for example, as it enables the production of multiple polymer products concurrently without the need to perform for a separate singulation process. Although FIG. 17 shows a mold structure having four discrete areas for forming polymer products, this is merely an illustrative example. In practice, a mold structure can have any number of discrete areas for forming polymer products (e.g., one, two, three, four, or more).

Further, although FIG. 17 only shows a single mold structure 104b, it is understood that the mold structure 104a can also include one or more features similar to those shown in FIG. 17 (e.g., multiple discrete areas for forming polymer products). Further, although FIG. 17 shows particular locations for each of its features, these are merely illustrative examples. In practice, the locations for each feature can differ, depending on the implementation.

Figure 18:
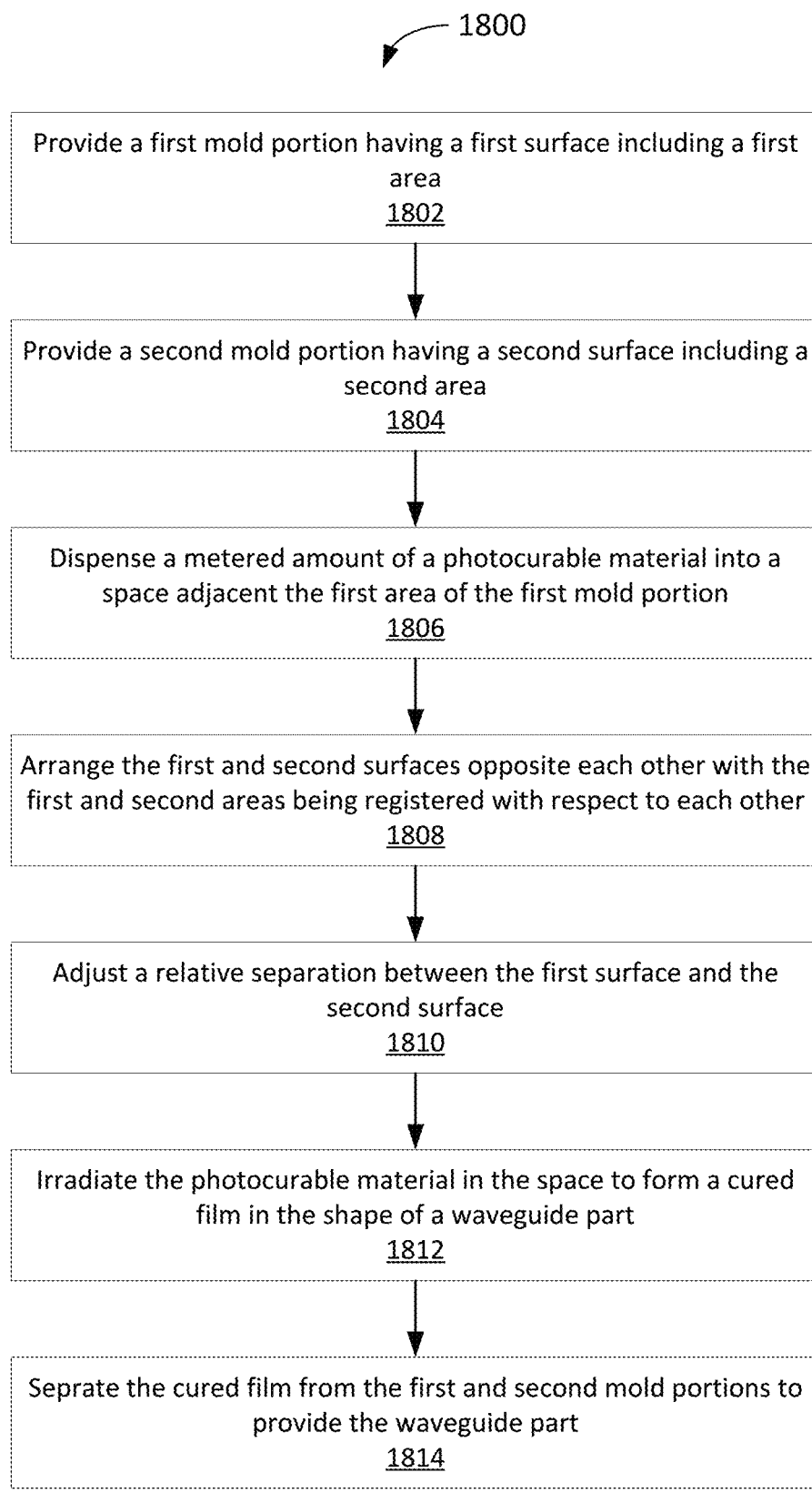
FIG. 18 is a flow chart diagram of an example process for producing a polymer product.

FIG. 18 shows an example process 1800 for producing a polymer product. The process 1800 can be performed, for example, using the systems 100 or 900. In some cases, the process 1800 can be used to produce polymer films suitable for use in optical applications (e.g., as a part of waveguides or eyepieces in an optical imaging system). In some cases, the process 1800 can be used to form polymer products having a thickness of no more than 1000 µm, an area of at least 1 cm$^2$, and a predetermined shape.

In the process 1800, a first mold portion is provided (step 1802). The first mold portion has a first surface including a discrete, continuous first area corresponding to the predetermined shape of the waveguide part. The first area is bounded by an edge region having a different surface chemistry and/or surface structure than the first area.

A second mold portion is also provided (step 1804). The second mold portion has a second surface including a discrete, continuous second area corresponding to the predetermined shape of the waveguide part. The second area is bounded by an edge region having a different surface chemistry and/or surface structure than the second area.

In some cases, the edge region of the first and/or second mold portions includes a material that repels the photocurable material. In some cases, the edge region of the first and/or second mold portions includes a patterned surface configured to pin droplets of the photocurable material. In some cases, the edge region of the first and/or second mold portions includes a patterned surface configured to roll droplets of the photocurable material. Example mold portions are shown and described, for example, with respect to FIGS. 1-9 and 12-17. Example edge regions are shown and described, for example, with respect to FIGS. 15-17.

A metered amount of a photocurable material is dispensed into a space adjacent the first area of the first mold portion (step 1806). In some cases, the metered amount of photocurable material is dispensed at a plurality of discrete locations in the space adjacent the first area of the first mold portion. In some cases, the metered amount of photocurable material is dispensed according to an asymmetric pattern in the space adjacent the first area of the first mold portion. In some cases, the metered amount of photocurable material is dispensed at a periphery of the first surface of the first mold portion. Example dispensing patterns are shown and described, for example, with respect to FIGS. 13A-13E.

The first and second surfaces are arranged opposite each other with the first and second areas being registered with respect to each other (step 1808). In some cases, the first and second surfaces are arranged opposite each other prior to dispensing the photocurable material (e.g., as shown and described with respect to FIGS. 13D and 13E). In some cases, the first and second surfaces are arranged opposite each other after dispensing the photocurable material (e.g., as shown and described with respect to FIGS. 12 and 13A-13C). In some cases, the first and second areas are registered with respect to each other based on one or more fiducial markings on the first and/or second surfaces. The fiducial markings can be located outside of the first and second areas (e.g., as shown and described with respect to FIG. 14).

A relative separation between the first surface and the second surface is adjusted so that the photocurable material fills a space between first and second areas of the first and second surfaces, respectively, having the predetermined shape (step 1810). In this arrangement, the different surface chemistry and/or surface structure between the first and second areas and their corresponding edge regions prevent flow of the photocurable material beyond the edge regions.

In some cases, the relative separation between the first and second surfaces is controlled based on one or more spacers located on the first and/or second surfaces. The one or more spacers can be located outside of the first and second areas (e.g., as shown and described with respect to FIGS. 14 and 17).

The photocurable material in the space is irradiated with radiation suitable for photocuring the photocurable material to form a cured film in the shape of the waveguide part (step 1812). Example techniques for photocurable the photocurable material are described with respect to FIGS. 1 and 12.

The cured film is separated from the first and second mold portions to provide the waveguide part (step 1814). In some case, a head mounted display is assembled using the waveguide part.

As described herein, during the casting and curing process, various factors can interfere with the shape of the resulting film, causing it to become distorted from its intended shape. As an example, a film can become distorted due to the build up of internal stresses within during the polymerization process. For instance, as a photocurable material is cured, monomers of the photocurable material polymerize into longer and heavier chains. Correspondingly, the photocurable material reduces in volume (e.g., experiences "shrinkage") as the polymer chains physically move together. This results in a build up to internal stresses inside of the photocurable material (e.g., stresses resulting from an impedance to polymer chain mobility), and a storage of strain energy within the photocurable material. When the cured film is extracted from the mold, the strain energy is released resulting in thinning of the film. The film can thin differently depending on the spatial distribution of the internal stresses. Thus, films may exhibit variations from film to film, depending on the particular spatial distribution of internal stresses that were introduced during the polymerization process. Accordingly, the consistency of a film can be improved by regulating the distribution of stress within the film during the casting process.

Figure 19:
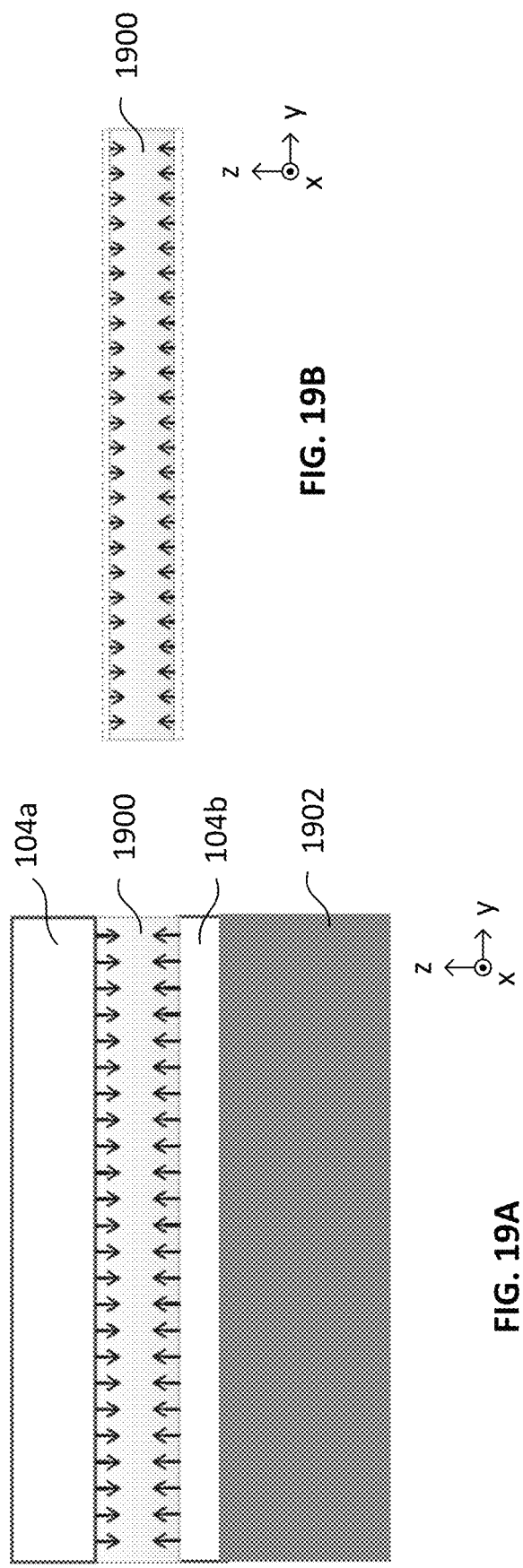
FIG. 19A is a diagram of an example polymer film during the casting and curing process.
FIG. 19B is a diagram of an example polymer film after curing and extraction.

To illustrate, FIG. 19A shows an example polymer film 1900 during the casting and curing process (e.g., when the polymer film 1900 is positioned between mold structures 104*a* and 104*b*), and FIG. 19B shows the polymer film 1900 after curing and extraction (e.g., after the polymer film 1900 has been "demolded"). As shown in FIG. 19A, as the polymer film 1900 is cured, it shrinks in size (indicated by the vertical arrows). This can result in a delamination of the polymer film 1900 from the mold structures 104*a* and/or 104*b* (e.g., if the stress is greater than the adhesion or bond force between the polymer film and the mold structure). Further, this can cause the mold structure 104*b* to become separated from the vacuum chuck 1902 holding the mold structure 104*b* in place (e.g., if the stress is greater than the vacuum strength of the vacuum chuck 1902). Further still, this can cause a fracturing the in the mold structures 104*a* and 104*b* (e.g., if the stress is greater than the strength of the mold structures). Further still, this shrinkage can result in the storage of strain energy within the polymer film 1900. As shown in FIG. 19B, after the polymer film 1900 is extracted from the mold structures 104*a* and 104*b*, it experiences structural relaxation and further shrinking (indicated by the vertical arrows), resulting in a thinning of the polymer film 1900.

The polymer film can thin differently depending on the spatial distribution of the internal stresses, resulting in localized variations in thickness. In some cases, the thickness variation distribution is correlated to the intensity distribution of the light used to photocure the photocurable material.

Figure 20:
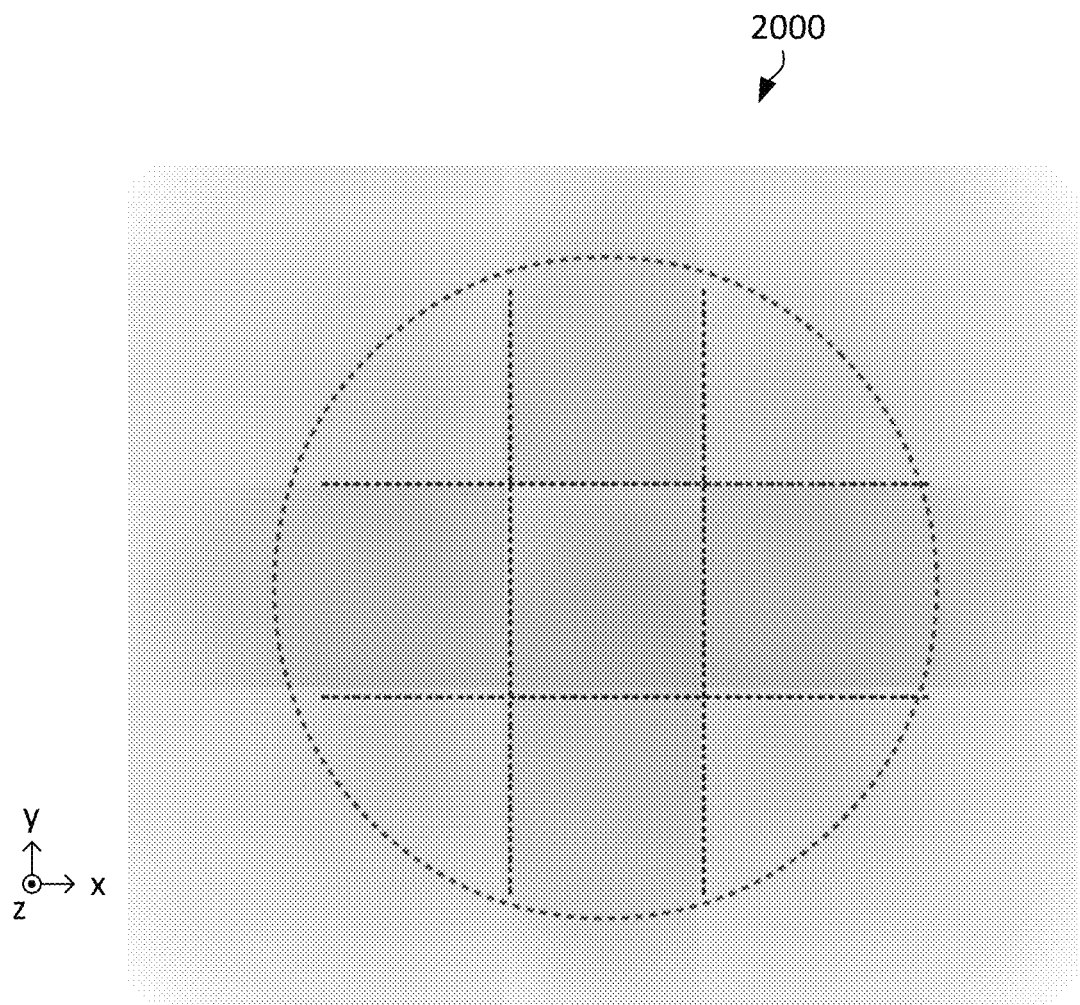
FIG. 20 is a diagram of an example distribution of light for curing a photocurable material.
Figure 21B:
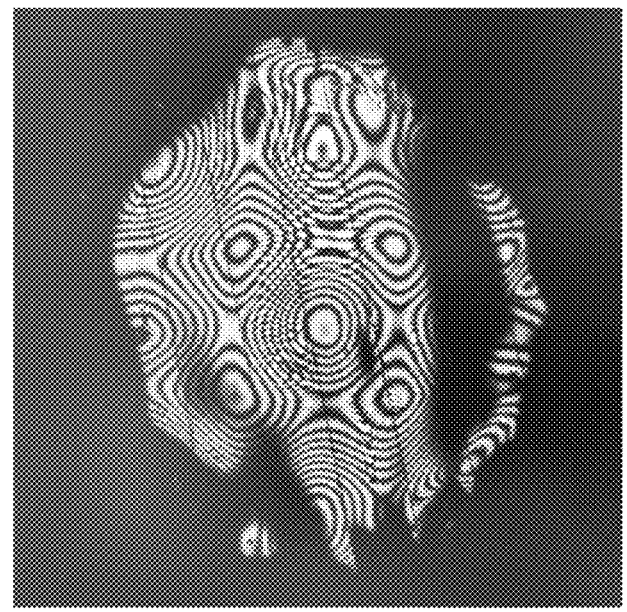
FIGS. 21A and 21B are images of example polymer films.
Figure 21A:
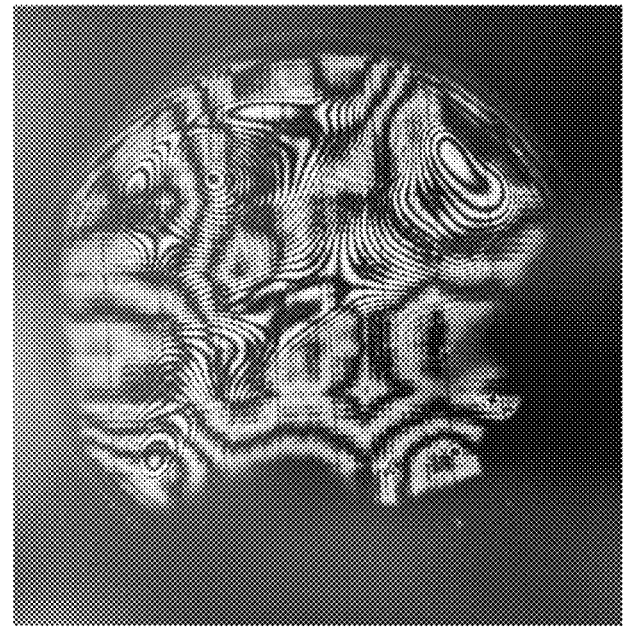

As an example, FIG. 20 shows an example intensity distribution of light 2000 used to photocure the photocurable material (e.g., light generated using a 2×2 array of ultraviolet (UV) light sources with overlapping areas). Portions of the distribution having a higher intensity of light are shown in darker shades, while portions having a lower intensity of light are shown in lighter shades. FIGS. 21A and 21B show two example polymer films 2100*a* and 2100*b* that were cured using the light having the intensity distribution 2000. As shown in FIGS. 21A and 21B, each of the polymer films 2100*a* and 2100*b* exhibits wrinkling and marked thickness variation, particularly at its fringes.

Various techniques can be used to regulate the internal stresses within a polymer film before, during, and/or after the curing process.

Figure 22A:
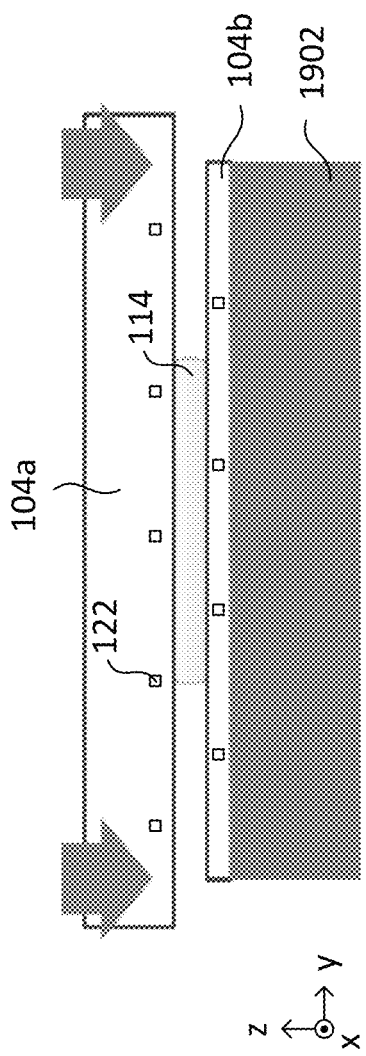
FIG. 22A is a diagram of an example system for regulating stresses within a photocurable material during curing.

In some cases, the mold structures 104*a* and 104*b* can be adjusted during the curing process to compensate for shrinkage in the photocurable material. An example, FIG. 22A shows photocurable material 114 positioned between the mold structures 104*a* and 104*b*. In this example, the mold structure 104*b* is fixed in position (e.g., secured to a vacuum chuck 1902), while the mold structure 104*a* is configured to move up and down (e.g., moved away from the mold structure 104*a*, and towards the mold structure 104*b* using an actuable stage). Further, the mold structures 104*a* and 104*b* are positioned such that they apply a particular amount of force onto the photocurable material 114.

During the curing process, light is directed towards the photocurable material 114. As the photocurable material 114 cures and shrinks in size (e.g., reduces in thickness), the mold structure 104*a* is moved towards the mold structure 104*b* to compensate for the change in size and to maintain the same amount of force on the photocurable material 114. This reduces or otherwise eliminates the build up of internal stresses within the photocurable material, and reduces the potential thickness variations in the photocurable material 114 after it is cured and extracted from the mold.

In some cases, the mold structures 104*a* and 104*b* can apply a compression force to the photocurable material 114 while the photocurable material 114 is still in a "reflowable" liquid phase (e.g., before the photocurable material 114 been cured to its gel point). In some cases, the mold structures 104*a* and 104*b* can apply a compression force to the photocurable material 114 while photocurable material 114 is in a compressible gel phase (e.g., after the photocurable material 114 has been cured to its gel point, but before it has reached its solid point).

In some cases, the mold structures 104*a* and 104*b* can be operated according to a closed loop control system. For example, as shown in FIG. 22A, the mold structures 104*a* and 104*b* can include one or more sensor assemblies 122 including force sensors, each configured to measure an applied force at a particular location along a particular mold structure 104*a* or 104*b*. The sensor assemblies 122 can be communicatively coupled to the control module 110 (e.g., as shown and described with respect to FIG. 1), and can be configured to transmit force measurements to the control module 110 during operation of the system. Based on the force measurements, the control module 110 can control the position of the mold structure 104a relative to the mold structure 104b (e.g., using the actuable stage 102a) to maintain a constant force on the photocurable material 114 during the curing process, while maintaining parallelism between the mold structure 104a and the mold structure 104b. The final thickness of the resulting polymer film and the stress level stored in the polymer film can be controlled by regulating the applied force on the photocurable material 114. In some cases, forces in the range of 5 N to 100 N can be applied to the photocurable material 114. In some cases, applying a higher force enables the final thickness of the polymer film to be closer to the width of the initial gap between the mold structures 104a and 104b, but with less regulation of stress within the polymer film.

Figure 22B:
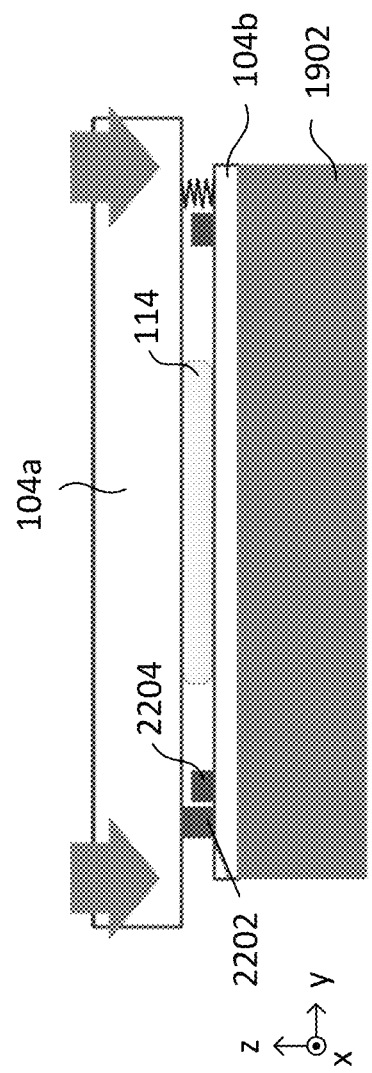
FIG. 22B is a diagram of another example system for regulating stresses within a photocurable material during curing.

In some cases, the mold structures 104a and 104b can be operated according to an open loop control system. For example, as shown in FIG. 22B, the mold structures 104a and 104b can include one or more compressible spacer structures 6222, and one or more incompressible spacer structures 2204. The incompressible spacer structures 2204 define the minimum distance between the mold structures 104a and 104b. The compressible spacer structures 2202 have a greater height than the incompressible spacer structures 2204, and are less stiff than the incompressible spacer structures 2204 (e.g., such that they can be compressed by the application of a certain amount of force). During operation of the system, the control module 110 moves the mold structure 104a towards the mold structure 104b to compress the compressible spacer structures 2204, and corresponding to apply a predetermined constant force to the photocurable material 114). The control module 110 continues to move the mold structure 104a towards the mold structure 104b until they are abutted by the incompressible spacer structures 2204.

Each of the compressible spacer structures 2204 can have the same height and the same stiffness, such that the mold structures 104a and 104b apply an even force onto the photocurable material 114 while maintaining parallelism between the mold structure 104a and the mold structure 104b. The final thickness of the resulting polymer film and the stress level stored in the polymer film can be controlled by specifying particular heights and stiffnesses for the compressible spacer structures 2204. In some cases, the height of a compressible spacer structure 2204 can be between 5% to 15% greater than the height of the compressive spacer structures 2204 (e.g., corresponding to the volume shrinkage of the photocurable material 114 during the curing process). In some cases, the stiffness of the compressible spacer structures can be between 0.01 GPa and 0.1 GPa (e.g., similar to rubber). In some cases, the compressible spacer structures 2204 can be constructed of rubber, polyethylene, Teflon, polystyrene foam, and/or other compressible material.

In some cases, the system can also include one or more spring mechanisms 2206 positioned between the mold structures 104a and 104b. These spring mechanisms 2206 can further regulate the amount of force that is applied to the photocurable material 114, and to further maintain the parallelism between the mold structure 104a and the mold structure 104b In some cases, the mold structures 104a and 104b can be cyclically moves towards each other and away from each other to apply a cyclic load on the photocurable material 114 during the curing process. This can be useful, for example, as compressing and stretching during the photocurable material 114 during the curing process can relax the stresses build into the photocurable material.

Figure 23:
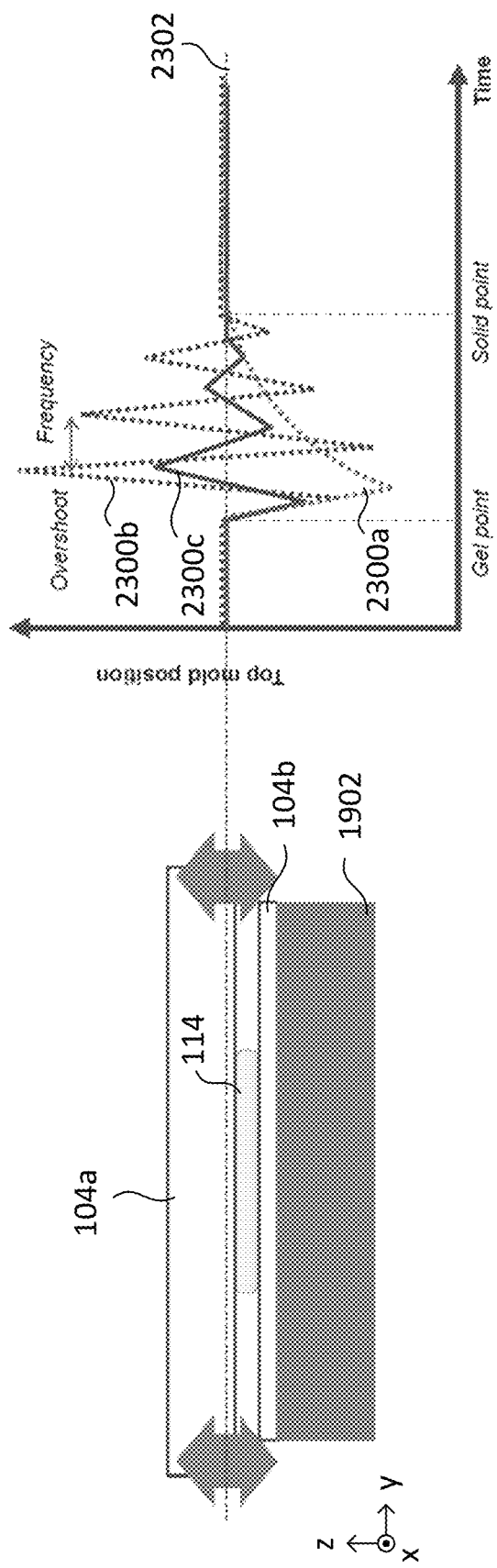
FIG. 23 is a diagram of another example system for regulating stresses within a photocurable material during curing.

As an example, as shown in FIG. 23, the mold structure 104a can be moved according to one or more movement patterns 2300a-c. As an example, in the movement pattern 2300a, the mold structure 104a is moved according to a low response time and low gain (e.g., the mold structure 104a is moved towards the mold structure 104b after the photocurable material 114 has been cured to its gel point, and gradually moved away). As another example, in the movement pattern 2300b, the mold structure 104a is moved according to a high response time and high gain (e.g., the mold structure 104a is alternatively moved away from the mold structure 104b and towards the mold structure in according to an "overshoot" decaying oscillatory pattern after the photocurable material 114 has been cured to its gel point). As another example, the in the movement pattern 2300c, the mold structure 104a is moved according to a medium response time and medium gain (e.g., the mold structure 104a is alternatively moved away from the mold structure 104b and towards the mold structure according to a "tuned" decaying oscillatory pattern after the photocurable material 114 has been cured to its gel point). Although three example patterns are shown in FIG. 23, other patterns are also possible, depending on the implementation.

In practice, the mold structures 104a and 104b can be controlled such that the spacing between them oscillates or "bounces" a particular number of times, and does so according to a particular frequency. As an example, the spacing between the mold structures 104a and 104b can oscillate one or more times (e.g., one, two, three, or more times) between the gel point and the solid point. In some cases, the length of time between a gel point and the solid point can be approximately three seconds. This can correspond to oscillations of 0.33 Hz, 0.67 Hz, 1 Hz, or more. Further, the amplitude of the oscillations can also vary. In some cases, the each oscillation can be between approximately 5 to 10 μm upward or downward relative to a central reference position 702

In some cases, built in stresses can be removed from a polymer film by annealing the polymer film before it is extracted from the mold (e.g., before "demolding" the polymer film). Various techniques can be used to apply heat to a polymer film while it is still between the mold structures. As examples, a polymer film can be heated through conduction heating and/or and radiation heating, such as using one or more heated chucks, high intensity lamps, infrared (IR) lamps, and/or microwaves. In some cases, radiation heating may be preferable (e.g., for faster process time and potentially selective heating of the polymer film only). In some cases, the polymer film can be annealed by heating it to 40° C. to 200° C. for a period of 10 seconds to 3 minutes.

In some cases, the photocurable material 114 can be cured using patterns of light having a particular spatial distribution and/or particular temporal characteristics to reduce built in stresses from the resulting polymer film. Example lighting patterns 800a-c are shown in FIGS. 24A-24C.

Figure 24:
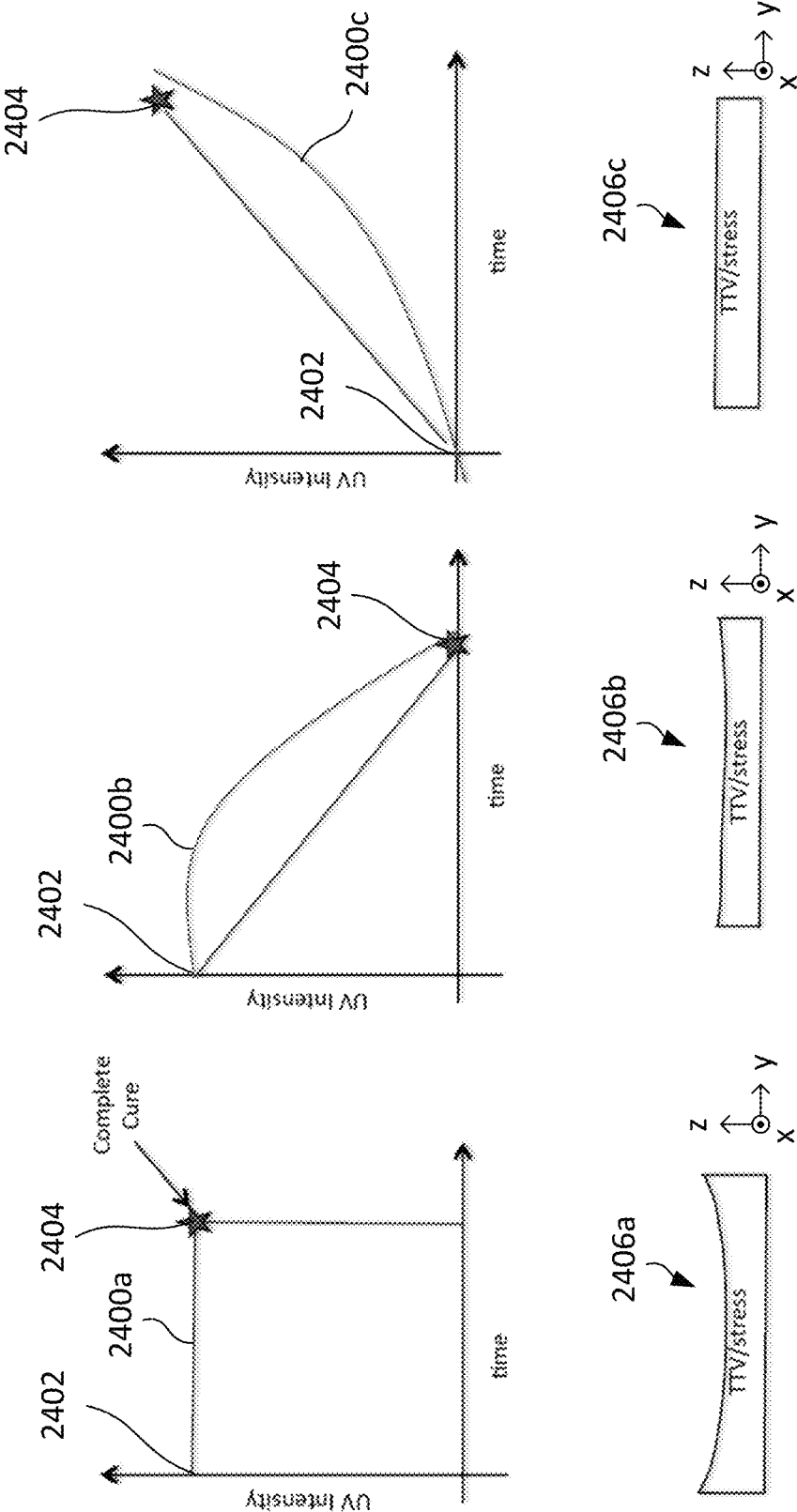
FIGS. 24A-24C are diagrams of example lighting patterns for curing photocurable material.

As shown in FIG. 24A, photocurable material can be cured by irradiating the photocurable material with a lighting pattern 2400a having a continuous and uniform intensity over a period of time (e.g., from the beginning of the curing process 2402 until the end of the curing process 2404 when the photocurable material is fully cured). In some cases, use of the light pattern 2400a can result in a polymer product 2406a having a significant amount of built up stress (e.g., the non-stop exposure can impair the ability of the polymer material to respond quickly to movements by the polymer chains during shrinkage). In some cases, this can result in a polymer product 2406a that is thicker along its periphery than along its central region (e.g., when viewed along a cross-section along the y-z plane).

As shown in FIG. 24B, photocurable material can be cured by irradiating the photocurable material with a lighting pattern 2400b having a variable intensity over time. Initially (e.g., at the beginning of the curing process 2402), the photocurable material is irradiated by high intensity light. As the curing process progresses, the photocurable material is irradiated by lower and lower intensity light until the photocurable material is fully cured (e.g., until the end of the curing process 2404). In some cases, use of the light pattern 2400b can result in photocurable material absorbing a relatively large amount of light in the initial stages of the curing process, resulting in creation of enough free radicals to drive the polymerization reactions. As the intensity of the light decreases, the polymer chains can re-arrange slowly, resulting in relatively lower amounts of stress in the cross-linked network (e.g., compared to the use of the lighting pattern 2400a). In some cases, this can result in a polymer product 2406b better mechanical properties (e.g., higher Young's modulus and/or hardness) and more consistent spatial dimensions (e.g., lower TTV) compared to use of the lighting pattern 800a.

As shown in FIG. 24C, photocurable material can be cured by irradiating the photocurable material with another lighting pattern 2400c having a variable intensity over time. Initially (e.g., at the beginning of the curing process 2402), the photocurable material is irradiated by lower intensity light. As the curing process progresses, the photocurable material is irradiated by higher and higher intensity light until the photocurable material is fully cured (e.g., until the end of the curing process 2404). In some cases, use of the light pattern 2400c can result in photocurable material absorbing a relatively lower amount of light in the initial stages of the curing process, resulting in lower rates of reactions during the early stages of the curing process. Thus, the monomers of the photocurable material react more slowly, resulting in relatively lower stress built up in the network. Subsequently, higher intensity light can be used to cure the photocurable material fully. In some cases, this can result in more consistent spatial dimensions (e.g., lower TTV) compared to use of the lighting pattern 2400a. However, the mechanical properties may be less desirable in some contexts (e.g., compared to use of the lighting pattern 2400b) due to a relatively slow rate of polymerization.

Although example lighting patterns 2400a-c are shown and described above, these are merely illustrative examples. In practice, other lighting patterns can also be used to cure photocurable material, either instead of in in additional to those described herein.

In some cases, photocurable material can be cured by irradiating the photocurable material with one or more pulses of light over a period of time (e.g., exposing the photocurable material to light according to one or more on and off cycles). In some cases, the duration of each pulse of radiation (e.g., the duration of each "on" state) can vary relative to the duration of each period of time between pulses (e.g., the duration of each "off" state). Example lighting patterns 2500a-c are shown in FIG. 25.

As shown in FIG. 25A, photocurable material can be cured by irradiating the photocurable material with a lighting pattern 2500a having multiple pulses over a period of time. In this example, the duration of each pulse $t_{on}$ (e.g., duration of each "on" state) is equal to the duration between pulses $t_{off}$ (e.g., the duration of each "off" state), corresponding to a 50% duty cycle of light. The light pattern 2500a can be used to cure a photocurable material having a moderate rate of polymerization (e.g., during the "on" stages), while allowing the photocurable material to cool during the curing process (e.g., during the "off" stages). This can be beneficial, for example, in controlling the amount of heat and/or stress in the photocurable material. Further, the physical properties of the resulting polymer product (e.g., TTV patterns of the polymer product) can be realized by selecting a particular time interval for $t_{on}$ and $t_{off}$. In some cases, $t_{off}$ and $t_{on}$ can be between 0.05 s and 5 s.

Figure 25:
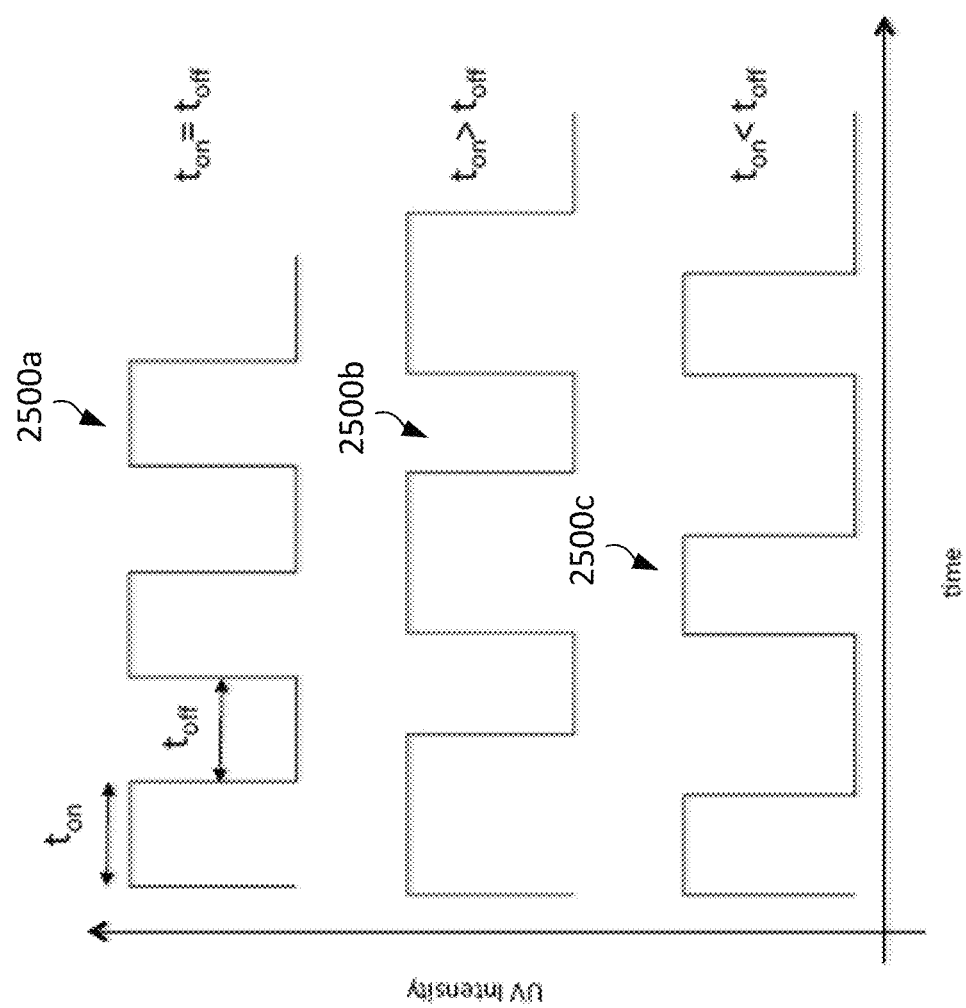
FIG. 25 is a diagram of additional example lighting patterns for curing photocurable material.

As shown in FIG. 25, photocurable material also can be cured by irradiating the photocurable material with another lighting pattern 2500b having multiple pulses over a period of time. In this example, the duration of each pulse $t_{on}$ (e.g., duration of each "on" state) is greater than the duration between pulses $t_{off}$ (e.g., the duration of each "off" state), corresponding to a greater than 50% duty cycle of light. The light pattern 2500b can be used to cure a photocurable material having a slower rate of polymerization (e.g., by applying more light during the "on" stages compared to the lighting pattern 2500a to drive polymerization), while also allowing the photocurable material to cool during the curing process (e.g., during the "off" stages). As above, this can be beneficial in controlling the amount of heat and/or stress in the photocurable material. Further, the physical properties of the resulting polymer product (e.g., TTV patterns of the polymer product) can be realized by selecting a particular time interval for $t_{on}$ and $t_{off}$. In some cases, $t_{off}$ can be between 0.05 s and 5 s, and $t_{on}$ can be between 0.05 s and 5 s.

As shown in FIG. 25, photocurable material also can be cured by irradiating the photocurable material with another lighting pattern 2500c having multiple pulses over a period of time. In this example, the duration of each pulse $t_{on}$ (e.g., duration of each "on" state) is less than the duration between pulses $t_{off}$ (e.g., the duration of each "off" state), corresponding to a less than 50% duty cycle of light. The light pattern 2500c can be used to cure a photocurable material having a faster rate of polymerization (e.g., by applying less light during the "on" stages compared to the lighting pattern 2500a to drive polymerization), while also allowing the photocurable material to cool during the curing process (e.g., during the "off" stages). As above, this can be beneficial in controlling the amount of heat and/or stress in the photocurable material. Further, the physical properties of the resulting polymer product (e.g., TTV patterns of the polymer product) can be realized by selecting a particular time interval for $t_{on}$ and $t_{off}$. In some cases, $t_{off}$ can be between 0.05 s and 5 s, and $t_{on}$ can be between 0.05 s and 5 s.

Figure 26:
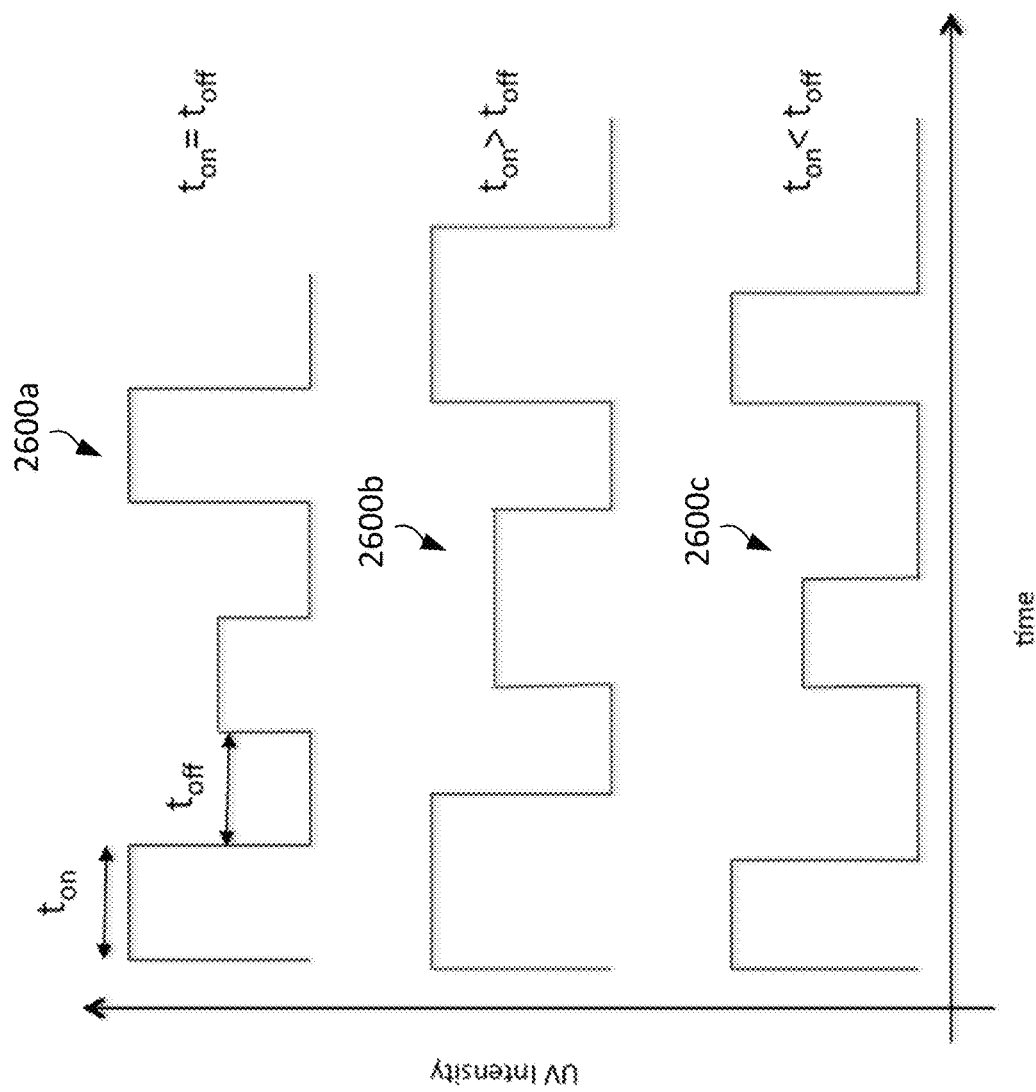
FIG. 26 is a diagram of additional example lighting patterns for curing photocurable material.

In some cases, the intensity of one or more pulses of radiation can have a different intensity from or more other pulses of radiation. Example lighting patterns 2600a-c are shown in FIG. 26. In each of these examples, the pulses of radiation alternate between pulses having a higher intensity and pulses having a lower intensity. This can be useful, for example, as some photocurable materials have lower thermal conductivity, and the heat generated by UV light and/or exothermic processes will take longer time to dissipate by conduction. Alternating high and low intensity pulses can help maintain the curing reaction at smoother rate. Although the patterns 2600a-c shown in FIG. 26 alternate between pulses having two different intensities, these are merely illustrative examples. In some cases, patterns can alternative between pulses having three or more different intensities (e.g., three, four, five, or more). Further, in some cases, patterns do not alternate between pulses having different intensities according to a regular or repeating pattern. For example, patterns can include pulses having any combination of intensities and arranged in any order.

In practice, the frequency of pulses can different, depending on the implementation. As an example, the frequency of pulses can be between 0.1 Hz and 20 Hz. In some cases, the frequency of pulses can be constant. In some cases, the frequency of pulses can vary over time.

In some cases, photocurable material can be cured by irradiating the photocurable material with light that varies in intensity with respect to space. For example, certain portions of the photocurable material can be irradiated with higher intensity light, while other portions of the photocurable material can be irradiated with lower intensity light. This can be useful, for example, in controlling the rate of polymerization photocurable material in localized areas to regulate the built up of heat and/or stress.

Figure 27B:
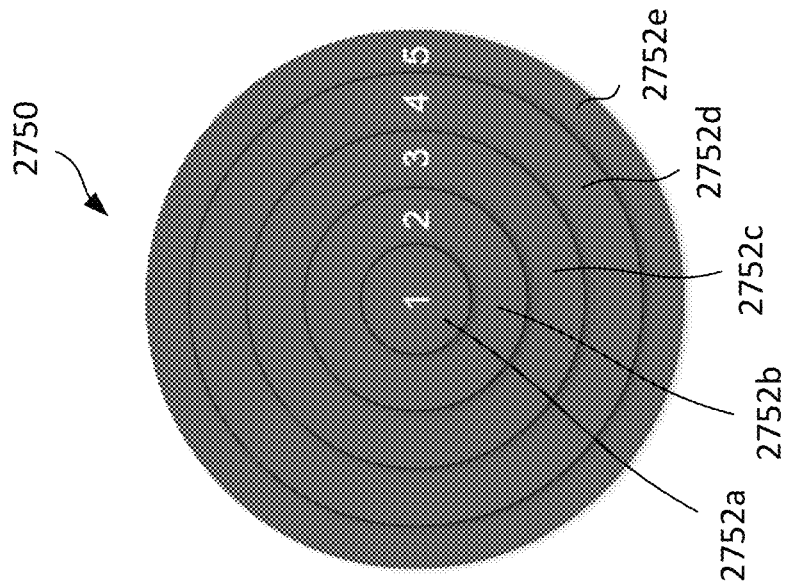
FIG. 27B is a diagram of additional example lighting pattern for curing photocurable material.
Figure 27A:
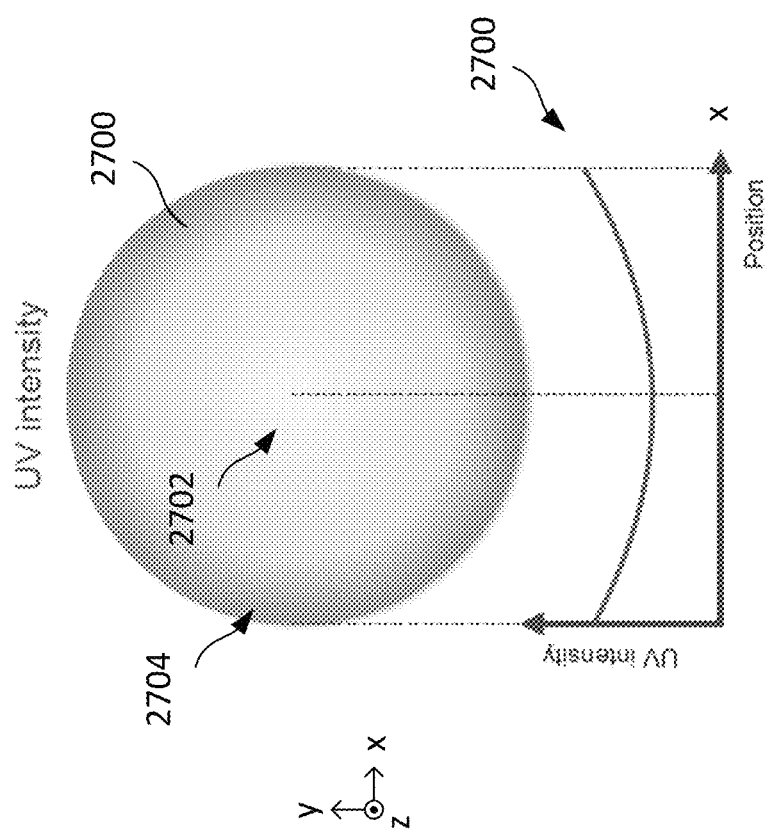
FIG. 27A is a diagram of an additional example lighting pattern for curing photocurable material.

As an example, FIG. 27A shows a lighting pattern 2700 that varies with respect to space (viewed from the x-y plane). Lighter shades corresponding to lower light intensity, while darker shades correspond to higher light intensity. A cross-sectional profile 2702 of the lighting pattern (e.g., along the x direction). In this example, the lighting pattern 2700 irradiates a central portion 2702 with lower intensity light, while irradiating peripheral portions 2704 with higher intensity light (e.g., according to a curved profile pattern). This can be beneficial, as a polymer film often accumulates more stress at its center than along its edges (e.g., due to the lack of surrounding reflowable polymer material to compensate for the shrinkage). Accordingly, exposing the central portion of the polymer film to less intense light compared to its edges (e.g., to slow the rate of polymerization) can reduce the amount of accumulated stress, and improve the consistency of the polymer film. Although an example pattern is shown in FIG. 27A, this is merely an illustrative example. In practice, a lighting pattern can have different spatial patterns, depending on the implementation.

Further, in some cases, photocurable material can be cured by irradiating different portions of the photocurable material with light in sequence. For example, certain portions of the photocurable material can be irradiated with light first, followed by other portions of the photocurable material. This can be useful, for example, in controlling the rate of polymerization photocurable material in localized areas in particular sequence to regulate the built up of heat and/or stress.

As an example, FIG. 27B shows a lighting pattern 2750 having five zones 2752a-e arranged in a concentric pattern. In this example, a photocurable material can be cured by first irradiating the photocurable material using along a central portion 2752a, then along the ring portion 2752b, then along the ring portion 2752c, then along the ring portion 2752d, and finally along the ring portion 2752e in a sequence (e.g., such that a center of the photocurable material is cured first, and the edges of the photocurable material are cured last). This is beneficial, for example, as provides lateral shrinkage compensation (e.g., along the x-y plane) through the surrounding reflowable polymer material. A sequential pattern of radiation can be achieved, for example, using individually addressable light source arrays (e.g., one or more arrays of light emitting diodes), UV optics, grey-scale UV windows, UV masks, iris shutters, among others. Although an example pattern is shown in FIG. 27B, this is merely an illustrative example. In practice, a lighting pattern can include any number of different zones that are illuminated in any order during the casting process.

Further, although several different techniques are shown and described above, these techniques is not mutually exclusive. In practice, any number of these techniques can be used in conjunction to regulate the build up of stress in a polymer product to improve the consistency of the polymer product. As an example, a polymer product can be produced by controlling the relative space between molds structures before, during, and after casting (e.g., as described with respect to FIGS. 22A, 22B, and 23), irradiating photocurable material according to lighting patterns having different spatial and/or distributions and/or temporal characteristics (e.g., as described with respect to FIGS. 24A-24C, 25, 26, 27A, and 27B), either individually or in any combination.

Figure 28B:
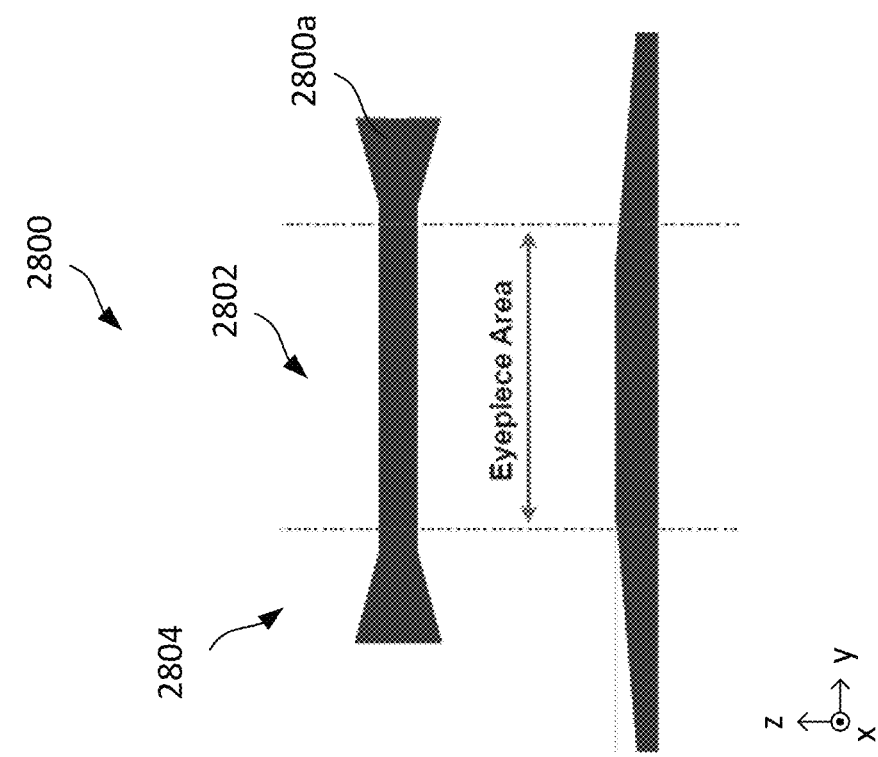
FIGS. 28A and 28B are diagram of example polymer products.
Figure 28A:

Further, one or more of these techniques can be used to produce polymer products having particular shapes. As examples, several different polymer products 2800 are shown in cross section in FIGS. 28A and 28B. For instance, as shown in FIG. 28A, polymer products 2800 can have asymmetric configurations or asymmetric configurations. In some cases, a polymer product 2800 can have one or more convex surfaces. In some cases, a polymer product 2800 can have one or more concave surfaces. Further, as shown in FIG. 28B, a polymer product 2800 can have a central eyepiece area 2802 (e.g., an optical portion to receive and transmit light), and a support portion 2804 (e.g., a radially peripheral portion providing structural support for the eyepiece area). These arrangements can be achieved using one or more of the technique described herein.

As an example, the polymer product 2800a can be produced by combining the techniques shown and described with respect to FIGS. 27A and 27B. For example, a photocurable material can be initially irradiated (e.g., with UV light) according to the portions 2752a-d of the lighting pattern 2750 in conjunction. Further, the spatial distribution of light intensity can be set according to the lighting pattern 2700 (e.g., such that the central portion 2702 of the photocurable material is irradiated with lower intensity light, and the peripheral portions 2704 are irradiated with progressively higher intensity light according to a curved profile pattern). This results in a flat central eyepiece area 2802. Subsequently, the photocurable material can be irradiated (e.g., with UV light) according to the portion 2752e of the lighting pattern 2750 (e.g., along the periphery of the polymer product) with a substantially lower light intensity (e.g., a lower than the lighting intensity of the portions 2752a-d). This results in a thicker support portion 2804 along the periphery of the polymer product.

Figure 29:
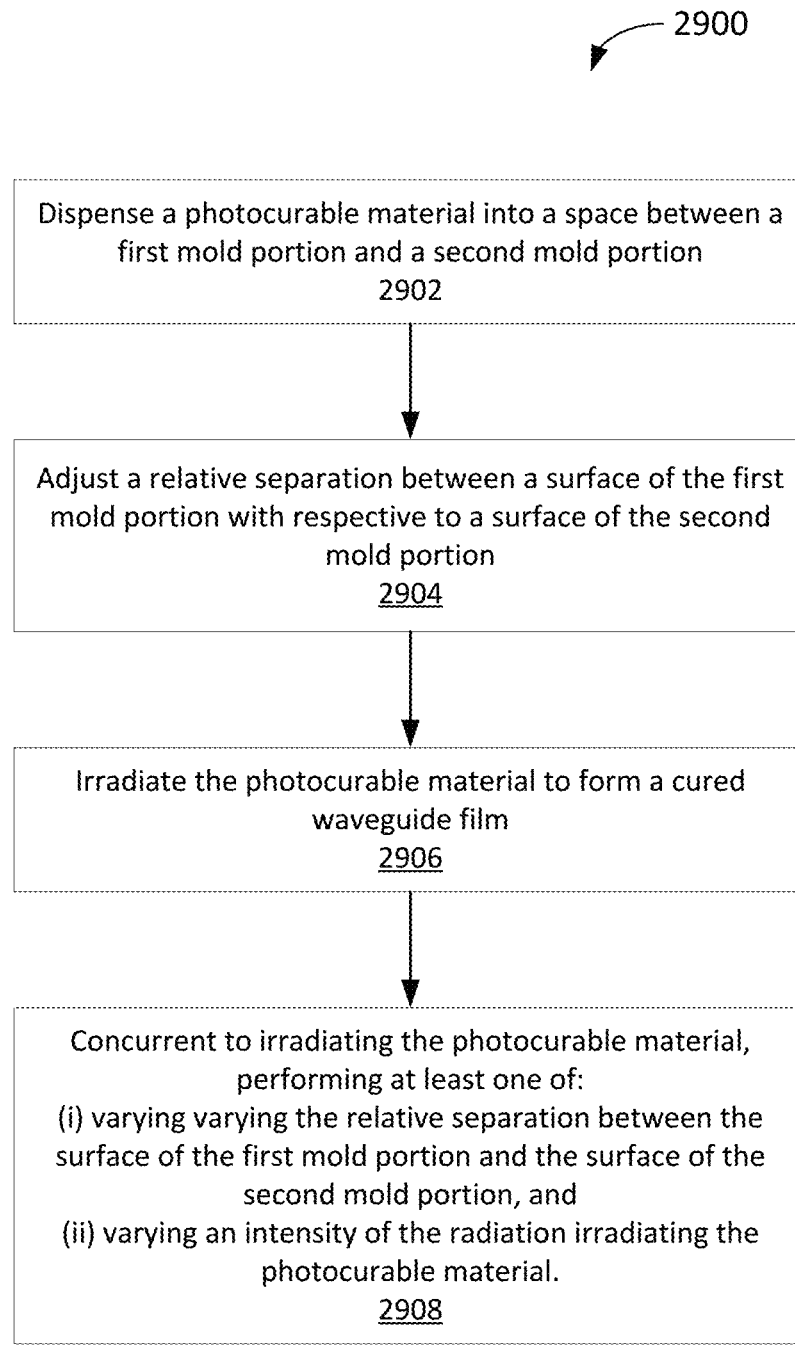
FIG. 29 is a flow chart diagram of an example process for producing a polymer product.

FIG. 29 shows an example process 2900 for forming a waveguide film. The process 2900 can be performed, for example, using the systems 100 or 900. In some cases, the process 2900 can be used to produce polymer films suitable for use in optical applications (e.g., as a part of waveguides or eyepieces in an optical imaging system). In some cases, the process can be particularly useful for producing waveguides or eyepieces suitable for use in a headset. For instance, the process can be used to produce waveguides or eyepieces having a thickness and/or cross-sectional area that are sufficient to guide light and project light covering a field of view of a headset wearer. As an example, the process can be used to produce polymer products having a thickness of no more than 1000 µm (e.g., as measured along the z-axis of a Cartesian coordinate system), such as 800 µm or less, 600 µm or less, 400 µm or less, 200 µm or less, 100 µm or less, or 50 µm or less, and an area of at least 1 cm² (e.g., as measured with respect an x-y plane of the Cartesian coordinate system), such as 5 cm² or more, 10 cm² or more, such as up to about 100 cm² or less, and having a predetermined shape. In certain cases, the polymer film can have a dimension of at least 1 cm (e.g., 2 cm or more, 5 cm or more, 8 cm or more, 10 cm or more, such as about 30 cm or less) in at least one direction in the x-y plane. As another example, the process can be used to produce polymer products having a thickness between 10 µm to 2 mm and an area as large as 1000 $cm^2$ (e.g., a circular polymer product having a diameter of approximately 18 cm.

In the process 2900, a photocurable material is dispensed into a space between a first mold portion and a second mold portion opposite the first mold portion (step 2902). Example systems including mold portions are described, for example, with respect to FIG. 1.

A relative separation between a surface of the first mold portion with respect to a surface of the second mold portion opposing the surface of the first mold portion is adjusted (step 2904). In some cases, the relative separation can be adjusted so that at least a portion the space filled with the photocurable material has a predetermined shape. In some cases, the relative separation can be adjusted so that at least a portion the space filled with the photocurable material has a thickness of no more than 1000 µm, an area of at least 1 $cm^2$. In some cases, the relative separation can be adjusted so that at least a portion the space filled with the photocurable material has a thickness between 10 µm to 2 mm and an area as large as 1000 $cm^2$. Example systems for adjusting the positions of mold portions are described, for example, with respect to FIG. 1.

In some cases, varying the relative separation can include oscillating the position of the first mold portion relative to the second mold portion. Example oscillation techniques are described, for example, with respect to FIG. 23

The photocurable material in the space is irradiated with radiation suitable for photocuring the photocurable material to form a cured waveguide film (step 2906). Example systems for irradiating photocurable material are described, for example, with respect to FIG. 1.

Concurrent to irradiating the photocurable material, at least one of the following is performed: (i) varying the relative separation between the surface of the first mold portion and the surface of the second mold portion, and varying an intensity of the radiation irradiating the photocurable material (step 2908).

In some cases, the relative separation can be varied to regulate a force experienced by the first mold portion along an axis extending between the first mold portion and the second mold portion. In some cases, the relative separation can be varied based on a closed-loop control system that regulates the force. Example closed loop systems are described, for example, with respect to FIG. 22A.

In some cases, the relative separation can be varied after irradiating the photocurable material for a time sufficient to reach a gel point in the photocurable material. In some cases, the relative separation can be reduced after irradiating the photocurable material for the time sufficient to reach the gel point in the photocurable material.

In some cases, varying the relative separation can include moving the first mold portion towards the second mold portion to compress one or more spacer structures disposed between the first mold portion and the second mold portion. In some cases, the spacer structures can be compressed according to an open-loop control system. Example open loop systems are described, for example, with respect to FIG. 22B.

In some cases, varying the intensity of the radiation can include varying a spatial intensity pattern irradiating the photocurable material. Example spatial intensity patterns of radiation are described, for example, with respect to FIG. 27A.

In some cases, varying the intensity of the radiation can include varying a power of the radiation. Varying the power can include pulsing the radiation. In some cases, each pulse of the radiation can have the same power. In some cases, pulses of the radiation can have different power. In some cases, each pulse of the radiation can have the same duration. In some cases, pulses of the radiation can have different durations. In some cases, a pulse frequency can be constant. In some cases, a pulse frequency can be varied. Example pulse patterns of radiation are described, for example, with respect to FIGS. 25 and 26.

In some cases, varying the intensity of the radiation can include sequentially irradiating different areas of the space. Example sequential patterns of radiation are described, for example, with respect to FIG. 27B.

In some cases, the thickness of the space filled with photocurable material varies and the intensity of the radiation can be varied so that regions of high relative thickness receive a higher radiation dose compared to regions of low relative thickness.

In some cases, the process can further include separating the cured waveguide film from the first mold portion and the second mold portion.

In some cases, the process can include assembling a head mounted display comprising the waveguide film formed using the process described herein.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the control module 110 can be implemented using digital electronic circuitry, or in computer software, firmware, or hardware, or in combinations of one or more of them. In another example, the processes 1100, 1800, and 2900 shown in FIGS. 11, 18, and 29, respectively, can be implemented, at least in part, using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 30:
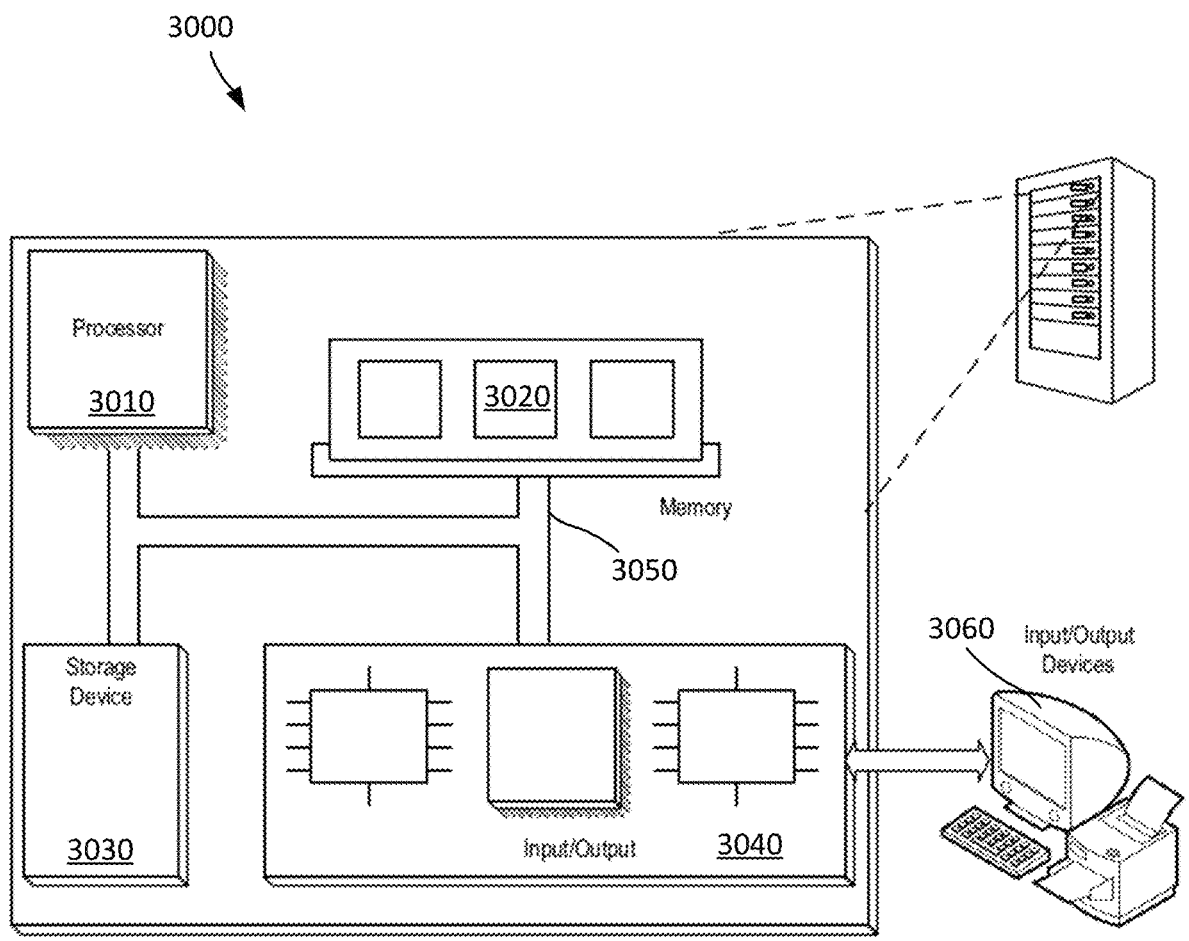
FIG. 30 is a diagram of an example computer system.

FIG. 30 shows an example computer system 3000 that includes a processor 3010, a memory 3020, a storage device 3030 and an input/output device 3040. Each of the components 3010, 3020, 3030 and 3040 can be interconnected, for example, by a system bus 3050. The processor 3010 is capable of processing instructions for execution within the system 3000. In some implementations, the processor 3010 is a single-threaded processor, a multi-threaded processor, or another type of processor. The processor 3010 is capable of processing instructions stored in the memory 3020 or on the storage device 3030. The memory 3020 and the storage device 3030 can store information within the system 3000.

The input/output device 3040 provides input/output operations for the system 3000. In some implementations, the input/output device 3040 can include one or more of a network interface device, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 3060. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of implementations have been described. Nevertheless, it will be understood that various modifications may be made without departing from the spirit and scope of the invention. Accordingly, other implementations are within the scope of the following claims.

What is claimed is:

1. A system for molding a photocurable material into a planar object, the system comprising:
   a first mold structure comprising:
      a first mold surface, the first mold surface comprising a planar area extending in a first plane, and
      a first grating pattern defined along the first mold surface;
   a second mold structure comprising:
      a second mold surface comprising a planar area extending in a second plane, and
      a second grating pattern defined along the second mold surface,
      wherein, at the corresponding planar area, at least one of the first mold structure or the second mold structure is substantially transparent to radiation at one or more wavelengths suitable for photocuring the photocurable material;
   a plurality of protrusions disposed along at least one of the first mold surface or the second mold surface; and
   a plurality of recesses comprising a plurality of linear slots defined along at least one of the first mold surface or the second mold surface,
   wherein at least some of the plurality of protrusions are disposed along at least one of an interior of the first mold surface or an interior of the second mold surface,
   wherein a first slot of the plurality of slots extends in a first direction, wherein a second slot of the plurality of slots extends in a second direction, and wherein the first direction is not parallel to the second direction, and
   wherein, during operation, the system is configured to produce a polymer film having one or more first structures defined on a first side of the polymer film and one or more second structures defined on a second side of the polymer film opposite the first side, wherein the system is configured to produce the polymer film by performing operations comprising:
      positioning the first and second mold structures such that:
         the first and second mold surfaces face each other with the plurality of protrusions contacting the opposite mold surface and inserting into at least some of the plurality of slots,
         the first plane is parallel to the second plane,
         a volume is defined by the first mold surface, the first grating pattern, the second mold surface, and the second grating pattern adjacent the corresponding planar areas, the volume corresponding to a shape of the polymer film including the one or more one first structures and the one or more second structures, and
         the volume has a total thickness variation (TTV) of 500 nm or less, receiving the photocurable material in the volume, and
      directing radiation at the one or more wavelengths into the volume to harden the photocurable material into the polymer film.

2. The system of claim 1, wherein each of the first mold structure and the second mold structure has a thickness greater than 1 mm.

3. The system of claim 1, wherein each of the first mold structure and the second mold structure has a thickness between 1 mm and 50 mm.

4. The system of claim 1, wherein each of the first mold structure and the second mold structure has a diameter greater than 3 inches.

5. The system of claim 1, wherein at least some of the plurality of protrusions are disposed along a periphery of the first mold surface.

6. The system of claim 5, wherein at least some of the plurality of linear slots are disposed along a periphery of the second mold surface.

7. The system of claim 5, wherein at least some of the plurality of linear slots are disposed along an interior of the second mold surface.

8. The system of claim 1, wherein at least some of the plurality of protrusions have a substantially rectangular cross-section.

9. The system of claim 8, wherein at least some of the plurality of protrusions having the substantially rectangular cross-section further comprises a respective substantially hemispherical distal end.

10. The system of claim 8, wherein at least some of the plurality of protrusions having the substantially rectangular cross-section further comprises one or more rounded corners.

11. The system of claim 1, wherein at least some of the plurality of linear slots have a substantially rectangular cross-section.

12. The system of claim 11, wherein at least some of the plurality of linear slots having the substantially rectangular cross-section further comprises one or more rounded corners.

13. The system of claim 1, wherein at least some of the plurality of protrusions are integral with least one of the first mold surface or the second mold surface.

14. The system of claim 1, wherein at least some of the plurality of protrusions are detachable from the first mold surface or the second mold surface.

15. The system of claim 1, further comprising a light assembly configured to emit one or more wavelengths of radiation suitable for photocuring the photocurable material.

16. The system of claim 1, wherein the first and second mold surfaces are polished surfaces.

17. The system of claim 1, wherein, during operation, the system is configured to position the first and second mold structures such that the volume defined has a total thickness variation (TTV) of 100 nm or less.

18. The system of claim 1, wherein each of the plurality of protrusions has a total thickness variation of 100 nm or less.

19. The system of claim 1, wherein each of the plurality of linear slots has a total thickness variation of 100 nm or less.

20. The system of claim 1, wherein, during operation, the system is configured to position the first and second mold structures such that the volume has a thickness between 20 μm and 2 mm.

21. The system of claim 1, wherein, during operation, the system is configured to direct heat into the volume.

22. The system of claim 21, wherein, during operation, the system is configured to direct heat into the volume through the first mold surface.

23. The system of claim 22, wherein, during operation, the system is configured to direct heat into the volume through the second mold surface.

24. The system of claim 1, wherein, during operation, the system is configured to direct the one or more wavelengths of radiation into the volume through the first mold surface.

25. The system of claim 1, wherein, during operation, the system is configured to direct the one or more wavelengths of radiation into the volume through the second mold surface.

26. The system of claim 1, wherein the system comprises:
a platform extending parallel to at least one of the first mold surface or the second mold surface;
a bridge extending between the platform and at least one of the first mold structure or the second mold structure, wherein a width of the platform is greater than a width of the bridge; and
a fiducial feature disposed on the platform.

* * * * *

UNITED STATES PATENT AND TRADEMARK OFFICE
CERTIFICATE OF CORRECTION

| | |
|---|---|
| PATENT NO. | : 11,318,692 B2 |
| APPLICATION NO. | : 16/163350 |
| DATED | : May 3, 2022 |
| INVENTOR(S) | : Chieh Chang et al. |

It is certified that error appears in the above-identified patent and that said Letters Patent is hereby corrected as shown below:

In the Claims

Claim 13, Column 46, Line 29, delete "with least" and insert -- with at least --.

Signed and Sealed this
Eighth Day of April, 2025

Coke Morgan Stewart
*Acting Director of the United States Patent and Trademark Office*